US010863247B2

(12) United States Patent
Yamagishi

(10) Patent No.: US 10,863,247 B2
(45) Date of Patent: Dec. 8, 2020

(54) RECEIVING DEVICE AND DATA PROCESSING METHOD

(71) Applicant: Saturn Licensing LLC, New York, NY (US)

(72) Inventor: Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 16/317,260

(22) PCT Filed: Jun. 30, 2017

(86) PCT No.: PCT/JP2017/024126
§ 371 (c)(1),
(2) Date: Jan. 11, 2019

(87) PCT Pub. No.: WO2018/016295
PCT Pub. Date: Jan. 25, 2018

(65) Prior Publication Data
US 2019/0230419 A1 Jul. 25, 2019

(30) Foreign Application Priority Data
Jul. 20, 2016 (JP) .................................. 2016-142280

(51) Int. Cl.
*H04N 7/10* (2006.01)
*H04N 21/81* (2011.01)
(Continued)

(52) U.S. Cl.
CPC .......... *H04N 21/814* (2013.01); *H04H 20/59* (2013.01); *H04H 60/25* (2013.01); *H04N 21/235* (2013.01);
(Continued)

(58) Field of Classification Search
CPC .. H04N 21/814; H04N 21/488; H04N 21/434; H04N 21/435; H04N 21/8456;
(Continued)

(56) References Cited

U.S. PATENT DOCUMENTS

| 6,543,051 B1* | 4/2003 | Manson | ............... G08B 27/008 348/461 |
| 6,684,240 B1* | 1/2004 | Goddard | ................ H04N 7/163 348/E7.061 |

(Continued)

FOREIGN PATENT DOCUMENTS

| JP | 2006-333490 A | 12/2006 |
| JP | 2008-166863 A | 7/2008 |

(Continued)

OTHER PUBLICATIONS

International Search Report dated Oct. 3, 2017 in PCT/JP2017/024126 filed on Jun. 30, 2017.

(Continued)

*Primary Examiner* — Michael B. Pierorazio
(74) *Attorney, Agent, or Firm* — Oblon, McClelland, Maier & Neustadt, L.L.P.

(57) ABSTRACT

A configuration capable of performing a process of presenting the emergency information to the viewer promptly and reliably is implemented. Middleware of a receiving device that performs a broadcasting content output process receives an emergency information delivery notification transmitted by a transmitting device and generates emergency information event notification data including configuration data of the received emergency information delivery notification. An output data control unit acquires event notification data and executes a process of acquiring or displaying emergency information on the basis of the acquired event notification data. For example, in a case where emergency information overlaid on an image is delivered, application presentation (Continued)

content is deleted in accordance with an event notification, and in the case of signaling emergency information delivery, a process of acquiring and outputting the emergency information promptly is executed.

20 Claims, 32 Drawing Sheets

(51) Int. Cl.
   H04N 21/488 (2011.01)
   H04H 20/59 (2008.01)
   H04N 21/235 (2011.01)
   H04N 21/845 (2011.01)
   H04H 60/25 (2008.01)
   H04N 21/435 (2011.01)
   H04N 21/434 (2011.01)

(52) U.S. Cl.
   CPC ......... *H04N 21/434* (2013.01); *H04N 21/435* (2013.01); *H04N 21/488* (2013.01); *H04N 21/4882* (2013.01); *H04N 21/8456* (2013.01)

(58) Field of Classification Search
   CPC ............. H04N 21/235; H04N 21/4882; H04N 21/8166
   USPC .......................................................... 725/33
   See application file for complete search history.

(56) References Cited

U.S. PATENT DOCUMENTS

| | | | | |
|---|---|---|---|---|
| 7,602,277 | B1* | 10/2009 | Daly | G08B 27/005 340/438 |
| 7,643,564 | B2* | 1/2010 | Sheynman | H04L 63/10 375/259 |
| 7,681,215 | B2* | 3/2010 | Kim | H04H 20/59 340/286.02 |
| 7,870,279 | B2* | 1/2011 | Chuang | H04L 29/06 709/203 |
| 8,745,655 | B2* | 6/2014 | Reddy | H04N 21/25841 725/31 |
| 9,106,976 | B2* | 8/2015 | Emerson | H04N 21/4334 |
| 2001/0021994 | A1* | 9/2001 | Nash | G06Q 30/02 725/42 |
| 2002/0083468 | A1* | 6/2002 | Dudkiewicz | H04N 21/4755 725/133 |
| 2002/0124252 | A1* | 9/2002 | Schaefer | H04N 7/17318 725/33 |
| 2002/0129368 | A1* | 9/2002 | Schlack | G06Q 30/02 725/46 |
| 2002/0188944 | A1* | 12/2002 | Noble | H04N 5/44543 725/39 |
| 2002/0188949 | A1* | 12/2002 | Wang | H04N 5/44543 725/46 |
| 2003/0018977 | A1* | 1/2003 | McKenna | H04N 5/44543 725/115 |
| 2003/0066069 | A1* | 4/2003 | Mankovich | H04N 7/163 725/9 |
| 2003/0216133 | A1* | 11/2003 | Poltorak | G08B 27/006 455/404.1 |
| 2005/0055685 | A1* | 3/2005 | Maynard | G06F 8/65 717/170 |
| 2005/0086685 | A1* | 4/2005 | Rahman | H04L 29/06 725/33 |
| 2006/0234672 | A1* | 10/2006 | Adler | G08B 27/003 455/404.1 |
| 2007/0047520 | A1* | 3/2007 | Byers | H04M 3/42357 370/352 |
| 2007/0121651 | A1* | 5/2007 | Casey | H04N 21/440218 370/401 |
| 2007/0150273 | A1* | 6/2007 | Yamamoto | G10L 15/22 704/231 |
| 2007/0280446 | A1* | 12/2007 | Hsieh | H04L 12/66 379/93.23 |
| 2008/0117337 | A1 | 5/2008 | Yun et al. | |
| 2008/0120640 | A1 | 5/2008 | Yun et al. | |
| 2008/0120641 | A1 | 5/2008 | Yun et al. | |
| 2008/0120642 | A1 | 5/2008 | Yun et al. | |
| 2008/0120643 | A1 | 5/2008 | Yun et al. | |
| 2008/0120644 | A1 | 5/2008 | Yun et al. | |
| 2008/0120645 | A1 | 5/2008 | Yun et al. | |
| 2008/0134043 | A1* | 6/2008 | Georgis | H04N 7/10 715/733 |
| 2009/0001378 | A1* | 1/2009 | Miyake | G09G 3/325 257/71 |
| 2009/0150925 | A1* | 6/2009 | Henderson | H04N 7/163 725/34 |
| 2009/0158382 | A1* | 6/2009 | Shaffer | H04H 20/57 725/131 |
| 2009/0217324 | A1* | 8/2009 | Massimi | H04H 20/106 725/46 |
| 2009/0239497 | A1* | 9/2009 | Sennett | H04W 4/90 455/404.1 |
| 2009/0247110 | A1* | 10/2009 | Sennett | H04W 4/90 455/404.1 |
| 2009/0247114 | A1* | 10/2009 | Sennett | H04W 4/90 455/404.1 |
| 2009/0247116 | A1* | 10/2009 | Sennett | H04W 4/90 455/404.2 |
| 2009/0300695 | A1* | 12/2009 | White | H04N 5/76 725/109 |
| 2010/0058395 | A1* | 3/2010 | Goergen | H04N 21/6125 725/58 |
| 2010/0060789 | A1* | 3/2010 | Aoki | G09G 5/14 348/563 |
| 2010/0162300 | A1 | 6/2010 | Velazquez et al. | |
| 2010/0186029 | A1* | 7/2010 | Kim | G08B 27/005 725/33 |
| 2010/0186030 | A1 | 7/2010 | Yun et al. | |
| 2011/0088058 | A1* | 4/2011 | Velazquez | H04H 20/59 725/33 |
| 2011/0126251 | A1* | 5/2011 | LaFreniere | H04N 7/17327 725/110 |
| 2011/0126257 | A1* | 5/2011 | Goergen | H04N 7/17318 725/132 |
| 2011/0131604 | A1* | 6/2011 | Van Hoff | G06F 3/04817 725/38 |
| 2012/0102522 | A1* | 4/2012 | Long | H04W 76/50 725/33 |
| 2013/0274936 | A1* | 10/2013 | Donahue | G06Q 50/06 700/291 |
| 2013/0281047 | A1* | 10/2013 | Daly | H04W 4/90 455/404.1 |
| 2014/0143801 | A1 | 5/2014 | Russell et al. | |
| 2014/0148116 | A1* | 5/2014 | Alman | H04L 67/2828 455/404.1 |
| 2014/0244997 | A1* | 8/2014 | Goel | H04W 12/08 713/155 |
| 2015/0237413 | A1 | 8/2015 | Russell et al. | |
| 2016/0014475 | A1 | 1/2016 | Russell et al. | |
| 2016/0192033 | A1* | 6/2016 | Kitahara | H04N 21/41415 725/33 |
| 2017/0201761 | A1* | 7/2017 | Walker | H04N 19/46 |

FOREIGN PATENT DOCUMENTS

| | | |
|---|---|---|
| JP | 2011-87103 A | 4/2011 |
| JP | 2014-17741 A | 1/2014 |
| JP | 2014-57227 A | 3/2014 |
| JP | 2015-61195 A | 3/2015 |

OTHER PUBLICATIONS

"Sinclair Broadcast Group and LG Electronics Conduct First ATSC 3.0 Advanced Emergency Alert Broadcast", AWARN Advanced Warning and Response Network (AWARN), Apr. 18, 2016, [retrieval date Sep. 20, 2017], Internet: <URL:http://awarn.org/blog/sinclair-

(56) References Cited

OTHER PUBLICATIONS broadcast-group-and-lg-electronics-conduct-first-atsc-3-0-advanced-emergency-alert-broadcast#>, total 5 pages.
Extended European Search Report dated Apr. 16, 2019 in corresponding European Patent Application No. 17830815.1 citing documents AA-AC and AF therein, 12 pages.

* cited by examiner

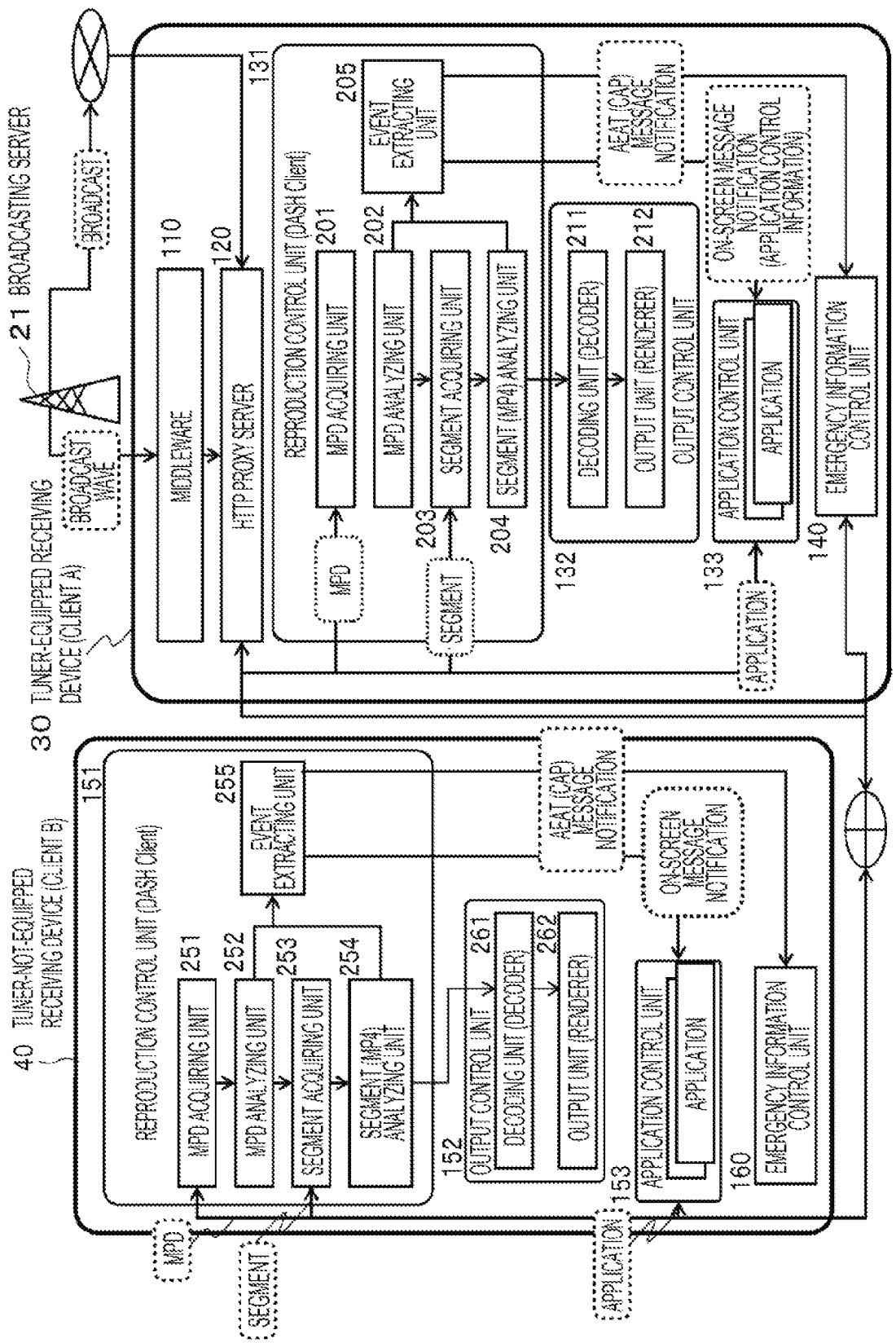

FIG. 12

| Element or Attribute Name | Use | Data Type | Description |
|---|---|---|---|
| OnscreenMessageNotification | 1 | | Service information related to Onscreen Message Notification |
| KeepScreenClear | 0..N | | |
| @bsid | 1 | unsignedShort | Identifier of the broadcast stream. |
| @serviceID | 0..1 | unsignedShort | Identifier of the service within the scope of the broadcast stream that the notification applies. |
| @serviceIDrange | 0..1 | unsignedShort | Identifier of a range of serviceID that this KeepScreenClear applies. |
| @notificationDuration | 0..1 | duration | Indicates duration of this KeepScreenClear for the signaled service(s). |
| @KSCflag | 0..1 | boolean | Indicates the status of KeepScreenClear |
| @version | 1 | unsignedByte | The version of KeepScreenClear |

- @bsid: EMERGENCY INFORMATION-APPLIED BROADCAST STREAM IDENTIFIER
- @serviceID: EMERGENCY INFORMATION APPLICATION TARGET SERVICE IDENTIFIER
- @serviceIDrange: SCREEN CLEAR EXECUTION TARGET SERVICE IDENTIFIER RANGE
- @notificationDuration: SCREEN CLEAR EXECUTION PERIOD
- @KSCflag: SCREEN CLEAR PROCESS NECESSITY FLAG

FIG. 13

| Element or Attribute Name | | | | | Use | Data Type | Description |
|---|---|---|---|---|---|---|---|
| AEAT | | | | | | | Root element of the AEAT |
| | AEA | | | | 1..N | | Advanced Emergency Alert formatted as AEA-MF. |
| | | @AEA_ID | | | 1 | String | The identifier of AEA message. |
| | | @Issuer | | | 1 | String | The identifier of the broadcast station originating or forwarding the message. |
| | | @audience | | | 0..1 | String | The intended distribution of the AEA message. |
| | | @AEA_type | | | 0..1 | String | The category of the message. |
| | | @ref_AEA_ID | | | 0..1 | String | The referenced identifier of AEA message. It shall appear when the @AEA_type is "update" or "cancel". |
| | | @priority | | | 1 | unsignedByte | The priority of the message |
| | | @delayTimer | | | 0..1 | Duration | The delay time between first reception of this AEA message and its display on the screen. (Restricted to minutes and seconds). |
| | | Header | | | 1 | | The container for the basic alert envelope. |
| | | | @effective | | 1 | dateTime | The effective time of the alert message. |
| | | | @expires | | 1 | dateTime | The expiration time of the alert message. |
| | | | EventCode | | 1 | String | A code identifying the event type of the AEA message. |
| | | | | @type | 0..1 | String | A national-assigned string designating the domain of the code (e.g. SAME in US, ...). |
| | | | Location | | 1..N | String | The geographic code delineating the affected area of the alert message |
| | | | | @type | 1 | String | A national-assigned string designating the domain of the code (e.g. FIPS in US, ...). |
| | | AEA_Text | | | 1..N | String | Contains the specific text of the emergency notification |
| | | | @lang | | 1 | Language | The code denoting the language of the respective element of the alert text |
| | | Media | | | 0..N | | Contains the component parts of the multimedia resource. |
| | | | @lang | | 0..1 | Language | The code denoting the language of the respective element Media |
| | | | @mediaDesc | | 0..1 | String | Text describing the type and content of the media file |
| | | | @mediaUri | | 1 | anyURI | The identifier of the media file |
| | | | @mediaDerefUri | | 0..1 | String | Base-64 encoded mimetype data content of the media file |
| | Signature | | | | 0..1 | Any | |

IDENTIFIER, ISSUER, PRIORITY INFORMATION, AND THE LIKE OF EMERGENCY INFORMATION

VALIDITY PERIOD, TYPE, APPLICATION REGION INFORMATION, AND THE LIKE OF EMERGENCY INFORMATION

EMERGENCY INFORMATION MESSAGE OR THE LIKE

MEDIA INFORMATION: DATA SUCH AS EMERGENCY INFORMATION MESSAGE CORRESPONDING TO EACH LANGUAGE AND MAP, ACCESS INFORMATION OF DATA, AND THE LIKE

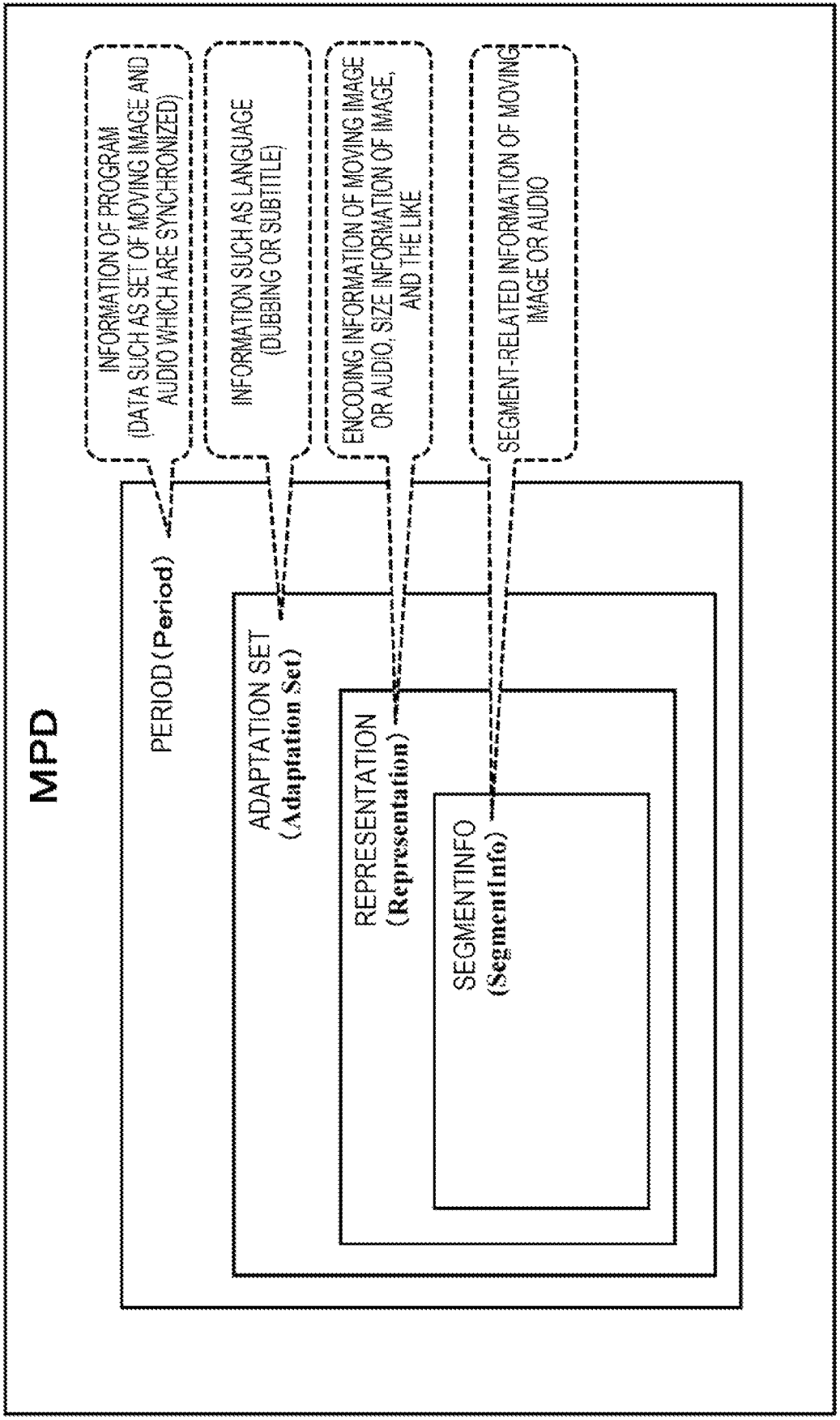

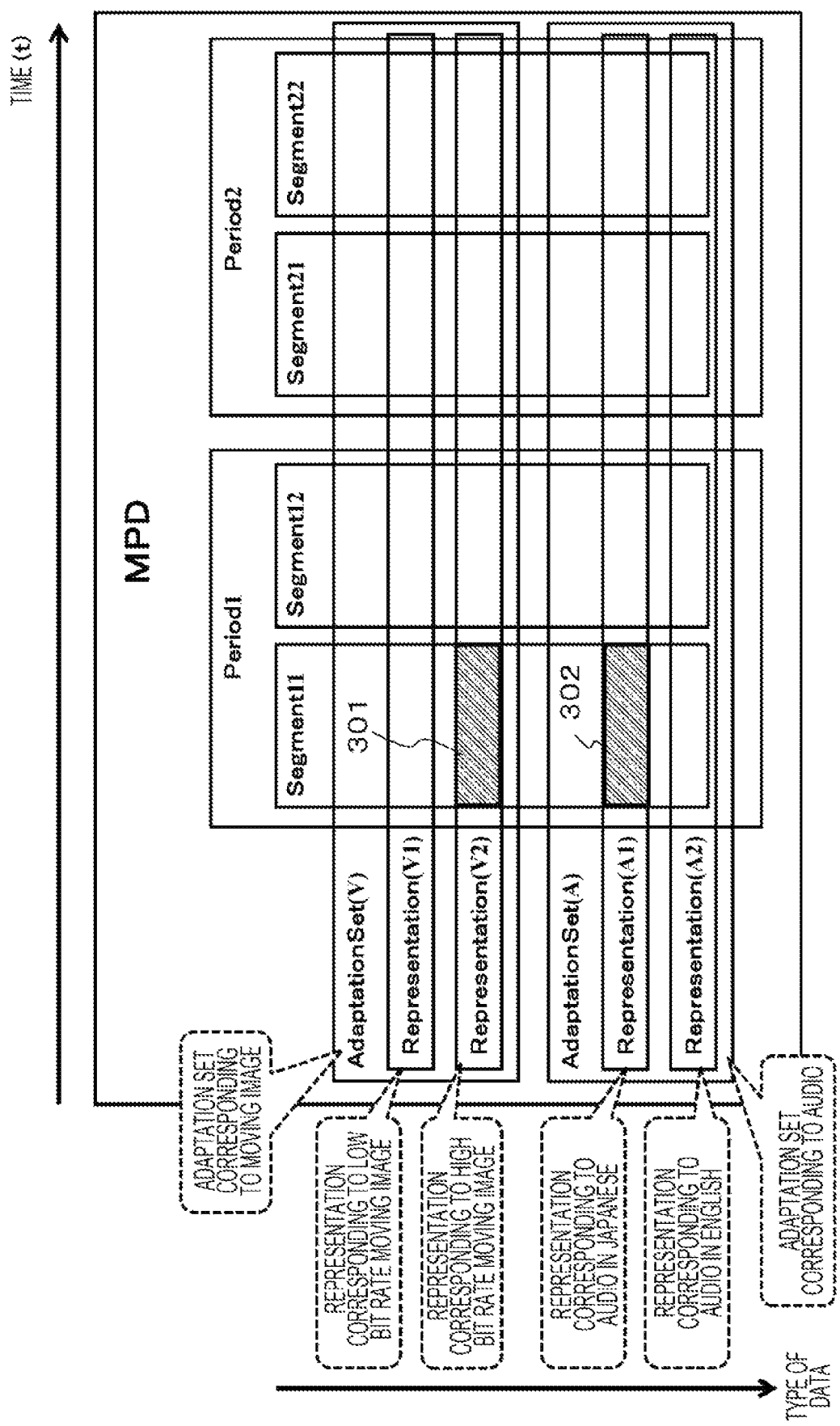

FIG. 16

```
<MPD availabilityStartTime="2011-12-25T12:30:00    ← START TIME (UTC TIME) OF FIRST PERIOD
<Period startTime='0'>                              ← PERIOD START TIME INFORMATION (OFFSET TIME FROM START TIME
...                                                   SPECIFIED IN MPD (MPD@availabilityStartTime))
<EventStream schemeIdUri='urn:xxx' timescale='1000'>   ← EVENT TYPE INFORMATION AND TIMESCALE INFORMATION
                                                        (UNIT TIME OF FOLLOWING presentationTime IS DESIGNATED AS 1/1000 SECONDS)
<Event presentationTime='0' duration='1000'> EVENT DATA 1 </Event   ← RECORD EVENT DATA (EVENT DATA 1),
<Event presentationTime='1000' duration='4000'> EVENT DATA 2 </Event   EVENT ACTIVATION TIME, AND DURATION
                                                                        ACTIVATED AT TIME=0 AND CONTINUES FOR 1000 UNIT TIMES
...
</EventStream>                                      ← RECORD EVENT DATA (EVENT DATA 2),
...                                                   EVENT ACTIVATION TIME, AND DURATION
<AdaptationSet>                                       ACTIVATED AT TIME=1000 AND CONTINUES FOR 4000 UNIT TIMES
<Representation/>                                   ← STREAM ASSOCIATED WITH EVENT
<Representation/>                                     (Video, Audio, OR THE LIKE)
</AdaptationSet>                                    ← FOR EXAMPLE, INFORMATION CORRESPONDING TO LOW BIT RATE IMAGE SEGMENT
...                                                 ← FOR EXAMPLE, INFORMATION CORRESPONDING TO HIGH BIT RATE IMAGE SEGMENT
</Period>
</MPD>
```

FIG. 23

```
box_type="emsg"
scheme_id_uri = "urn:atsc:onScreenMessage"
value = 0
timescale = 1000
presentation_time_delta = 0
event_duration = 0xFFFF
id = 1
message_data[]=
```

- box_type="emsg" → BOX TYPE INFORMATION INDICATES THAT emsg IS EVENT INFORMATION STORAGE BOX
- scheme_id_uri = "urn:atsc:onScreenMessage" → EVENT TYPE INFORMATION
- timescale = 1000 → TIME SCALE INFORMATION (UNIT TIME OF FOLLOWING presentationTime IS DESIGNATED AS 1/1000 SECONDS)
- presentation_time_delta = 0 → EVENT ACTIVATION (START) TIME INFORMATION
- event_duration = 0xFFFF → EVENT DURATION INFORMATION
- id = 1 → EVENT IDENTIFIER
- message_data[] = (EMERGENCY INFORMATION (ON-SCREEN MESSAGE (OnScreenMessage)) DATA OR EMERGENCY INFORMATION DATA ACCESS URL) → EVENT DATA

FIG. 25

```
<MPD availabilityStartTime="2011-12-25T12:30:00           ←  START TIME (UTC TIME) OF FIRST PERIOD
<Period startTime='0'>                                     ←  PERIOD START TIME INFORMATION (OFFSET TIME FROM START TIME
...                                                            SPECIFIED IN MPD (MPD@availabilityStartTime))
<EventStream schemeIdUri='urn:atsc:AEATDelivered' timescale='1000' >  ← EVENT TYPE INFORMATION AND TIME SCALE INFORMATION
<Event presentationTime='0' duration='0'                   (UNIT TIME OF FOLLOWING presentationTime IS DESIGNATED AS 1/1000 SECONDS)

DIFFERENCE (ELAPSED TIME) FROM PERIOD START TIME OF TARGET PERIOD (period)
                                                           AT WHICH EVENT IS STARTED (ACTIVATED)
                                                           (SIGNALING DATA APPLICATION TYPE EMERGENCY INFORMATION (AEAT) DATA OR
                                                           EMERGENCY INFORMATION (AEAT) DATA ACCESS URL ⎫
                                                           ⎬  RECORD EVENT DATA, EVENT ACTIVATION TIME,
                                                           ⎭         AND DURATION </Event>
</EventStream>
...
<AdaptationSet>                                            ←  STREAM ASSOCIATED WITH EVENT
...                                                            (Video, Audio, OR THE LIKE)
</AdaptationSet>
...
</Period>
</MPD>
```

FIG. 26

```
box_type='emsg'                    ──── BOX TYPE INFORMATION INDICATES THAT
                                        emsg IS EVENT INFORMATION STORAGE BOX
scheme_id_uri = "urn:atsc:AEATDelivered"
value = 0                          ──── EVENT TYPE INFORMATION
timescale = 1000                   ──── TIME SCALE INFORMATION
                                        (UNIT TIME OF FOLLOWING presentationTime IS DESIGNATED AS
                                        1/1000 SECONDS)
presentation_time_delta = 0        ──── EVENT ACTIVATION (START) TIME INFORMATION
event_duration = 0xFFFF            ──── EVENT DURATION INFORMATION
id = 1                             ──── EVENT IDENTIFIER
message_data[]= (EMERGENCY INFORMATION (AEAT) DATA OR
                EMERGENCY INFORMATION (AEAT) DATA ACCESS URL)   ──── EVENT DATA
```

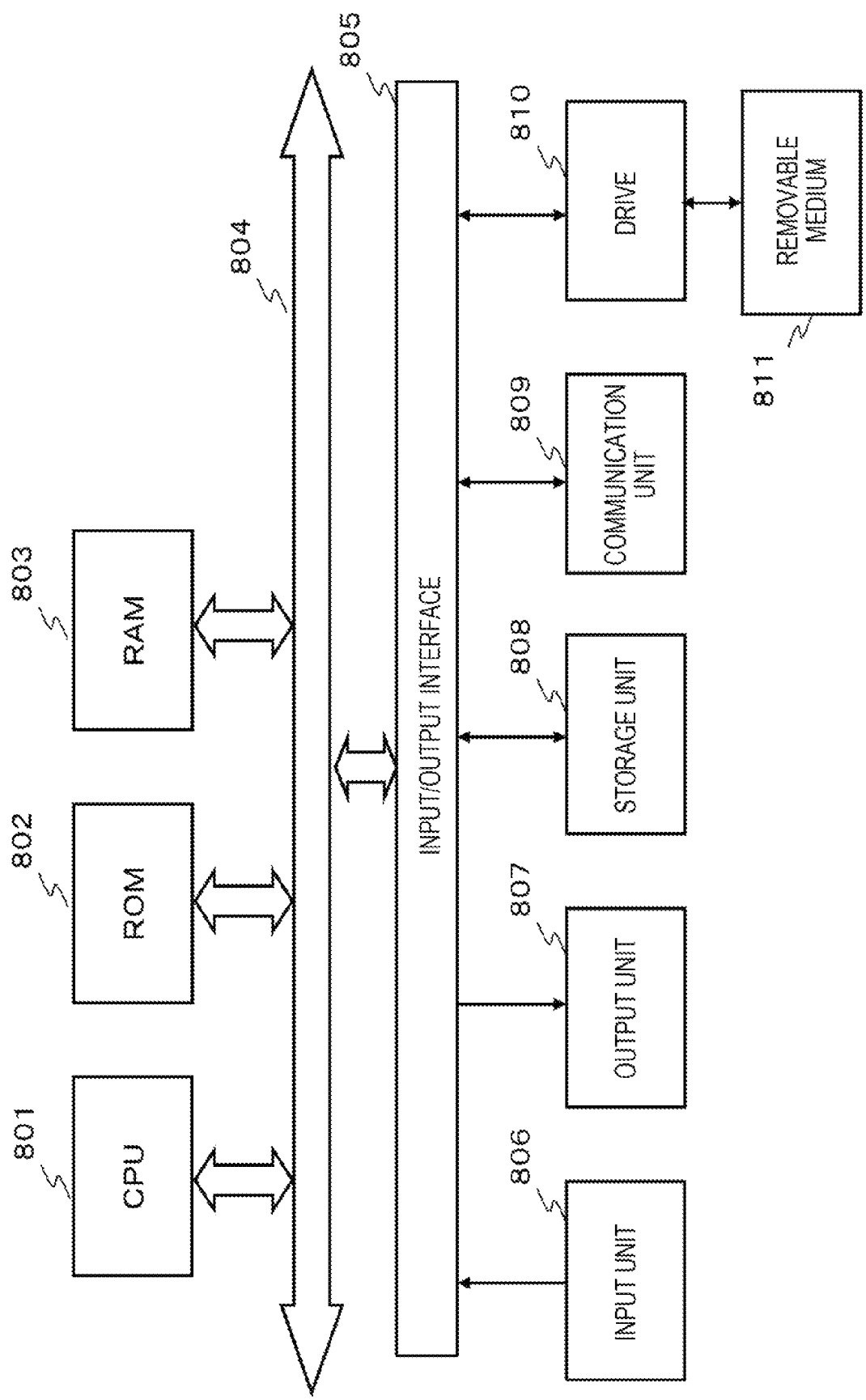

RECEIVING DEVICE AND DATA PROCESSING METHOD

TECHNICAL FIELD

The present disclosure relates to a receiving device and a data processing method. More particularly, the present disclosure relates to a receiving device that receives data via, for example, a broadcast wave or a network and outputs received data to a display unit or the like and a data processing method corresponding to communication data.

BACKGROUND ART

There is Over The Top (OTT) as a data delivery scheme enabling content such as image data and audio data to be delivered regardless of a service form of each communication carrier. Delivery content by OTT is called OTT content, and a delivery service of image (video) data using OTT is called an OTT video or an Over The Top Video (OTT-V).

There is a Dynamic Adaptive Streaming over HTTP (DASH) standard as a data streaming delivery standard according to the OTT-V. DASH is a standard related to adaptive streaming delivery using a streaming protocol based on a HyperText Transfer Protocol (HTTP).

In the adaptive streaming, in order to enable content reproduction to be performed in various clients serving as data delivery destinations, a content delivery server such as a broadcasting station generates a segmentation file of moving image contents of a plurality of bit rates and a manifest file in which attribute information or a URL thereof is described and provides them to the clients.

The clients acquire the manifest file from the server, select an optimum bit rate content corresponding to a size of a display unit of its own device and an available communication band, and receive and reproduce the selected content. It is also possible to dynamically change the bit rate in accordance with a variation in a network bandwidth, and on the client side, it is possible to switch and receive optimum content corresponding to a situation if necessary, and moving image content reproduction in which the occurrence of video interruption is reduced is realized. Further, the adaptive streaming is described in, for example, Patent Document 1 (Japanese Patent Application Laid-Open No. 2011-87103).

Development and standardization of systems in which transmission and reception of content such as a broadcast program are performed from a transmitting device such as a broadcasting station or other content servers to a receiving device such as a television, a PC, or a mobile terminal using one-way communication via a broadcast wave or the like or two-way communication or one-way communication via a network such as the Internet have been currently in active progress.

Further, for example, as a related art that discloses a technique for realizing data delivery via a broadcast wave and a network, there is a technique disclosed in Patent Document 2 (Japanese Patent Application Laid-Open No. 2014-057227).

Advanced Television System Committe (ATSC) 3.0 is being standardized as a standard for a data delivery system via a broadcast wave and a network.

In ATSC3.0, a configuration that has middleware (ATSC3.0 broadcasting middleware) that executes a reception process or the like of ATSC3.0 broadcasting on a broadcast delivery device (a tuner-equipped device) in which an ATSC3.0 compliant physical layer (ATSC-PHY) is implemented installed, receives signaling data including control information or the like for ATSC broadcasting, and is capable of performing various control based on signaling data is under review.

Specifically, a configuration capable of implementing a broadcast content output process using an application program used in the Internet or the like, that is, a so-called client application without change or data processing using various applications provided via broadcast waves or the like in accordance with control based on the signaling data is under review.

For example, an ATSC3.0 compliant physical layer (ATSC-PHY) and ATSC3.0 broadcast reception middleware are installed in a server (a PC, a TV, a tablet, a smartphone, or the like in addition to a dedicated server) that is installed in a house or a hotspot and receives a broadcast service.

Once an ATSC3.0 broadcast service is received, the server transfers broadcast received data to a user device (a PC, a TV, a tablet, a smartphone, or the like) via a network (LAN/WiFi or the like of a home network, a hotspot, or the like).

The user device that receives the broadcast received data transferred via the server can reproduce broadcast content and execute various applications delivered by broadcasting using an application (for example, an ATSC3.0 DASH client application) running on a reproduction control unit or an application control unit of the user device.

In this form, middleware (ATSC3.0 broadcast middleware) that performs, for example, analysis on the signaling data including the control information of the ATSC3.0 broadcast service serves as a terminating device capable of performing an immediate analysis process at a reception timing of the signaling data.

There are cases in which the middleware (ATSC3.0 broadcast middleware) receives, for example, emergency information from a transmitting device 20. Specifically, for example, emergency information indicating the occurrence of an earthquake, the occurrence of terrorism, or the like is received.

It is necessary for the middleware to give a notification to the reproduction control unit (client) that is executing output (display) control of the broadcast service as soon as possible at a timing at which the reception of the emergency information is detected and cause the emergency information to be output as display data.

In a case where the middleware is configured by, for example, the home server, various remote clients (a PC, a TV, a tablet, a smartphone, and the like) are likely to be connected to the middleware via the network.

In the remote clients, the reproduction control unit or the application control unit of each client displays various data on the display unit.

It is necessary for the middleware to give a notification indicating that the emergency information has been received to the reproduction control unit and the application control unit of the remote client as soon as possible and cause the emergency information to be displayed as the display data.

For example, even when the broadcast content in which an emergency message is superimposed on a program image of a broadcast program is transferred from the middleware to the smartphone and displayed on a screen of the smartphone, if a presentation object by a certain application executed by the smartphone is displayed on the screen, a situation in which the emergency information is hidden by the application presentation object, and the user (viewer) of the smartphone is unable to check the emergency information occurs.

In this case, it is necessary to request the application control unit of the smartphone to perform a process of deleting the application presentation object.

Further, for example, in the United States, an emergency information notification system called an Emergency Alert System (EAS) has been organized, and it is possible to promptly give a notification of various emergency information such as, for example, meteorological disaster information, terrorism information, and other emergency evacuation information using this EAS. As the emergency information given in notification using the EAS, there are various different levels of emergency information such as, for example, a notification matter of a national level such as a message from the president, and a local notification matter of a state level or a local government level.

CITATION LIST

Patent Document

Patent Document 1: Japanese Patent Application Laid-Open No. 2011-87103
Patent Document 2: Japanese Patent Application Laid-Open No. 2014-057227

SUMMARY OF THE INVENTION

Problems to be Solved by the Invention

The present disclosure was made, for example, in light of the above problems, and it is an object of the present disclosure to provide a receiving device and a data processing method in which, in a case where middleware executing, for example, analysis of received data or the like receives the emergency information, a notification is given to various clients executing reproduction of the received data via the middleware, and reliable presentation of the emergency information by the client is implemented.

Solutions to Problems

A first aspect of the present disclosure is a receiving device, including:
middleware that executes an analysis process for received data from a transmitting device; and
an output data control unit that executes an output control process for the received data from the transmitting device,
in which the middleware receives an emergency information delivery notification transmitted by the transmitting device, and generates emergency information event notification data including configuration data of the received emergency information delivery notification, and
the output data control unit acquires the event notification data and executes a process of acquiring or displaying emergency information on the basis of the acquired event notification data.

In addition, a second aspect of the present disclosure is receiving device, including:
middleware that executes an analysis process for received data from a transmitting device,
in which the middleware
receives an emergency information delivery notification transmitted by the transmitting device, and generates emergency information event notification data including configuration data of the received emergency information delivery notification, and
provides the generated emergency information event notification data to a client that executes that an output control process for the received data from the transmitting device.

Furthermore, a third aspect of the present disclosure is a receiving device, including:
an output data control unit that executes an output control process for the received data from the transmitting device,
in which the output data control unit
acquires emergency information event notification data including configuration data of an emergency information delivery notification transmitted by the transmitting device, and
executes a process of acquiring or displaying emergency information on the basis of the acquired event notification data.

In addition, a fourth aspect of the present disclosure is a data processing method executed in a receiving device,
the receiving device including:
middleware that executes an analysis process for received data from a transmitting device; and
an output data control unit that executes an output control process for the received data from the transmitting device,
the data processing method including:
receiving, by the middleware, an emergency information delivery notification transmitted by a transmitting device and generating emergency information event notification data including configuration data of the received emergency information delivery notification; and
acquiring, by the output data control unit, the event notification data and executing a process of acquiring or displaying emergency information on the basis of the acquired event notification data.

Furthermore, a fifth aspect of the present disclosure is data processing method executed in a receiving device,
the receiving device including
middleware that executes an analysis process for received data from a transmitting device,
the data processing method including:
receiving, by the middleware, an emergency information delivery notification transmitted by the transmitting device and generating emergency information event notification data including configuration data of the received emergency information delivery notification; and
providing, by the middleware, the generated emergency information event notification data to a client that executes that an output control process for the received data from the transmitting device.

Furthermore, a sixth aspect of the present disclosure is a data processing method executed in a receiving device,
the receiving device including
an output data control unit that executes an output control process for the received data from the transmitting device,
the data processing method including:
acquiring, by the output data control unit, emergency information event notification data including configuration data of an emergency information delivery notification transmitted by the transmitting device; and
executing, by the output data control unit, a process of acquiring or displaying emergency information on the basis of the acquired event notification data.

Still other objects, features, and advantages of the present disclosure will become apparent from detailed description based on embodiments of the present disclosure to be described below and the appended drawings. Further, in this specification, a system refers to a logical aggregate configuration of a plurality of devices and is not limited to a configuration in which devices of respective components are in a single housing.

Effects of the Invention

According to a configuration of one embodiment of the present disclosure, a configuration capable of performing a process of presenting the emergency information to the viewer promptly and reliably is implemented.

Specifically, for example, middleware of a receiving device that performs a broadcasting content output process receives an emergency information delivery notification transmitted by a transmitting device and generates emergency information event notification data including configuration data of the received emergency information delivery notification. An output data control unit acquires event notification data and executes a process of acquiring or displaying emergency information on the basis of the acquired event notification data. For example, in a case where emergency information overlaid on an image is delivered, application presentation content is deleted in accordance with an event notification, and in the case of signaling emergency information delivery, a process of acquiring and outputting the emergency information promptly is executed.

With the present configuration, a configuration capable of performing a process of presenting the emergency information to the viewer promptly and reliably is implemented.

Further, the effects described in this specification are merely examples and not limiting, and additional effects may be included.

BRIEF DESCRIPTION OF DRAWINGS

FIG. 11 is a diagram illustrating a configuration example of a receiving device.

FIG. 12 is a diagram illustrating a configuration example of emergency information transmission notification data.

FIG. 13 is a diagram illustrating a configuration example of emergency information transmission notification data.

FIG. 14 is a diagram illustrating a configuration example of an MPD.

FIG. 15 is a diagram illustrating a configuration example of an MPD.

FIG. 16 is a diagram illustrating a configuration example of an event notification MPD.

FIG. 23 is a diagram illustrating a data configuration example of an event information storage box (emsg) in which an on-screen message event (OnScreenMessage Event) is set in a segment.

FIG. 25 is a diagram illustrating a data configuration example of an MPD in which signaling data application type emergency information (AEAT) delivery event (AEATDelivered Event) information is recorded.

FIG. 26 is a diagram illustrating a data configuration example of an event information storage box (emsg) in which a signaling data application type emergency information (AEAT) delivery event (AEATDelivered Event) is set in a segment.

FIG. 32 is a diagram illustrating a hardware configuration example of a transmitting device and a receiving device which are communication devices.

MODE FOR CARRYING OUT THE INVENTION

Figure 1:
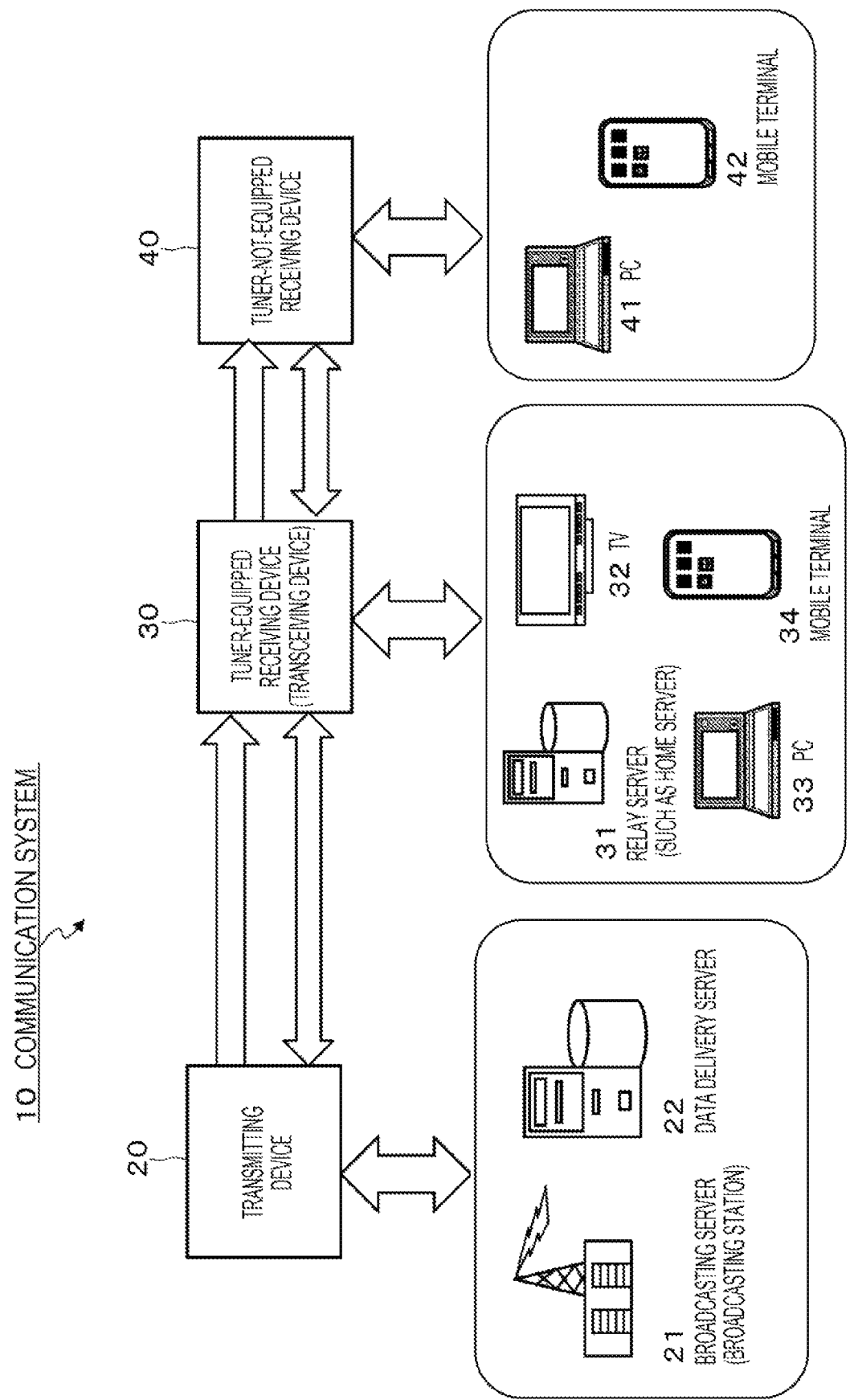
FIG. 1 is a diagram illustrating one configuration example of a communication system that executes a process of the present disclosure.

Hereinafter, a receiving device and a data processing method of the present disclosure will be described in detail with reference to the appended drawings. Further, the description will proceed in accordance with the following items.

1. Configuration example of communication system
2. Data communication protocols FLUTE and ROUTE
3. Communication process example executed by transmitting device and receiving device
4. Overview of transmission and output processes of emergency information 5. Configuration example and process example of receiving device 6. Emergency information delivery notification process to which signaling data is applied 7. Event notification configuration 7-1. MPD-applied event notification scheme (=MPD Event)

7-2. Segment-applied event notification scheme (=In-band Event Signaling)

8. Event notification configuration for emergency information delivery notification process 8-1. Configuration in which on-screen message type emergency information delivery notification is given in notification as event information 8-1-1. Notification configuration of on-screen message type emergency information delivery notification to which MPD-applied event notification scheme is applied 8-1-2. Notification configuration of on-screen message type emergency information delivery notification to which segment-applied (In-band) event notification scheme is applied 8-1-3. Generation and transfer of event based on on-screen message type emergency information delivery notification and execution sequence for event-based process 8-2. Configuration in which signaling data application type emergency information delivery notification is given in notification as event information 8-2-1. Notification configuration of signaling data application type emergency information delivery notification to which MPD-applied event notification scheme is applied 8-2-2. Notification configuration of signaling data application type emergency information delivery notification to which segment-applied (In-band) event notification scheme is applied 8-2-3. Generation and transfer of event based on signaling data application type emergency information delivery notification and execution sequence for event-based process 9. Configuration example including event information transfer dedicated server and client 9-1. Generation and transfer of event based on on-screen message type emergency information delivery notification and execution sequence for event-based process 9-2. Generation and transfer of event based on signaling data application type emergency information delivery notification and execution sequence for event-based process 10. Configuration example of transmitting device and receiving device 11. Conclusion of configuration of present disclosure

1. Configuration Example of Communication System

First, one configuration example of a communication system that executes a process of the present disclosure will be described with reference to FIG. 1.

As illustrated in FIG. 1, a communication system 10 includes a transmitting device 20 which is a communication device that transmits content such as image data or audio data, a tuner-equipped receiving device 30 which is a communication device that receives content transmitted by the transmitting device 20 via a broadcast wave or a network, and a tuner-not-equipped receiving device 40 that receives content transmitted by the transmitting device 20 via the tuner-equipped receiving device 30 and a network.

The transmitting device 20 is specifically a device that provides content such as, for example, a broadcasting station 21 or a content server 22.

The tuner-equipped receiving device 30 is a receiving device which is equipped with a tuner for receiving a broadcast wave. For example, the tuner-equipped receiving device 30 is a client device or a home server of a general user, a relay server installed in a public facility, or the like. Specifically, examples of the tuner-equipped receiving device 30 include a relay server (including home server or the like) 31, a television 32, a PC 33, a mobile terminal 34, and the like.

Further, the tuner-not-equipped receiving device 40 is a receiving device which is not equipped with a tuner for receiving a broadcast wave. More specifically, examples of the tuner-not-equipped receiving device 40 include a PC 41, a mobile terminal 42, and the like.

Data communication between the transmitting device 20 and the tuner-equipped receiving device 30 is performed as communication using at least one or both of two-way communication or one-way communication via a network such as the Internet or one-way communication via a broadcast wave or the like.

Content transmission from the transmitting device 20 to the tuner-equipped receiving device 30 is executed in accordance with, for example, the DASH (MPEG-DASH) standard which is a standard of adaptive streaming technology.

Further, the DASH standard is a standard related to adaptive streaming delivery using a streaming protocol based on the HTTP as described above.

The MPEG-DASH standard includes the following two standards:

(a) a standard related to a manifest file (Media Presentation Description (MPD)) for describing metadata which is a management file of a moving image or an audio file; and (b) a standard related to a file format (segment format) for moving image content transmission.

Content delivery from the transmitting device 20 to the tuner-equipped receiving device 30 is executed in accordance with the MPEG-DASH standard.

Content received by the tuner-equipped receiving device 30 is transferred to the tuner-not-equipped receiving device 40 via a network (a home network (a LAN, WiFi, or the like) at home, WiFi or the like at a hotspot, or the like).

The tuner-equipped receiving device 30 and the tuner-not-equipped receiving device 40 can reproduce content transmitted by the transmitting device 20.

The transmitting device 20 encodes content data and generates a data file including encoded data and metadata of the encoded data. An encoding process is performed in accordance with, for example, a MP4 file format specified in MPEG. Further, in a case where the transmitting device 20 generates a data file of an MP4 format, the file of the encoded data is referred to as "mdat", and the metadata is referred to as "moon", "moof", or the like.

Content provided from the transmitting device 20 to the tuner-equipped receiving device 30 is, for example, various data such as music data, video data such as a movie, a television program, a video, a photograph, a document, a painting, and a chart, a game, and software.

Transmission data of the transmitting device 20 will be described with reference to FIG. 2.

Figure 2:
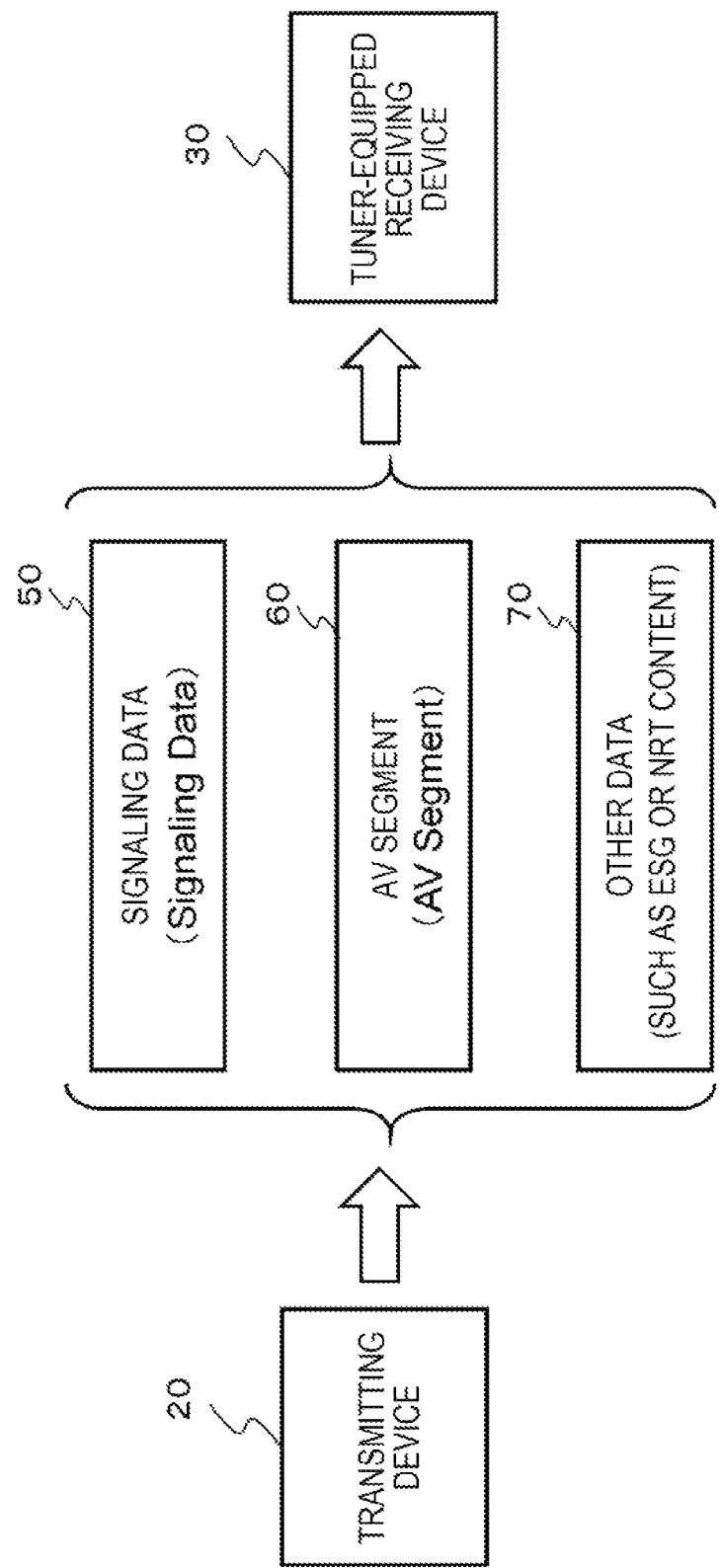
FIG. 2 is a diagram illustrating transmission data of a transmitting device.

The transmitting device 20 which executes data transmission in accordance with the MPEG-DASH standard roughly transmits a plurality of types of data when roughly classified as illustrated in FIG. 2:

(a) signaling data 50;

(b) an AV segment 60; and (c) other data (an electronic service guide (ESG), NRT content, or the like) 70.

The AV segment 60 is constituted by an image (Video) or audio data to be reproduced at the receiving device, that is, program content or the like provided by, for example, a broadcasting station. For example, the AV segment 60 is constituted by MP4-encoded data (mdat) or metadata (moov or moof). Further, the AV segment is also referred to as a DASH segment.

On the other hand, the signaling data 50 is constituted by various information such as program schedule information such as a program guide, address information (Uniform Resource Locator (URL) or the like) necessary for program acquisition, and information necessary for a content reproduction process, for example, control information such as codec information (an encoding scheme or the like), guide information, notification information, application control information, and emergency information such as earthquake information or terrorism information.

The signaling data 50 is transmitted from the transmitting device 20 as, for example, data of an Extensible Markup Language (XML) format.

The signaling data is repeatedly transmitted if necessary. For example, the signaling data is transmitted at intervals of 100 msec or the like frequency and repeatedly.

This is because the receiving device (client) can acquire the signaling data immediately at any time.

The client (receiving device) can executes a process necessary for reception and reproduction of program content such as acquisition of an access address of necessary program content or a codec setting process on the basis of receivable signaling data if necessary without delay.

Further, the emergency information such as the earthquake information or the terrorism information can be provided to many receiving devices for a lifetime without causing a large delay.

The other data 70 includes, for example, an ESG, NRT content, and the like.

The ESG stands for an electronic service guide such as the guide information such as the program guide, for example.

The NRT content is non-real-time type content.

The NRT content includes, for example, data files such as various application files, moving images, still images, and the like executed on a browser of the receiving device 30 which is a client.

The following data illustrated in FIG. 2 is transmitted in accordance with, for example, a data communication protocol (File Delivery over Uni-directional Transport (FLUTE)):

(a) signaling data 50;
(b) AV segment 60; and
(c) other data (an ESG, NRT content, or the like) 70.

2. Data Communication Protocols FLUTE and ROUTE

The data communication protocol (FLUTE) is a protocol for performing session management of content to be transmitted in a multicast manner.

For example, a file (identified by a URL and a version) generated on a server side, which is a transmitting device is transmitted to the client serving as the receiving device in accordance with the FLUTE protocol.

The tuner-equipped receiving device (client) 30 accumulates a URL and a version of a received file in, for example, a storage unit (client cache) in association with the file.

A file having the same URL and the different version is regarded as a file whose content has been updated. In the FLUTE protocol, since only one-way file transfer control is performed, the client has no function of filtering a file selectively, but it is possible to implement selective filtering by selectively selecting a file to undergo transfer control according to FLUTE using metadata associated with the file at the client side and to constitute, update, and manage a local cache in which the preference of the user is reflected.

Further, the metadata may be extended and incorporated into the FLUTE protocol or may be described separately in accordance with a protocol such as an ESG.

Further, FLUTE was originally specified as a file transfer protocol in multicast. FLUTE is constituted by a combination of FDT and a multicast protocol of a scalable file object called ALC, specifically, an LCT or FEC component which is a building block thereof.

FLUTE of the related art was developed mainly for use in asynchronous file transfer, but extension is currently being performed so that it can be applied to broadcast live streaming in Advanced Television System Committe (ATSC) which is a standardization organization on a data delivery system via a broadcast wave and a network. The extended specification of FLUTE is referred to as Real-Time Object Delivery over Unidirectional Transport (ROUTE).

Currently, there is Advanced Television System Committe (ATSC) 3.0 as a standard which is currently being standardized as one of standards related to the data delivery system via the broadcast waves and the network. In ATSC3.0, a stack configuration adopted for transmission of signaling data, an ESG, an asynchronous file, a synchronous stream, and the like by replacing ROUTE with the FLUTE protocol of the related art is specified.

3. Communication Process Example Executed by Transmitting Device and Receiving Device Next, a communication process example executed by the transmitting device and the receiving device will be described.

Figure 3:
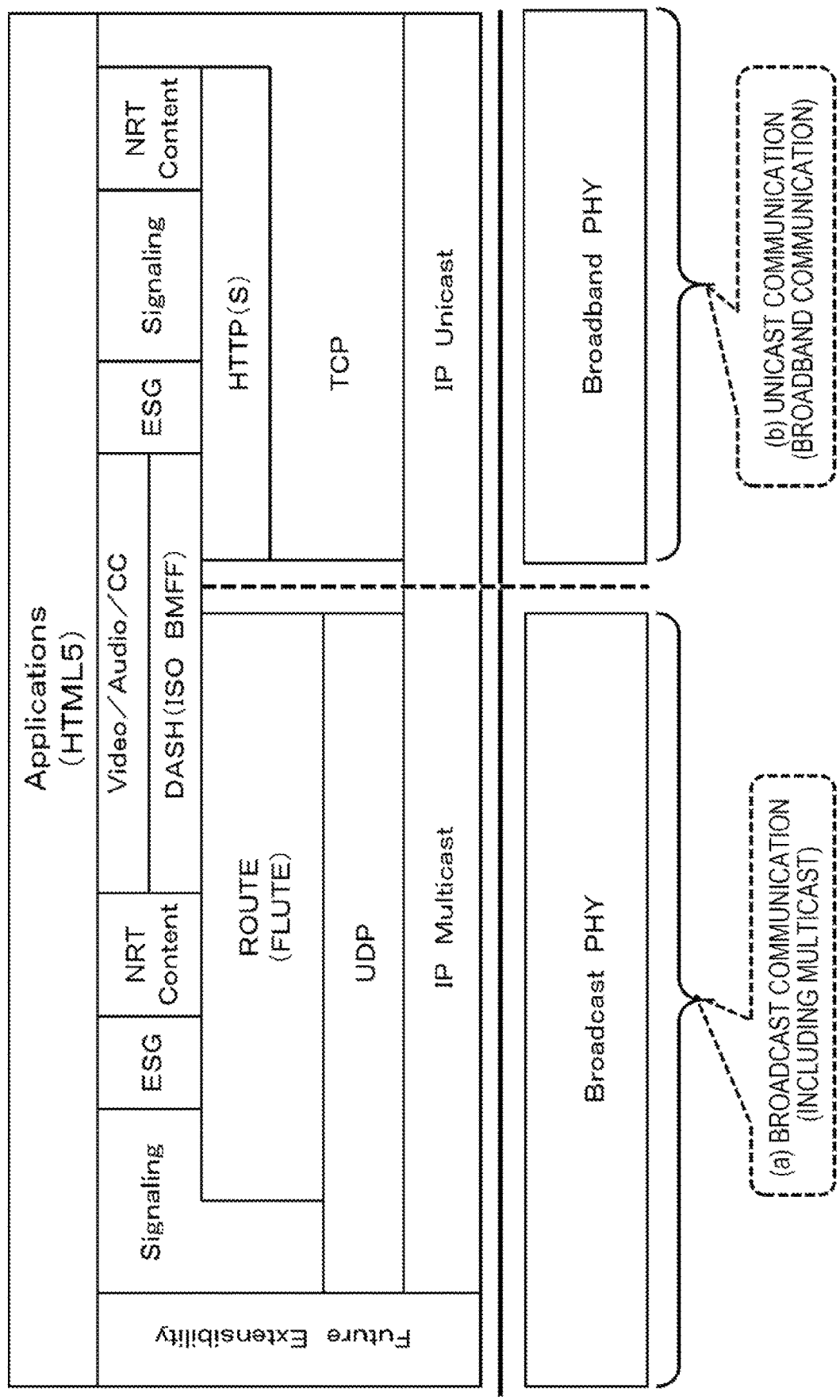
FIG. 3 is a diagram illustrating an example of a protocol stack of a transmitting device and a receiving device.

FIG. 3 is a diagram illustrating an example of a protocol stack of the transmitting device and the receiving device.

The example illustrated in FIG. 3 has two protocol stacks for processing the following two communication data:

(a) broadcast (including multicast) communication (for example, broadcast type data delivery); and
(b) unicast (broadband) communication (for example, HTTP type P2P communication).

A left side of FIG. 3 is a protocol stack corresponding to (a) the broadcast communication (for example, the broadcast type data delivery).

A right side of FIG. 3 is a protocol stack corresponding to (b) the unicast (broadband) communication (for example, the HTTP type P2P communication).

The protocol stack corresponding to (a) the broadcast communication (for example, the broadcast type data delivery) illustrated on the left side of FIG. 3 has the following layers in order from the lower layer:

(1) a broadcast physical layer (Broadcast PHY);
(2) an IP multicast layer (IP Multicast);
(3) a UDP layer;
(4) a ROUTE (=extended FLUTE) layer;
(5) ESG, NRT content, DASH (ISOBMFF), and Video/Audio/CC, signaling (Service Level Signaling (SLS); and
(6) an application layer (Applications (HTML 5)).

Further, a layer of signaling data is also set as (2) the IP multicast layer (IP Multicast) and a layer above the UDP layer.

The signaling layer is a layer applied to transmission and reception of the signaling data 50 described above with reference to FIG. 2. The signaling data includes various information such as the program schedule information such as the program guide, the address information (a URL or the like) necessary for program acquisition, and information necessary for the content reproduction process, for example, guide information including the codec information (an encoding scheme or the like) or the like, the control information, and the emergency information such as the earthquake information or the terrorism information.

The signaling data includes, for example, the following two different types of signaling data:
  lower layer signaling (LLS); and
  service level signaling (SLS).

The SLS is signaling data in which control information, guide information, metadata, and the like of each service unit, for example, each program unit are stored.

The LLS is signaling data in which control information, guide information, metadata, and the like higher than those of the SLS are stored, and includes, for example, information for acquiring the SLS and the like.

The signaling data is data which also includes access information of an AV segment to be received and reproduced by the receiving device (client) and guide information or control information necessary for a process after reception such as a decoding process and the like and is repeatedly transmitted if necessary from the transmitting device.

Further, the signaling data has various types according to, for example, provision information. Specifically, for example, there is User Service Description (USD) which is signaling data of a service unit.

The USD includes various types of control information. As representative control information, there is Media Presentation Description (MPD) which is signaling data including a manifest file in which various guide information and control information corresponding to content (AV segment) are stored.

Various kinds of signaling data are data necessary for a reception/reproduction process and a control process for an AV segment or an application (application program) transmitted from the transmitting device in the receiving device (client) and are set as individual files (metafiles) in accordance with each category and transmitted from the transmitting device, for example.

Further, a use permission layer (Future Extensibility) of a future new protocol is set as a layer above (1) the broadcast physical layer (Broadcast PHY).

(1) The broadcast physical layer (Broadcast PHY) is a physical layer constituted by a communication control unit for controlling, for example, a communication unit of a broadcasting system for executing broadcast communication.

(2) The IP multicast layer (IP Multicast) is a layer that executes a data transceiving process in accordance with an IP multicast.

(3) The UDP layer is a layer in which a process of generating and analyzing a UDP packet is performed.

(4) The ROUTE layer is a layer that stores and extracts transfer data in accordance with the ROUTE protocol which is the extended FLUTE protocol.

Similarly to FLUTE, ROUTE is a multicast protocol of a scalable file object called ALC, and specifically, ROUTE is constituted by a combination of an LCT or FEC component which is a building block thereof.

Figure 4:
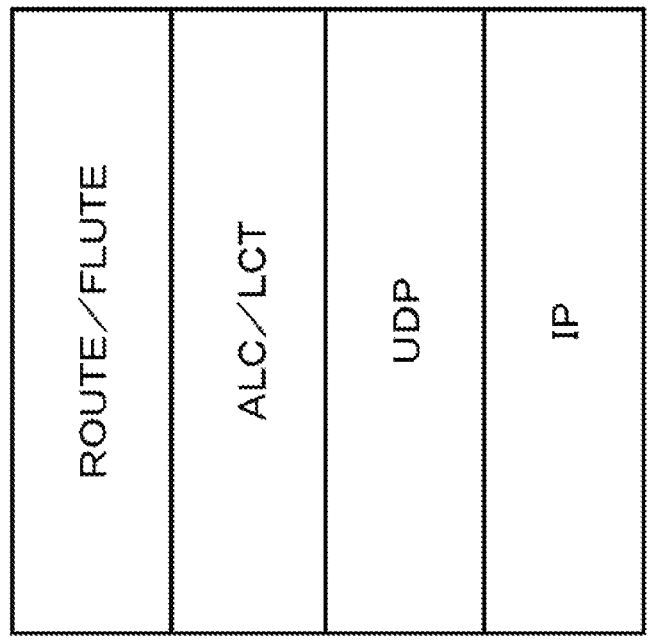
FIG. 4 is a diagram for describing a ROUTE/FLUTE protocol stack.

FIG. 4 illustrates a protocol stack related to ROUTE and FLUTE.

(5) The ESG, NRT content, DASH (ISO BMFF), and Video/Audio/CC are data transferred in accordance with the ROUTE protocol.

A broadcasting type delivery service according to the DASH standard is referred to as a Multimedia Broadcast Multicast Service (MBMS).

As a scheme for efficiently realizing MBMS in LTE, there is an evolved Multimedia Broadcast Multicast Service (eMBMS). MBMS and eMBMS are broadcasting type delivery services, that is, services for delivering the same data at once, for example, movie content or the like to a plurality of user terminals (UE) which are receiving devices located in a specific area with a common bearer. With the broadcasting delivery according to MBMS or eMBMS, it is possible to simultaneously provide the same content to the receiving devices such as a plurality of smartphones, a plurality of PCs, or a plurality of televisions located in a delivery service provision area.

MBMS and eMBMS regulate a process of downloading files according to a 3GPP file format (an ISO-BMFF file and an MP4 file) in accordance with the transfer protocol ROUTE or FLUTE.

Many of the following data described above with reference to FIG. 2 are transmitted in accordance with the ROUTE protocol or the FLUTE protocol:
  (a) the signaling data 50;
  (b) the AV segment 60; and
  (c) other data (ESG, NRT content, or the like) 70.

(5) The ESG, NRT content, DASH (ISO BMFF), and Video/Audio/CC are data transferred in accordance with the ROUTE protocol.

The ESG stands for an electronic service guide and is, for example, the guide information such as the program guide.

The NRT content is non-real-time type content.

As described above, the NRT content includes, for example, data files such as various application files, moving images, still images, and the like executed on a browser of the receiving device which is a client.

The Video/Audio/CC is actual data serving as a reproduction target such as videos or audios delivered in accordance with the DASH standard.

(6) The application layer (Applications (HTML 5)) is an application layer in which generation or analysis of data to be transferred in accordance with the ROUTE protocol, output control of various data, and the like are executed, and for example, data generation using a HTML 5, analysis, output processing, and the like are executed.

On the other hand, the protocol stack corresponding to (b) the unicast (broadband) communication (for example, the HTTP type P2P communication) illustrated on the right side of FIG. 3 has the following layers in order from the lower layer:
  (1) a broadband physical layer (Broaband PHY);
  (2) an IP unicast layer (IP Unicast);
  (3) a TCP layer;
  (4) a HTTP layer;
  (5) ESG, Signaling, NRT content, DASH (ISO BMFF) and Video/Audio/CC; and
  (6) an application layer (Applications (HTML 5)).

(1) The broadband physical layer (Broaband PHY) is a physical layer constituted by a communication control unit such as, for example, a device driver that controls a communication unit such as a network card that carries out broadband communication.

(2) The IP unicast layer (IP Unicast) is a layer in which an IP unicast transceiving process is executed.

(3) The HTTP layer is a layer in which a process of generating and analyzing a HTTP packet is performed.

Upper layers are similar to those of the stack configuration of (a) the broadcast communication (for example, the broadcast type data delivery) on the left side of FIG. 3.

Further, the transmitting device (server) 20 and the tuner-equipped receiving device (client) 30 perform a process according to at least one of two process systems of FIG. 3, that is, the following two communication protocol stacks:

(a) broadcast communication (for example, broadcast type data delivery); or (b) unicast (broadband) communication (for example, HTTP type P2P communication).

Further, the tuner-not-equipped receiving device (client) 40 performs a communication process according to a process system on the right side of FIG. 3, that is, the following communication protocol stack as a communication process with the tuner-equipped receiving device (client) 30:

(b) unicast (broadband) communication (for example, HTTP type P2P communication)

In the protocol stack illustrated in FIG. 3, if an attribute (including a URL which is an identifier of a file) of a file group which is multicast-transferred in accordance with ROUTE (FLUTE) can be described in a control file of ROUTE (FLUTE), it can also be described in signaling data in which a file transfer session is described. Further, a further detailed attribute of the file transfer session can also be described by an ESG (also applicable to purpose presentation to an end user).

As described above, standardization of Advanced Television System Committe (ATSC) 3.0 as one of standards related to the data delivery system via the broadcast wave and the network is in progress.

In standardization of an IP based transport stack in ATSC3.0, a method of transferring files based on an MPEG-DASH file format (an ISO-BMFF file and an MP4 file) in accordance with a ROUTE protocol which is an extension of FLUTE has been proposed and set as a standard candidate method.

When the ROUTE protocol is applied, it is possible to transfer a fragmented MP4 file sequence of the DASH standard, an MPD which is a control information (signaling data) storage metafile of the DASH standard, a USBD/USD which is signaling data for broadcasting delivery, Service based Transport Session Description (S-TSID), and the like.

4. Overview of Transmission and Output Processes of Emergency Information

In the communication system described with reference to FIG. 1, in a case where the emergency information is transmitted from the transmitting device 20 and received by the tuner-equipped receiving device 30, it is necessary to promptly output the emergency information to the display unit of the tuner-equipped receiving device 30 or the tuner-not-equipped receiving device 40 so that the user can check the emergency information without delay.

Further, as described above, for example, in the United States, the emergency information notification system called the EAS has been organized, and it is possible to promptly give a notification of various emergency information, for example, the meteorological disaster information, the terrorism information, other emergency evacuation information, and the like using the EAS. As the emergency information notified using the EAS, there are various different levels of emergency information such as, for example, a notification matter of a national level such as a message from the president, and a local notification matter of a state level or a local government level.

ATSC3.0 which is the standard related to the data delivery system via the broadcast waves and the networks in the United States is premised on the use of an Integrated Public Alert and Warning System (IPAWS) which is a next generation emergency information notification system.

In accordance with the IPAWS, the transmitting device such as the broadcasting station transmits data such as a message constituting the emergency information or the evacuation route information to the receiving device in accordance with an Advanced Emergency Alerting Table (AEAT) specified as a standard for emergency information transmission or a Common Alerting Protocol (CAP) format.

For example, detailed information related to various emergency information names such as various emergency information attribute information of the emergency information, for example, a category of the emergency information, a degree of emergency of the emergency information, transmission source information, region information in which it is necessary to give a notification of the emergency information, or the like is assigned to the AEAT or CAP message.

The receiving device that has received the AEAT or CAP message analyzes the received message, selects necessary information in accordance with, for example, the category or the degree of emergency of the emergency information, a current position of the receiving device, or the like, and outputs (displays) the selected necessary information.

In the communication system configuration illustrated in FIG. 1, for example, the tuner-equipped receiving device 30 includes the middleware that analyzes the received data, and in a case where the middleware receives the emergency information indicating the occurrence of an earthquake, the occurrence of terrorism, or the like, it is necessary to give a notification to the client (user device) which is reproducing the broadcast service via the middleware as soon as possible at a timing in a case where the reception of the emergency information is detected.

The tuner-equipped receiving device 30 includes middleware (ATSC3.0 broadcasting middleware) for performing, for example, analysis on the signaling data including the control information of the ATSC3.0 broadcast service, but the tuner-not-equipped receiving device 40 does not include such middleware.

Therefore, it is necessary for the tuner-equipped receiving device 30 to give a notification of the occurrence of an earthquake, the occurrence of terrorism, or the like detected by the middleware to various clients (user devices) which are reproducing the broadcast service via the middleware as soon as possible.

The middleware has to give a notification indicating that the emergency message is received to, for example, an application (for example, an ATSC3.0 DASH client application) running on the reproduction control unit or the application control unit of the remote client (a PC, a TV, a tablet, a smartphone, or the like) connected to the network.

This is because, although the emergency message is displayed overlaid on the program image of the broadcast program being displayed on the client such as the smartphone and the like, in a case where an application presentation object is displayed overlaid on the program image by another broadcasting application being executed by the client or an application executed by the client itself, the user is unable to see the emergency message unless the application presentation object is excluded, and the user is likely to be led to a dangerous situation.

A transmission process of the emergency information from the transmitting device 20 to the receiving device 30 and a display process example of the emergency information in the receiving device 30 will be described with reference to FIG. 5 and subsequent drawings.

Figure 5:
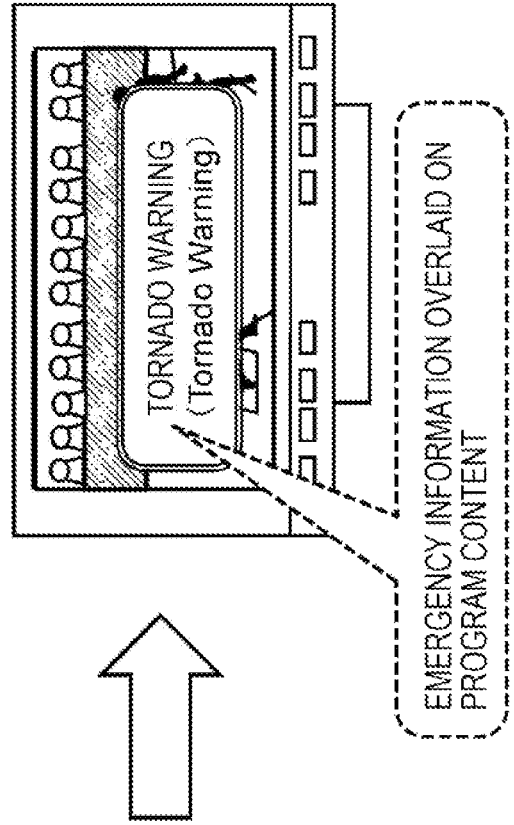
FIG. 5 is a diagram illustrating transmission and reception and a display process example of emergency information.

FIG. 5 illustrates a configuration in which image data in which the emergency information is overlaid on an image of program content delivered by the transmitting device such as the broadcasting station is delivered.

(a) As normal program display, for example, if the emergency information occurs while program content of a baseball relay is being delivered, the broadcasting station side generates program content in which the emergency information is overlaid on a baseball relay image and delivers the program content to the receiving device.

As described above, an emergency information delivery scheme in which the emergency information is overlaid directly on the reproduction content and delivered is referred to as an on-screen message (OnScreenMessage) type emergency information delivery scheme.

Figure 6:
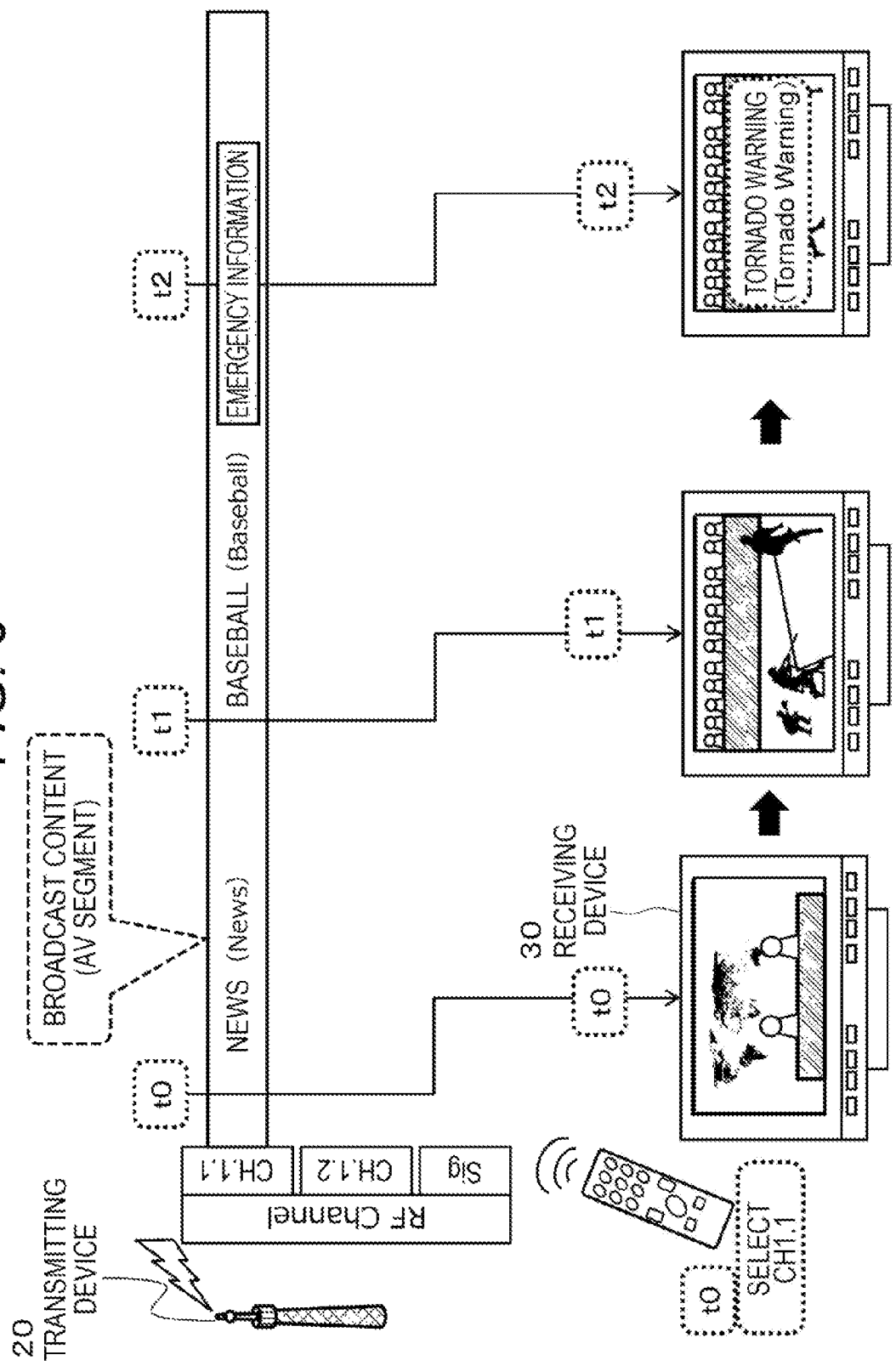
FIG. 6 is a diagram illustrating transmission and reception and a display process example of emergency information.

FIG. 6 is a diagram illustrating a transmission process example of the on-screen message (OnScreenMessage) type emergency information delivery scheme.

The transmitting device 20 such as the broadcasting station carries out delivery of program content corresponding to a plurality of channels (CH1.1 and CH1.2) via, for example, a program delivery path and delivery of signaling data via a signaling transmission path.

The program described with reference to FIG. 5 is a program of the channel (CH1.1), news is broadcast at times t0 to t1, and a baseball relay starts at a time t1.

Thereafter, at a time t2, the transmitting device 20 which is the broadcasting station generates program content in which the emergency information is overlaid on the baseball relay image and delivers the program content to the receiving device 30.

The user (viewer) who is viewing the baseball relay on the receiving device 30 side can check the emergency information overlaid on a baseball relay screen.

However, for example, as described above, in a case where the application presentation object is displayed overlaid (overlay) on the program image in accordance with another broadcasting application being executed in the receiving device 30 or an application executed by the client itself, the user is unable to see the emergency message unless, for example, a process of stopping the display of the application presentation object is executed.

Figure 7:
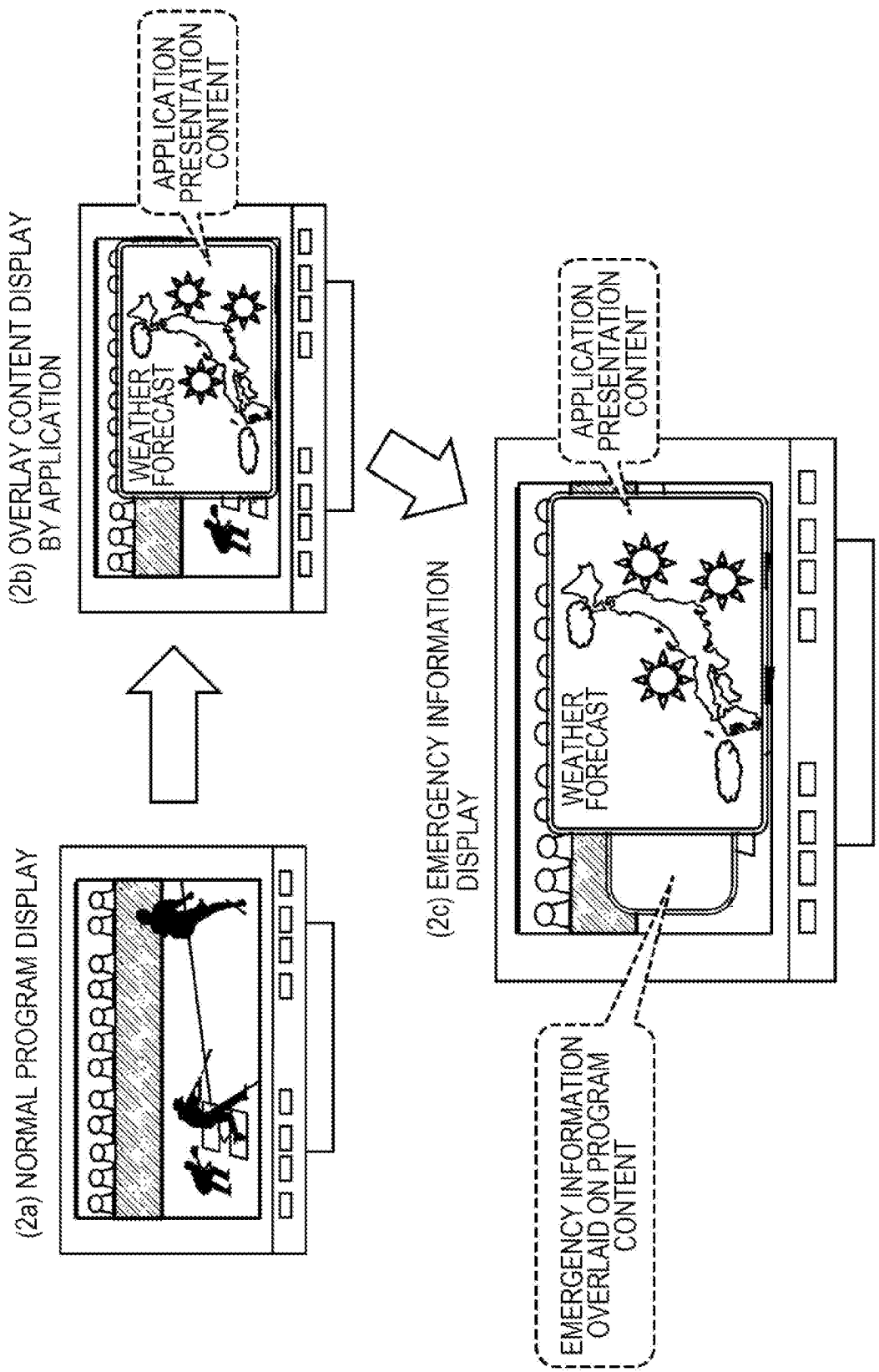
FIG. 7 is a diagram illustrating transmission and reception and a display process example of emergency information.

A specific example is illustrated in FIG. 7.

The example illustrated in FIG. 7 (2b) is an example in which a weather forecast display application is executed while the user (viewer) is watching the baseball relay, and display of weather forecast information is executed.

The weather forecast display application is, for example, an application separately delivered from the broadcasting station in addition to the baseball relay broadcast content, an application in which the client (television) side has acquired as the NRT content in advance, or the like.

As illustrated in FIG. 7(2b), if the receiving device 30 executes the application, and the application presentation content is displayed on a program content display screen, program content of a portion hidden by the application presentation content is unable to be checked.

As illustrated in FIG. 7(2c), in a case where the emergency information is displayed overlaid on the program content, the emergency information is hidden by the application presentation content, and a situation in which the user (viewer) is unable to check it occurs.

Further, as the emergency information delivery scheme, there is an emergency information delivery scheme using signaling data in addition to the on-screen message (OnScreenMessage) type emergency information delivery scheme.

Figure 8:
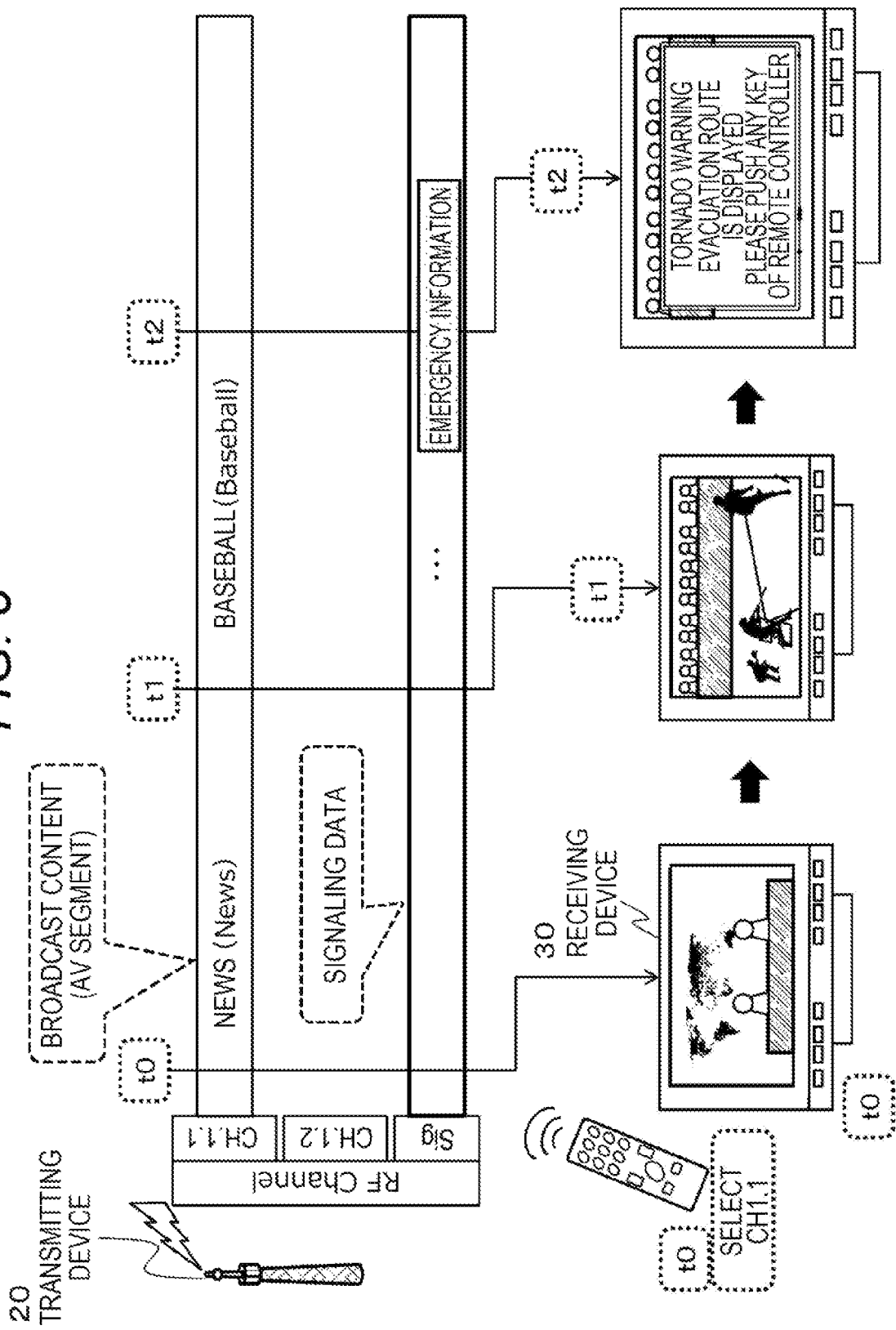
FIG. 8 is a diagram illustrating transmission and reception and a display process example of emergency information.

FIG. 8 illustrates a signaling data application type emergency information delivery scheme.

For example, the transmitting device 20 such as the broadcasting station can transmit the emergency information using a communication route dedicated for signaling data (LLS) which is a different communication route from a normal program delivery route.

The emergency information according to the AEAT or CAP format described above is transmitted in accordance with the signaling data application type emergency information delivery scheme.

The program is a program of the channel (CH1.1), news is broadcast from times t0 to t1, and a baseball relay starts from a time t1.

Thereafter, at a time t2, the transmitting device 20 which is the broadcasting station, generates signaling data (LLS) storing the emergency information and delivers the signaling data (LLS) to the receiving device 30.

The receiving device 30 receives the signaling data and displays the emergency information acquired from the signaling data on a baseball relay display screen.

For example, AEAT or CAP includes data corresponding to position information of the receiving device, for example, control information for providing the evacuation route information, and for example, a process of displaying a map of an evacuation route corresponding to a position of each receiving device can be performed using such information.

Figure 9:
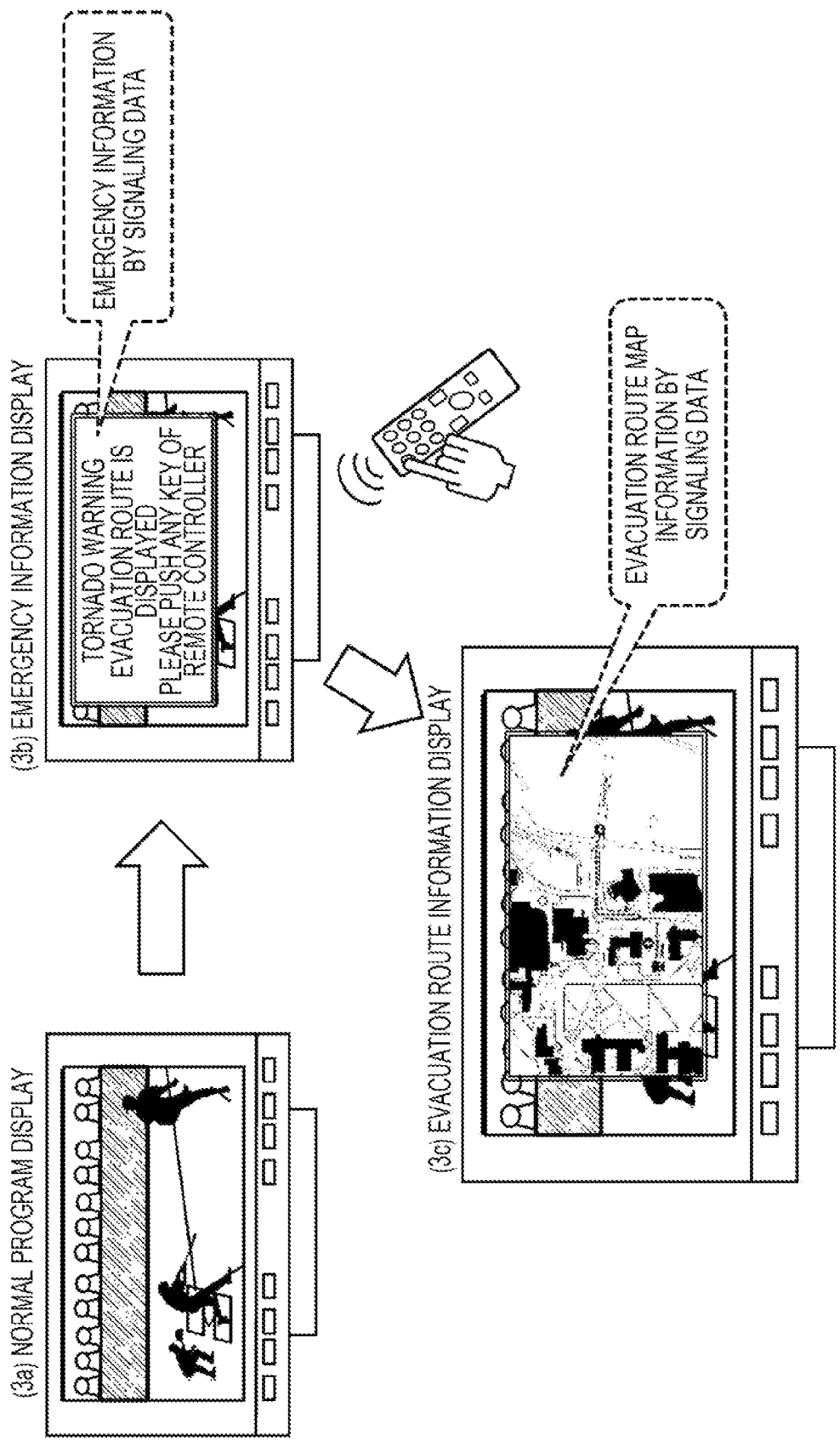
FIG. 9 is a diagram illustrating transmission and reception and a display process example of emergency information.

FIG. 9 illustrates a display example of map information.

Map data illustrated in FIG. 9 (3c) is also transmission data by the signaling data.

For example, detailed information related to various emergency information names such as various emergency information attribute information of the emergency information, for example, a category of the emergency information, a degree of emergency of the emergency information, transmission source information, region information in which it is necessary to give a notification of the emergency information, or the like can be recorded in the signaling data such as AEAT or CAP described above, and the receiving device can analyze the received signaling data, selects necessary information in accordance with, for example, the category or the degree of emergency of the emergency information, a current position of the receiving device, or the like, and output (display) the selected necessary information.

By applying such an information canvas, it is possible to display a map corresponding to the position of the receiving device as illustrated in FIG. 9(3c).

As described with reference to FIGS. 5 to 9, there are the following two types as the emergency information delivery scheme:

(a) the on-screen message (OnScreenMessage) type emergency information delivery scheme; and (b) the signaling data application type emergency information delivery scheme.

However, in the case of the on-screen message (OnScreenMessage) type emergency information delivery scheme, for example, if the receiving device side executes the application, and the application presentation content is displayed, the user (viewer) is unable to check the emergency information.

Further, in the case of the signaling data application scheme described with reference to FIGS. 8 and 9, if the receiving device 30 does not receive the signaling data immediately and perform the display process after the transmission process by the transmitting device 20, the process of checking the emergency information by the user (viewer) is delayed, and the safety of the user may be unable to be secured.

The present disclosure realizes a configuration that prevents the occurrence of such problems and enables the emergency information to be checked by the user (viewer) reliably and immediately (timely).

5. Configuration Example and Process Example of Receiving Device

Next, a configuration example and a process example of the tuner-equipped receiving device (client A) 30 and the tuner-not-equipped receiving device (client B) 40 described with reference to FIG. 1 will be described with reference to FIG. 10 and subsequent drawings.

A broadcasting server 21 transmits an AV segment including broadcast content or the like, signaling data, and other data by broadcast transmission via a broadcast wave or a network.

Although not illustrated, a data delivery server 22 which is a transmitting device other than the broadcasting server 21 also transmits the AV segment including the broadcast content or the like, the signaling data, and other data by the broadcast transmission via the network.

Figure 10:
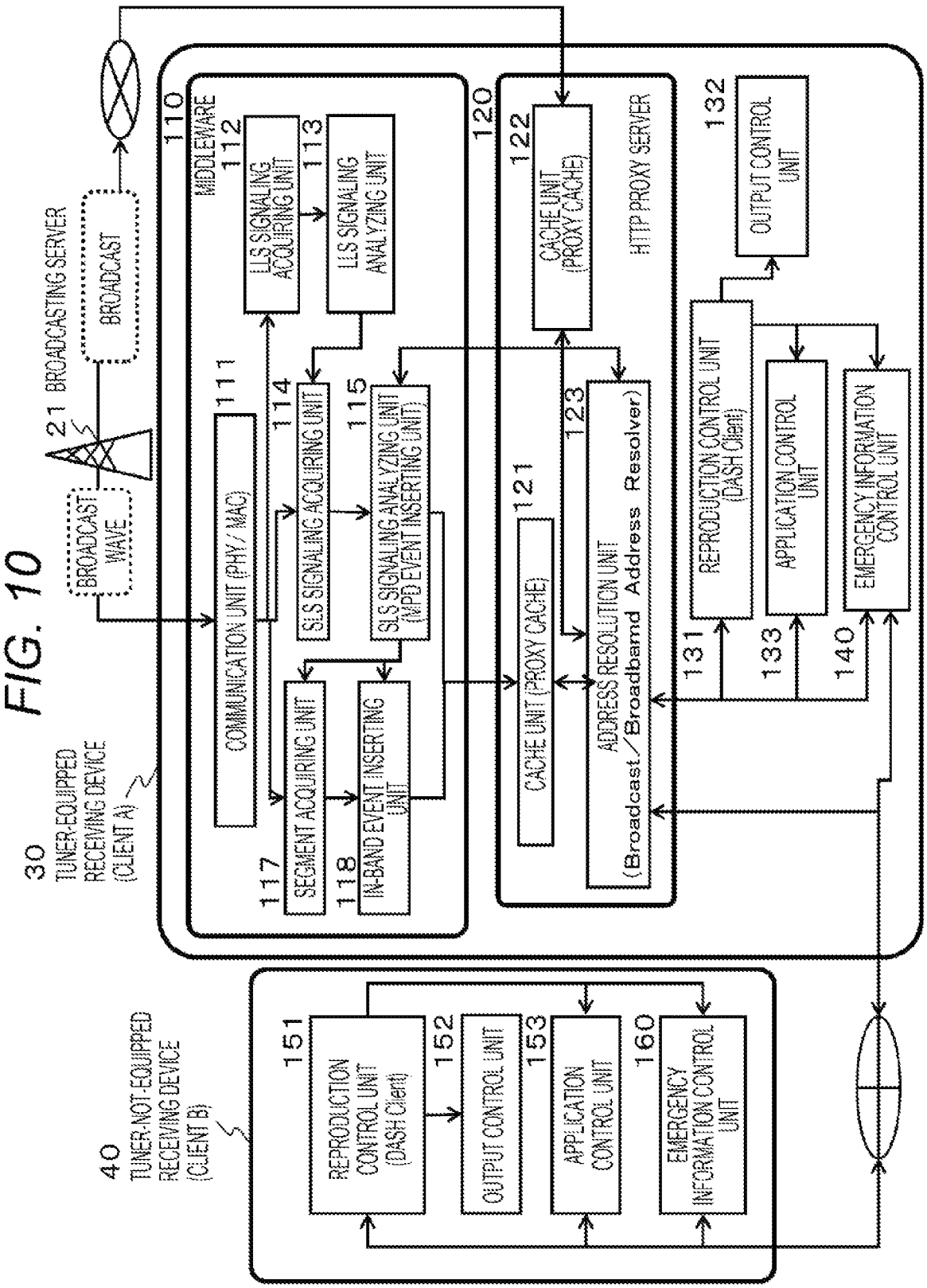
FIG. 10 is a diagram illustrating a configuration example of a receiving device.

As illustrated in FIG. 10, the tuner-equipped receiving device 30 includes middleware 110, an HTTP proxy server 120, a reproduction control unit (DASH client) 131, an output control unit 132, and an application control unit 140.

The middleware 110 receives and analyzes provision data of the broadcasting server 21.

The middleware 110 includes the following components:
a communication unit (PHY/MAC) 111;
an LLS signaling acquiring unit 112;
an LLS signaling analyzing unit 113;
an SLS signaling acquiring unit 114;
an SLS signaling analyzing unit (MPD event inserting unit) 115;
a segment acquiring unit 117; and
an in-band event inserting unit 118.

The communication unit (PHY/MAC) 111 receives the provision data of the broadcasting server 21 via the broadcast wave.

The LLS signaling acquiring unit 112 and the LLS signaling analyzing unit 113 receive and analyze lower layer signaling data (LLS) received via the communication unit 111.

The SLS signaling acquiring unit 114 and the SLS signaling analyzing unit 115 receive and analyze service level signaling data (SLS) received via the communication unit 111.

The segment acquiring unit 117 acquires program content data such as videos or voices, NRT content of an application or the like, and a segment in which data such as the signaling data is stored.

Further, the SLS signaling analyzing unit 115 also functions as an MPD event inserting unit.

The SLS signaling analyzing unit 115 functions as an MPD event inserting unit that executes a process of inserting event information including, for example, information of a process necessary in the receiving device such as notification information of a change or details of a broadcast program or transmission data, information related to an application executed in the receiving device, emergency information-related information, and the like into an MPD.

The in-band event inserting unit 118 executes a process of inserting the event information such as the emergency information into a segment.

Examples of the event information include information to be given in notification to the receiving device such as a change of a program guide, a change of a data form of broadcast content, a process to be executed when the broadcast content is reproduced in the receiving device, information for requesting execution of a certain process, and the like.

In the present embodiment, a configuration that newly sets the event information related to the emergency information or the emergency information-related information as the event information, performs an event notification to which the event information is applied, and causes data processing for realization of prompt and reliable display of the emergency information to be performed in the receiving device is provided.

Specifically, for example, in a case where the application presentation content described above with reference to FIG. 7 is displayed, the event notification is performed by transmitting the event information storing an exclusion process request for the presentation content.

Further, event information storing the emergency information-related information for notifying an issuance situation of the emergency message transmitted as the signaling data or access information is provided to the client so that the emergency information can be acquired and displayed quickly.

A specific process will be described later in detail.

The data received by the middleware 110 is stored in a cache unit (proxy cache) 121 of a proxy server 120. The proxy server 120 further stores the data acquired from the data delivery server 22 via the network in the cache unit (proxy cache) 122.

The proxy server 120 inputs data requests from, for example, reproduction control units (DASH clients) 131 and 151, application control units 133 and 153, emergency information control units 140 and 160, and the like to an address resolution unit 123, acquires the requested data from the cache units (proxy cache) 121 and 122 or the outside, and provides the acquired data.

The reproduction control unit (DASH client) 131 executes reproduction control for content transmitted in accordance with the DASH (MPEG-DASH) standard.

As described above, the MPEG-DASH standard includes the following two standards:
(a) a standard related to a manifest file (MPD) for describing metadata which is a management file of a moving image or an audio file;
(b) a standard related to a file format (segment format) for moving image content transmission.

The content delivery from the transmitting device 20 to the tuner-equipped receiving device 30 is executed in accordance with the MPEG-DASH standard.

For example, the content is transmitted as a segment which is a predetermined unit of divisional data in accordance with the MP4 file format specified in MPEG, and the reproduction control unit (DASH client) 131 executes, for example, a process of acquiring the segment storing the reproduction target content with reference to the manifest file (MPD).

The reproduction control unit (DASH client) 131 further includes an event extracting unit, and extracts, for example, an event stored in an MPD or a segment and notifies the application control unit 133 and the emergency information control unit 140 of the extracted event.

The event information to be given in notification includes, for example, event information including a request for a process to be executed on the receiving device side or information for enabling a process as the emergency information is transmitted from the transmitting device.

A specific example of the process to which the event information is applied will be described in detail later.

The output control unit 132 extracts encoded content from the segment acquired by the reproduction control unit, decodes the extracted encoded content, and outputs the decoded content to an output unit such as a display unit.

For example, the application control unit 133 executes application control such as acquisition of various applications that provide news, player information at the time of baseball relay, map information or hotel information in a travel program or executes a quiz or questionnaire process or the like and the start and the end of applications in addition to the weather forecast application described above.

Further, the application control unit 133 executes, for example, the process of displaying or removing the application presentation content described with reference to FIG. 7 in accordance with the extracted event information of the event extracting unit of the reproduction control unit 131.

The emergency information control unit 140 also executes, for example, the process of acquiring the signaling data application type emergency information described with reference to FIG. 8 in accordance with the event information extracted by the event extracting unit of the reproduction control unit 131.

A process to which the event information is applied will be described later in detail.

Further, the tuner-not-equipped receiving device (client B) 40 illustrated in FIG. 10 is connected to the tuner-equipped receiving device (client A) 30 via a network such as Ethernet (registered trademark), Wi-Fi, or the like and executes communication with the tuner-equipped receiving device (client A) 30.

The tuner-not-equipped receiving device (client B) 40 receives data such as content which is received from the broadcasting server 21 or the data delivery server 22 by the tuner-equipped receiving device (client A) 30 via the tuner-equipped receiving device (client A) 30, and executes content reproduction.

The tuner-not-equipped receiving device (client B) 40 illustrated in FIG. 10 includes the following components:
the reproduction control unit (DASH client) 151;
the output control unit 152;
the application control unit 153; and
the emergency information control unit 160.

These components and functions are similar to the reproduction control unit (DASH client) 131, the output control unit 132, the application control unit 133, and the emergency information control unit 140 described in the tuner-equipped receiving device (client A) 30.

FIG. 11 is a diagram illustrating a detailed configuration of the following components:
the reproduction control unit (DASH client) 131;
the output control unit 132;
the application control unit 133; and
the emergency information control unit 140;
included in the tuner-equipped receiving device (client A) 30, and
the reproduction control unit (DASH client) 151;
the output control unit 152;
the application control unit 153; and
the emergency information control unit 160 included in the tuner-not-equipped receiving device (client B) 40.

The reproduction control unit (DASH client) 131 of the tuner-equipped receiving device (client A) 30 includes an MPD acquiring unit 201, an MPD analyzing unit 202, a segment acquiring unit 203, a segment (MP4) analyzing unit 204, and an event extracting unit 205.

The reproduction control unit (DASH client) 131 executes reproduction control for content transmitted in accordance with the DASH (MPEG-DASH) standard as described above.

The MPD acquiring unit 201 acquires the manifest file (MPD) which is a management file description file of a moving image or an audio file.

The MPD is provided from the broadcasting server 21 or the data delivery server 22, stored in the proxy server 120, and then acquired by the reproduction control unit 131.

The MPD analyzing unit 202 analyzes description content of the MPD acquired by the MPD acquiring unit 201 and provides information or the like necessary for acquisition of a segment corresponding to reproduction target data to the segment acquiring unit.

Further, in a case where the event information is included in the MPD, the MPD analyzing unit 202 outputs the MPD to the event extracting unit 205.

The event extracting unit 205 analyzes the event information recorded in the MPD, and determines whether the event information is event information indicating any one of the following notification data:

(a) the on-screen message (OnScreenMessage) type emergency information is delivered; and (b) the signaling data application type emergency information is delivered.

In a case where it is determined that the event information is the event information indicating "(a) the on-screen message (OnScreenMessage) type emergency information is delivered", the event extracting unit 205 outputs the event information to the application control unit 133.

On the other hand, in a case where it is determined that the event information is the event information indicating "(b) the signaling data application type emergency information is delivered", the event extracting unit 205 outputs the event information to the emergency information control unit 140 or the application control unit 133.

If the event information indicating "(a) the on-screen message (OnScreenMessage) type emergency information is delivered" is input from the event extracting unit 205, the application control unit 133 checks the application execution state, and executes the process of removing the application presentation content, for example, in a case where the application presentation content described with reference to FIG. 7 is presented on the program content.

With this process, in a case where the on-screen message (OnScreenMessage) type emergency information is delivered, it is possible to cause the user to view the emergency information reliably.

On the other hand, if the event information indicating "(b) the signaling data application type emergency information is delivered" is input from the event extracting unit 205, the emergency information control unit 140 reliably acquires the signaling data (the signaling data such as AEAT, CAP, or the like) using the emergency information stored in the input event information or the access information of the emergency information, and performs output control for the display unit.

With this process, in a case where the signaling data application type emergency information is delivered, it is possible to immediately acquire the emergency information and cause the user to view the emergency information reliably.

Further, the application control unit 133 can also execute a process as the emergency information control unit 140, and in this case, the event extracting unit 205 outputs the event information indicating "(b) the signaling data application type emergency information is delivered" to the application control unit 133.

The segment acquiring unit 203 acquires a segment corresponding to reproduction target data in accordance with an MPD analysis result of the MPD analyzing unit 202.

The segment is data of a predetermined unit which is set in accordance with a file format (segment format) for content transmission including AV data.

The segment analyzing unit 204 acquires encoded image data, encoded audio data, or the like from the segment acquired by the segment acquiring unit 203, and outputs the encoded image data, the encoded audio data, or the like to the decoding unit (decoder) 211 of the output control unit 132.

Further, in a case where the event information is included in the segment, the segment analyzing unit 204 outputs the segment to the event extracting unit 205.

The event extracting unit 205 analyzes the event information stored in the segment, and determines whether the event information is event information indicating any one of the following notification data:

(a) the on-screen message (OnScreenMessage) type emergency information is delivered; and (b) the signaling data application type emergency information is delivered.

In a case where it is determined that the event information is the event information indicating "(a) the on-screen message (OnScreenMessage) type emergency information is delivered", the event extracting unit 205 outputs the event information to the application control unit 133.

On the other hand, in a case where it is determined that the event information is the event information indicating "(b) the signaling data application type emergency information is delivered", the event extracting unit 205 outputs the event information to the emergency information control unit 140 or the application control unit 133.

The processes of the application control unit 133 that has received the event information and the emergency information control unit 140 are similar to the processes in a case where the MPD storage event information described above is received.

The output control unit 132 of the tuner-equipped receiving device (client A) 30 includes a decoding unit (decoder) 211 and an output unit (renderer) 212.

The decoding unit (decoder) 211 executes a decoding process (decoding) on the encoded image data and the encoded audio data provided from the segment analyzing unit 204.

The output unit 212 outputs the decoded image data and audio data to the output unit (a display and a speaker).

Further, the reproduction control unit (DASH client) 151 of the tuner-not-equipped receiving device (client B) 40 also includes an MPD acquiring unit 251, an MPD analyzing unit 252, a segment acquiring unit 253, a segment (MP4) analyzing unit 254, and an event extracting unit 255.

Further, the output control unit 152 includes a decoding unit (decoder) 261 and an output unit (renderer) 262.

These components and processes to be executed are similar to those of the tuner-equipped receiving device (client A) 30.

Further, the MPD and the segment are input to the reproduction control unit (DASH client) 151 of the tuner-not-equipped receiving device (client B) 40 via the proxy server 120 of the tuner-equipped receiving device (client A) 30 and the network.

Further, an application file is input to the application control unit 153 of the tuner-not-equipped receiving device (client B) 40 via the proxy server 120 of the tuner-equipped receiving device (client A) 30 and the network.

Each of the reproduction control units (DASH clients) 131 and 151 of the tuner-equipped receiving device (client A) 30 and the tuner-not-equipped receiving device (client B) 40 is an execution unit of an ATSC3.0 client application (3.0 DASH client).

The ATSC3.0 client application is executed on a browser installed in an ATSC3.0 broadcast receiving client device. Alternatively, the ATSC3.0 client application may be executed as a native application in addition to a browser application.

The ATSC3.0 client applications executed by the reproduction control units (DASH clients) 131 and 151 include an ATSC3.0 DASH client application (3.0 DASH client), an ATSC3.0 stream associated application (3.0 Application), or the like.

Further, an application manager ("3.0 Application Manager"), an AEAT message renderer application ("CAP Message Renderer"), and the like that perform life cycle control of a web application are included as those implemented as native applications.

The ATSC3.0 client applications of the reproduction control units (DASH clients) 131 and 151 and the output control units 132 and 152 process data received by the middleware (Client Local ATSC Middleware) 110 and data received via the network by the proxy server (Client Local HTTP Proxy Server) 120.

The DASH-MPD file, the DASH segment (segment) file, other general application files, and an SLS file storing the signaling data which are acquired by the middleware 110 or the proxy server 120 are input, and rendering of streams or control of applications is performed.

In this model, since the ATSC3.0 client applications executed by the reproduction control units (DASH clients) 131 and 151 or the application executed by the application control unit 160 necessarily access the outside world via the proxy server 120, it is not aware of a distinction of whether this file group is acquired via broadcasting or a network (network transparency is provided), and thus the portability of the application can be increased.

Therefore, it is not necessary to implement an application specialized only for broadcasting, and an implementation can be made regardless of which of broadcasting and the Internet is used.

If the ATSC3.0 client applications executed by the reproduction control units (DASH clients) 131 and 151 make a request (HTTP request) for acquisition of the DASH-MPD file, the DASH segment (segment) file, other general application files, and signaling data files, the proxy server 120 which has received the request determines whether the files are acquired via the broadcast reception stack or via the network in the address resolution unit (Broadcast/Broadband Address Resolver) 123.

Information serving as a determination material is provided from the SLS signaling analyzing unit (SLS Signaling Parser) 115. The SLS signaling analyzing unit (SLS Signaling Parser) 115 transmits an acquisition request for USBD/USD, S-TSID, or the like which is a signaling meta of ATSC3.0 to the SLS signaling acquiring unit (SLS Signaling Retriever) 114.

The SLS signaling acquiring unit (SLS Signaling Retriever) 114 extracts the signaling meta carried by an SLS LCT packet which is broadcast-received via the communication unit (ATSC tuner: ATSC3.0 PHY/MAC) 111.

Further, the SLS signaling analyzing unit (SLS Signaling Parser) 114 extracts the signaling meta from a url included in the acquisition request for a segment or an application part, and resolves broadcasting delivery address information for acquiring a target file. If it is known that it is broadcast-delivered, an LCT packet storing a desired file is acquired from a broadcast stream on the basis of the broadcasting delivery address information and developed into the cache (Proxy Cache) units 121 and 122. The proxy server 120 transmits the file to the reproduction control unit 131 or the application control unit 140 as a response (as an HTTP response). If there is no signaling meta at the url included in the acquisition request for the application part, the proxy server 120 acquires the file via a normal network stack.

In the configuration of the present disclosure, the SLS signaling analyzing unit (SLS Signaling Parser) 114 also functions as an MPD event inserting unit (MPD Event Inserter).

The MPD event is one of DASH events.

The DASH event is a mechanism that transfers or controls an event scheduled in advance or an event whose schedule is not been decided (an event activation time is unknown) in a protocol of streaming in accordance with the MPD of DASH or the DASH segment.

Further, there are the following two types as a DASH event transfer scheme:

(a) an MPD-applied event notification scheme for inserting the event information into the MPD which is the signaling data and transferring the resulting MPD; and (b) a segment-applied (In-band) event notification scheme for inserting the event information into the segment and transferring the resulting segment.

A component that inserts the event information into the MPD which is the signaling data and transfers the resulting MPD is the MPD event inserting unit in the SLS signaling analyzing unit 115, and a component that inserts the event information into the segment and transfers the resulting segment is the in-band event inserting unit 118.

For example, the following notification information is transmitted to the receiving device using the signaling data (LLS) transmitted from the broadcasting server 21:

(a) a notification indicating that the on-screen message (OnScreenMessage) type emergency information is delivered (On Screen Message Notification); and (b) a notification indicating that the signaling data application type emergency information (AEAT, CAP, or the like) is delivered (AEAT Message Notification).

Further, an embodiment to be described below will be described using the AEAT as a representative example of the signaling data application type emergency information.

Here, the process of the present disclosure is not limited to the AEAT, but a similar process can be performed on various signaling data application type emergency information having a data format other than the AEAT.

Further, the data format of the AEAT will be described later.

The LLS signaling acquiring unit 112 and the LLS signaling analyzing unit 113 of the middleware 110 of the tuner-equipped receiving device 30 extract the notification related to the emergency information from the signaling data (LLS) transmitted from the transmitting device such as the broadcasting server 21.

The extracted notification data is input to the MPD event inserting unit in the SLS signaling analyzing unit 115.

The MPD event inserting unit in the SLS signaling analyzing unit 115 inserts the notification data into the MPD, and the in-band event inserting unit 118 inserts the notification into the segment.

The MPD and the segment into which the event information is inserted are input to, for example, the reproduction control units (DASH clients) 131 and 151 via the cache unit 121.

6. Emergency Information Delivery Notification Process to which Signaling Data is Applied As described above, the transmitting device 20 such as the broadcasting server 21 transmits the following notification information to the receiving device using the signaling data (LLS):

(a) the on-screen message type emergency information delivery notification (On Screen Message Notification); and (b) the signaling data application type emergency information delivery notification (AEAT Message Notification).

A configuration of the emergency information delivery notification process using this signaling (LLS) will be described below.

As described above with reference to FIG. 3, there are different types of signaling data using the following two different layers:

the LLS; and the SLS.

The SLS is signaling data in which control information, guide information, metadata, and the like of each service unit, for example, each program unit are stored.

The LLS is signaling data in which control information, guide information, metadata, and the like higher than those of the SLS are stored, and includes, for example, information for acquiring the SLS and the like.

A component that executes the process of acquiring and analyzing the signaling data such as the LLS or the SLS is the middleware 110 of the tuner-equipped receiving device 30 illustrated in FIG. 10.

The LLS signaling acquiring unit 112 and the LLS signaling analyzing unit 113 of the middleware 110 illustrated in FIG. 10 execute the process of acquiring and analyzing the LLS.

Further, the SLS signaling acquiring unit 114 of the middleware 110 and the SLS signaling analyzing unit (MPD event inserting unit) 115 illustrated in FIG. 10 execute acquisition and analysis processes of SLS (service level signaling).

The LLS signaling acquiring unit 112, the LLS signaling analyzing unit 113, the SLS signaling acquiring unit 114, and the SLS signaling analyzing unit (MPD event inserting unit) 115 of the middleware 110 illustrated in FIG. 10 constantly monitor the signaling data transmitted from the transmitting device 20, and immediately performs acquisition and analysis in a case where unprocessed signaling data is detected.

Further, as described above, the transmitting device 20 repeatedly transmits the signaling data, and the middleware 110 can acquire and analyze new signaling data without causing a large delay.

As described above, the following emergency information delivery notification data may be included in the LLS which is the signaling data transmitted by the transmitting device 20:

(a) the on-screen message type emergency information delivery notification data (On Screen Message Notification); and (b) the signaling data application type emergency information delivery notification data (AEAT Message Notification).

A configuration of an emergency information delivery notification process using this signaling data (LLS) will be described below.

A detailed configuration example of the signaling data (LLS) including the emergency information delivery notification data of (a) and (b) will be described with reference to FIGS. 12 and 13.

FIG. 12 illustrates a detailed configuration example of the signaling data (LLS) including "(a) the on-screen message type emergency information delivery notification data (On Screen Message Notification)".

The on-screen message type emergency information delivery notification data is described as XML data.

Data illustrated in FIG. 12 is a hierarchical configuration diagram of XML data illustrating XML data as a hierarchical configuration.

As illustrated in FIG. 12, for example, the following data is included in the on-screen message type emergency information delivery notification data:

(1) an emergency information-applied broadcast stream identifier;

(2) an emergency information application target service identifier;

(3) a screen clear execution target service identifier range;

(4) a screen clear execution period; and (5) a screen clear process necessity flag.

A screen clear process is a process of stopping display of overlay content on a screen such as the application presentation content described with reference to FIG. 7 and setting the broadcast content to be viewable.

On the other hand, FIG. 13 illustrates a detailed configuration example of "(b) signaling data application type emergency information delivery notification data (AEAT Message Notification)".

The signaling data application type emergency information delivery notification data is also described as the XML data.

Data illustrated in FIG. 13 is a hierarchical configuration diagram of XML data illustrating XML data as a hierarchical configuration.

As illustrated in FIG. 13, for example, the following data is included in the signaling data application type emergency information delivery notification data:

(1) an identifier, an issuer, priority information, and the like of the emergency information or the like;

(2) a validity period, a type, application region information, and the like of the emergency information;

(3) an emergency information message or the like; and (4) media information: data such as emergency information corresponding to each language and a map, access information of data, and the like.

For example, the middleware 110 of the tuner-equipped receiving device 30 illustrated in FIGS. 10 and 11 can detect that the following notifications have been performed without delay by acquiring and analyzing the signaling data (LLS) including the emergency information-related data illustrated in FIGS. 12 and 13:

(a) the on-screen message type emergency information delivery notification (On Screen Message Notification); and (b) the signaling data application type emergency information delivery notification (AEAT Message Notification).

However, components that execute the reproduction process for the program content transmitted by the transmitting device 20 such as the broadcasting server 21 are the reproduction control units (DASH clients) 131 and 151 of the tuner-equipped receiving device 30 and the tuner-not-equipped receiving device 40 illustrated in FIGS. 10 and 11. Further, components that execute the presentation process for the application presentation content described with reference to FIG. 7 are the application control units 133 and 153 of the tuner-equipped receiving device 30 and the tuner-not-equipped receiving device 40 illustrated in FIGS. 10 and 11.

Therefore, the deletion process for the application presentation content and the display process for the emergency information are unable to be executed unless the reproduction control units (DASH clients) 131 and 151 or the application control units 133 and 153 detect that the emergency information delivery notifications (a) and (b) have been performed.

In the process of the present disclosure, the following notification information given in notification by signaling data (LLS), that is, the following emergency information delivery notifications are promptly transferred from the middleware to the reproduction control units (DASH clients) 131 and 151 and the application control units 133 and 153 so that the processes corresponding to these notifications can be executed without delay:

(a) the on-screen message type emergency information delivery notification (On Screen Message Notification); and (b) the signaling data application type emergency information delivery notification (AEAT Message Notification).

To this end, for example, the process using the event notification mechanism is executed.

Usually, the reproduction control units (DASH clients) 131 and 151 continuously perform acquisition of the DASH segment storing the reproduction data such as images or audios which are the configuration data of the program content in accordance with the HTTP.

Therefore, once a streaming reproduction is started, the DASH client continuously performs the HTTP acquisition/reproduction process.

In other words, the reproduction control units (DASH clients) 131 and 151 execute a pull type communication session constantly connected with the middleware 110 or the proxy server 120 that executes a function of the DASH server that provides the DASH segment, acquire necessary data, and perform the reproduction process, for example, the output of the broadcast content.

In this segment acquisition session, it is a problem to cause an update event notification of certain signaling or signaling itself to be transmitted.

In the process of the present disclosure, a configuration in which the emergency information delivery notification according to the signaling data (LLS), that is, the following notification information is provided to the reproduction control units (DASH clients) 131 and 151 or the application control units 133 and 153 of the tuner-equipped receiving device 30 or the tuner-not-equipped receiving device 40 illustrated in FIGS. 10 and 11 without delay using the mechanism of the event specified in DASH:

(a) the on-screen message type emergency information delivery notification (On Screen Message Notification); and (b) the signaling data application type emergency information delivery notification (AEAT Message Notification).

With the process of the present disclosure, it is possible to perform the exclusion process for the application presentation data overlaid on the emergency message displayed on the moving image screen while causing the client application such as the DASH player or the AEAT parser & viewer running on another device connected with the device including the ATSC3.0 broadcast reception middleware via the network (the home network (a LAN, WiFi, or the like) at home, WiFi or the like at a hotspot, or the like) to be synchronized with the stream, for example, it is possible to provide and output the emergency information or the additional information such as the map information transmitted separately from the moving image stream such as the AEAT without delay.

7. Event Notification Configuration

Next, an event notification configuration specified in the DASH standard will be described.

In the DASH standard, an event notification mechanism called a DASH event is defined.

For example, the event notification mechanism is a mechanism for giving a notification of various event information such as notification information of a change or details of a broadcast program or transmission data, information related to an application executed in the receiving device, information to be given in notification to the receiving device, information of a process necessary in the receiving device, or the like.

In the DASH standard, the following two types of event notification schemes are defined as the event notification mechanism:

(a) an MPD-applied event notification scheme (=MPD Event); and (b) a segment-applied event notification scheme (=In-band Event Signaling).

These two types of event notification schemes are defined.

The two event notification schemes will be sequentially described below in detail.

[7-1. MPD-Applied Event Notification Scheme (=MPD Event)]

The MPD-applied event notification scheme (=MPD Event) is a scheme of giving a notification of an event by using an MPD which is one of signaling data specified in the DASH standard.

In the MPD-applied event notification scheme (=MPD Event), an event element, specifically, an event stream (EventStream)) indicating an event type or event content can be added in units of periods which can be specified in the MPD, for example.

With the MPD-applied event notification scheme (=MPD Event), it is possible to provide the client with information necessary for an event process in units of periods using the MPD.

Specifically, in the MPD-applied event notification scheme (=MPD Event), the following information can be described in the MPD:

(a) an event schedule such as activation (Start/Execute/Activation) timings of various events;

(b) an event process to be performed by the client (the receiving device) at each timing; and (c) data or the like to be transferred to an application running on the client when an event is executed.

FIG. 14 is a diagram illustrating the MPD format.

The MPD has a configuration capable of describing information such as an attribute and control information in the following specified range unit for each stream of each image or each audio:

(1) a period specifying an interval on a time axis;

(2) adaptation specifying a data type or the like of an image, an audio, or the like;

(3) a representation specifying an image type, an audio type, or the like; and (4) segment information (SegmentInfo) serving as an information recording area of each segment (AV segment) of an image or an audio.

FIG. 15 is a diagram illustrating information (the control information, the management file, the attribute information, and the like) corresponding to the AV segment recorded in the MPD which is chronological developed.

Time passes from left to right. For example, the time axis corresponds to a reproduction time of AV content in the receiving device.

Various information corresponding to the AV segment is recorded in the MPD. Further, the MPD is a part of the signaling data, and is transmitted before, for example, the AV segment.

As described with reference to FIG. 14, information can be recorded in the MPD in the following data units:

(1) a period specifying an interval on a time axis;

(2) adaptation specifying a data type or the like of an image, an audio, or the like;

(3) a representation specifying an image type, an audio type, or the like; and (4) segment information (SegmentInfo) serving as an information recording area of each segment (AV segment) of an image or an audio.

FIG. 15 is a diagram illustrating the data areas which are developed on the time axis in accordance with each data type.

FIG. 15 illustrates the following two adaptations:

(V) an adaptation V (Adaptation (V)) which is an image corresponding information recording area; and (A) an adaptation A (Adaptation (A)) which is an audio corresponding information recording area.

(V) The adaptation V (Adaptation (V)) which is an image corresponding information recording area includes the following two representations as information recording areas of stream units having different attributes:

(V1) a representation (V1) (Representation (V1)) which is an information recording area corresponding to a low bit rate image; and (V2) a representation (V2) (Representation (V2)) which is an information recording area corresponding to a high bit rate image.

Similarly, (A) the adaptation A (adaptation (A)) which is an audio corresponding information recording area includes the following two representations as information recording areas of stream units having different attributes:

(A1) a representation (A1) (Representation (A1)) which is an information recording area corresponding to an audio in Japanese; and (A2) a representation (A2) (Representation (A2)) which is an information recording area corresponding to an audio in English.

Further, each representation has a configuration in which information can be recorded in units of periods corresponding to the reproduction time axis and further in units of segments.

For example, the receiving device (client) that selects and reproduces the high bit rate image and an audio in Japanese selects and acquires information related to the high bit rate image serving as the reproduction target and the audio in Japanese from MPD when reproducing a segment (11) of a period 1.

Recording information of the MPD to be selected is information of segment areas 301 and 302 illustrated in FIG. 15.

As described above, the receiving device selects and refers only to information corresponding to data (segment) serving as the reproduction target in its own device from the MPD transmitted from the transmitting device as the signaling data.

As described above, the segment corresponding information of the data type and the time unit can be recorded in the MPD.

For example, the event notification for giving a notification of various processing requests in the receiving device (client) can also be recorded in the MPD.

FIG. 16 is a diagram illustrating a description example of the MPD in a case where the event notification using the MPD, that is, the MPD-applied event notification scheme (=MPD Event) is applied.

The MPD including event information has, for example, the following description.

```
<MPD availabilityStartTime="2011-12-25T12:30:00
<Period startTime='0'>
...
<EventStream schemeIdUri='urn:xxx' timescale='1000'>
<Event presentationTime='0' duration='1000'> event
 data 1</Event>
<Event presentationTime='1000' duration='4000'>event
 data 2</Event>
....
</EventStream>
...
<AdaptationSet>
<Representation/>
<Representation/>
</AdaptationSet>
...
</Period>
</MPD>
```

Data content of the above MPD will be described.

<MPD availabilityStartTime="2011-12-25 T12:30:00

This data record recording area is a recording area of start time information of a first period corresponding to data recorded in the MPD. For example, an UTC time is used as the time information.

<Period startTime='0'>

This data record recording area is a period start time information recording area.

An offset time from the start time (MPD/@availabilityStartTime) specified in the MPD is recorded.

<EventStream schemeIdUri='urn:xxx' timescale='1000'>

This data record recording area is a recording area of event stream designation information indicating an event type or the like and time scale information.

The event type or the like is defined by "EventStream schemeIdUri'urn:xxx" and optional "EventStream/@value".

Further, "timescale='1000'" indicates that a unit time of a presentation time (presentationTime) to be recorded below is ⅟1000 seconds.

<Event presentationTime='0' duration='1000'>event data 1</Event>

This data record recording area is a recording area of event data and event scheduling data such as an activation (execution start or the like) time and a duration of an event.

The event data includes substantive data, metadata, data such as a command, or the like necessary for executing an event, access information thereof, or the like.

Further, the activation (execution start or the like) time and the duration of the event are recorded.

In this example, it is designated that an event specified by event data 1 is continued for 1000 unit times at the activation (activation/execution) time=0.

<Event presentationTime='1000' duration='4000'>event data 1</Event>

This data record recording area is also a recording area of event data and event scheduling data such as an activation (execution start or the like) time and a duration of an event.

The event data includes substantive data, metadata, data such as a command, or the like necessary for executing an event, access information thereof, or the like Further, the activation (execution start or the like) time and the duration of the event are recorded.

In this example, it is designated that an event specified by event data 2 is continued for 4000 unit times at the activation (activation/execution) time=1000.

The following recording areas are an data recording areas in which information of each data type is recorded.

<AdaptationSet>
<Representation/>
<Representation/>

As described above, in the event notification using the MPD, that is, the MPD-applied event notification scheme (MPD Event), the event type is defined by the EventStream/@schemeIdUri (and optional EventStream/@value) attribute, and it is possible to add the event data, that is, the substantive data, the metadata, the data such as a command, or the like necessary for executing the event, the access information thereof, or the like to a content part of the EventStream/Event element.

Further, a format of the "event data" (what should be stored) stored as a data element below MPD/Period/EventStream/Event is specified (defined) by a value of the "EventStream/@schemeIdUri" attribute (urn:xxx in the example of FIG. 16).

Further, the MPD-applied event notification scheme (MPD Event) can be applied only in a case where the content of the period described in the MPD can be decided before the MPD is transmitted.

Figure 17:
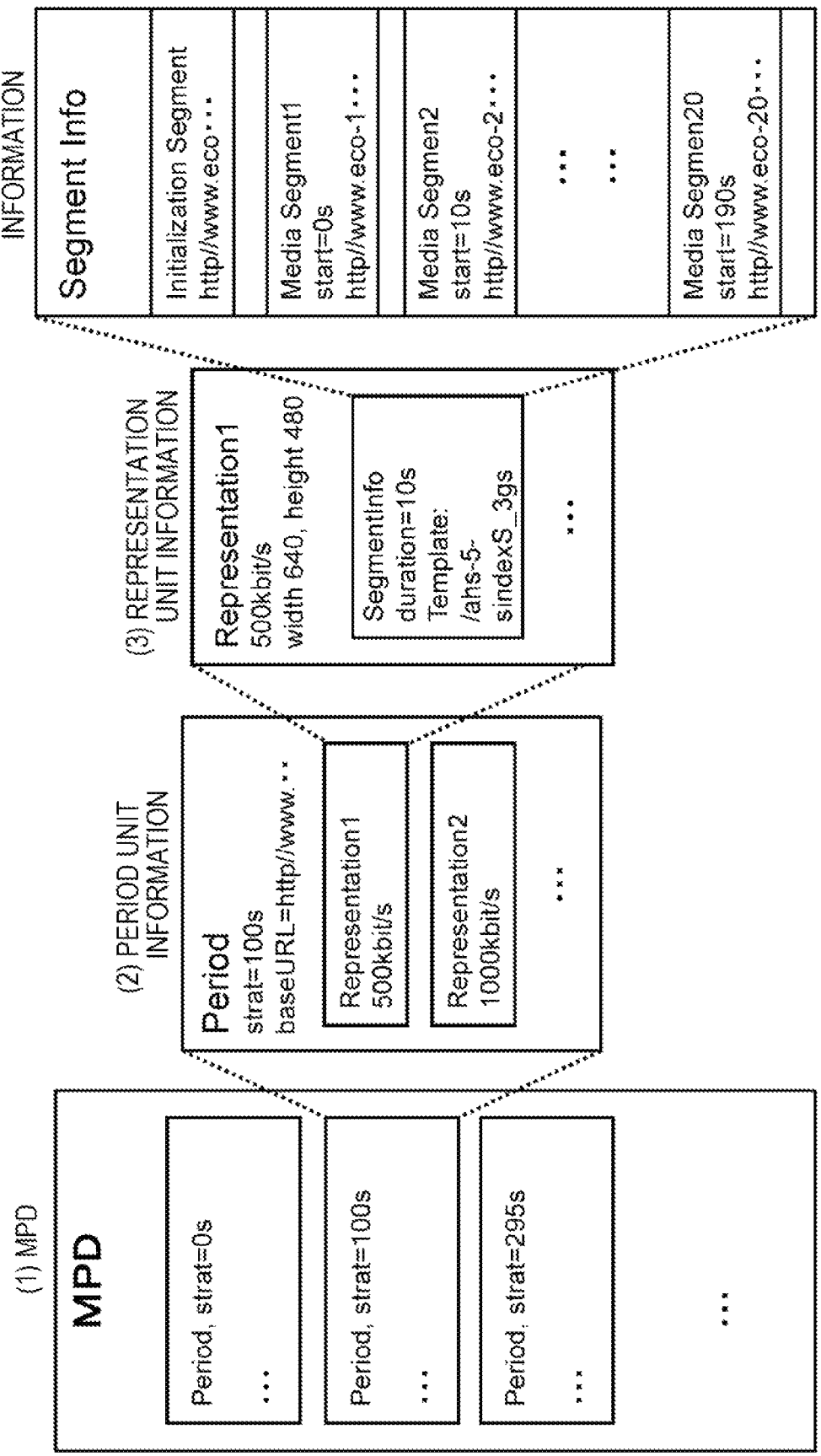
FIG. 17 is a diagram for describing an example of a usage sequence of an MPD.

FIG. 17 is a diagram for describing a procedure of the analysis process (parse) of the MPD executed in the receiving device.

FIG. 17 illustrates the following drawings:

(1) an MPD;
(2) period unit information;
(3) representation unit information; and
(4) segment unit information.

The receiving device (client) which receives the AV segment and executes the reproduction process for the AV content acquire the MPD included in the signaling data previously received before the AV segment is received and acquires information corresponding to data to be reproduced in its own device from the MPD.

First, (2) the period unit information of information) of a specific period corresponding to an AV segment reproduction time is selected from (1) the MPD illustrated in FIG. 17.

Further, the representation unit information corresponding to the type of data to be reproduced in its own device (client) is selected, and (4) the segment unit information corresponding to the reproduction target segment is further selected.

It is possible to acquire the AV segment serving as the reproduction target and acquire various information necessary for AV segment reproduction with reference to data recorded in (4) the segment unit information.

In a case where the event information is recorded in the segment unit information of the received MPD, the receiving device (client) performs, for example, activation (an event activation process such as execution, start or the like) on a designated event in accordance with the recorded event information.

Configurations and process examples of an event insertion executing device 310 that generates (or acquires) and outputs the MPD in which the event information is recorded and an event executing device 320 that receives an event recording MPD and executes the process corresponding to the MPD-recorded event information will be described with reference to FIG. 18.

Figure 18:
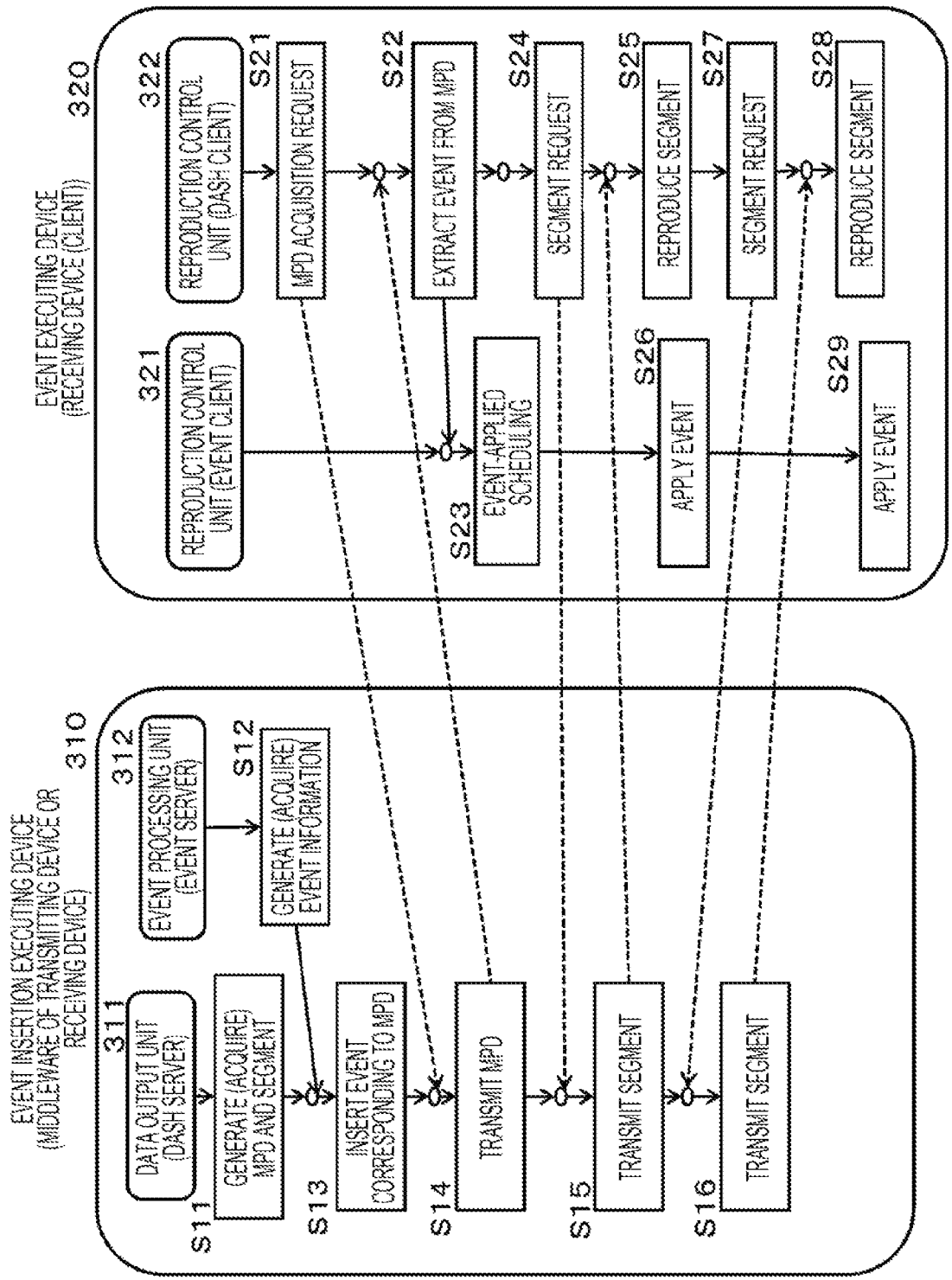
FIG. 18 is a diagram for describing generation, transmission, and usage sequences of event information.

In FIG. 18, the event insertion executing device 310 that generates (or acquires) and outputs the MPD in which the event information is recorded is illustrated on the left side Further, the event executing device 320 that receives MPD in which the event information is recorded and executes a process (event activation) corresponding to the event information recorded in the MPD is illustrated on the right side of FIG. 18.

Specifically, the event insertion executing device 310 is the middleware 110 (the middleware 110 illustrated in FIGS. 10 and 11) that receives the signaling data such as the MPD or the AV segment in the broadcasting server 21 that transmits the signaling data such as the MPD or the AV segment, the data delivery server 22, or the receiving device and outputs the signaling data or the AV segment to the reproduction control unit 131 of the receiving device.

Further, specifically, the event executing device 320 illustrated on the right side of FIG. 18 is the reproduction control unit of the receiving device that receives the signaling data such as the MPD or the AV segment and executes the content reproduction process (the reproduction control units 131 and 151 illustrated in FIGS. 10 and 11).

A process executed by the event insertion executing device 310 will be described.

The event insertion executing device 310 includes a data output unit (DASH server) 311 and an event processing unit (event server) 312.

Further, such server functions are functions provided by the broadcasting server 21 that transmits the signaling data such as the MPD or the AV segment, the data delivery server 22, and the middleware 110 of the receiving device (the middleware 110 illustrated in FIGS. 10 and 11).

Respective processing steps of the process executed by the event insertion executing device 310 will be described below.

(Step S11)

First, in step S11, the data output unit (DASH server) 311 of the event insertion executing device 310 generates or acquires the MPD serving as the signaling data and a segment including AV data constituting reproduction content.

In a case where the event insertion executing device 310 is the broadcasting server 21 or the data delivery server 22, a process of generating or acquiring the MPD and the segment is performed.

In a case where the event insertion executing device 310 is the middleware 110 of the receiving device (the middleware 110 illustrated in FIGS. 10 and 11), a process of acquiring the MPD and the segment from the received data is performed.

(Step S12)

Then, in step S12, the event processing unit (event server) 312 of the event insertion executing device 310 generates or acquires the event information.

For example, the event information is information for giving a notification or a request indicating execution of a certain process to the receiving device such as a change of a program guide, a change of a data form of broadcast content, a process to be executed when the broadcast content is reproduced in the receiving device.

In a case where the event insertion executing device 310 is the broadcasting server 21 or the data delivery server 22, a process for generating or acquiring the event information is performed.

In a case where the event insertion executing device 310 is the middleware 110 of the receiving device (the middleware 110 illustrated in FIGS. 10 and 11), a process of acquiring the event information from the received data is performed.

(Step S13)

Then, in step S13, the data output unit (DASH server) 311 of the event insertion executing device 310 inserts the event information into the MPD serving as the signaling data.

With this process, the event information recording MPD described above with reference to FIG. 16 is generated.

A type or content of an event, the activation time of an event, the duration information, and the like are recorded in the event information recording MPD illustrated in FIG. 16 as described above.

The receiving device can perform, for example, a process of activating (for example, executing) a designated event in a designated period of time in accordance with the event information recorded in this MPD and causing it to be continued during a designated duration.

(Step S14)

Then, in step S14, the data output unit (DASH server) 311 of the event insertion executing device 310 transmits (outputs) the event information recording MPD in which the event information is recorded in the MPD serving as the signaling data.

In a case where the event insertion executing device 310 is the broadcasting server 21 or the data delivery server 22, the event information recording MPD is transmitted via the broadcast wave or the network.

In a case where the event insertion executing device 310 is the middleware 110 of the receiving device (the middleware 110 illustrated in FIGS. 10 and 11), the event information recording MPD is output to the proxy server or the reproduction control unit.

(Steps S15 to S16)

Then, in steps S15 to S16, the data output unit (DASH server) 311 of the event insertion executing device 310 transmits (outputs) the segment storing the AV content or the like.

The segment transmission is continuously executed from step S16.

In a case where the event insertion executing device 310 is the broadcasting server 21 or the data delivery server 22, the segment is transmitted via the broadcast wave or the network.

In a case where the event insertion executing device 310 is the middleware 110 of the receiving device (the middleware 110 illustrated in FIGS. 10 and 11), the segment is output to the proxy server or the reproduction control unit.

Then, a process executed by the event executing device 320 illustrated on the right side of FIG. 18 will be described.

Specifically, the event executing device 320 is the reproduction control unit of the receiving device that receives the signaling data such as the MPD or the AV segment and executes the content reproduction process (the reproduction control units 131 and 151 illustrated in FIGS. 10 and 11).

The process executed by the event executing device 320 illustrated in FIG. 18 is a process executed in the reproduction control units 131 and 151 of the receiving device.

Further, in FIG. 18, the reproduction control unit is illustrated as a component separated in a process type unit corresponding to a type of process to be executed.

Specifically, two processing units, that is, a reproduction control unit (event client) 321 serving as the event responding process executing unit and a reproduction control unit (DASH client) 322 that executes a content reproduction process to which the MPD or the AV segment is applied are illustrated.

(Step S21)

First, in step S21, the reproduction control unit (DASH client) 322 of the event executing device 320 transmits an acquisition request of the MPD serving as the signaling data to the event insertion executing device 310.

(Step S22)

Then, in step S22, the reproduction control unit (DASH client) 322 of the event executing device 320 acquires the event information from the MPD acquired from the event insertion executing device 310.

Further, the MPD acquired is here assumed to be the event information recording MPD, that is, the event information MPD illustrated in FIG. 16.

A type or content of an event, the activation (for example, activation such as execution and stop) time of an event, the duration information, and the like are recorded in the event information recording MPD.

The receiving device can perform, for example, a process of activating (for example, executing) a designated event in a designated period of time in accordance with the event information recorded on this MPD and causing it to be continued during a designated duration.

(Step S23)

Then, in step S23, the reproduction control unit (event client) 321 of the event executing device 320 performs an event-applied scheduling process in accordance with the event information acquired from the MPD.

A type or content of an event, the activation time of an event, the duration information, and the like are recorded in the event information recording MPD as described above, and the reproduction control unit (event client) 321 of the event executing device 320 performs the event-applied scheduling process with reference to the information.

(Step S24)

Then, in step S24, the reproduction control unit (DASH client) 322 of the event executing device 320 transmits an acquisition request for the segment to the event insertion executing device 310.

(Step S25)

Then, in step S25, the reproduction control unit (DASH client) 322 of the event executing device 320 acquires the AV content or the like from the segment acquired in step S24, and executes the reproduction process.

(Step S26)

Then, in step S26, the reproduction control unit (event client) 321 of the event executing device 320 performs an application process for the event scheduled in accordance with the event information acquired from the MPD, that is, an event activation (event execution, start, or the like) process.

(Steps S27 to S29)

A process of steps S27 to S29 is a process similar to the process of steps S24 to S26.

This series of processes will be executed continuously.

As described above, the receiving device (client) can execute various events in accordance with the event information recorded in the MPD in addition to the process of receiving and reproducing the AV segment.

[7-2. Segment-Applied Event Notification Scheme (=In-Band Event Signaling)]

Next, the segment-applied event notification scheme (=In-band Event Signaling) which is another event notification scheme specified in the DASH standard will be described.

The segment-applied event notification scheme (=In-band Event Signaling) is a scheme in which the event information is recorded in a segment (DASH segment) storing AV content or the like and provided to the receiving device.

As described above, the transmitting device 20 illustrated in FIG. 1 encodes content data and generates and transmits a data file including encoded data and metadata of the encoded data. The encoding process is performed in accordance with, for example, the MP4 file format specified in MPEG. Further, in a case where the transmitting device 20 generates a data file of an MP4 format, the file of the encoded data is referred to as "mdat", and the metadata is referred to as "moon", "moof", or the like.

Content provided by the transmitting device 20 is, for example, various data such as music data, video data such as a movie, a television program, a video, a photograph, a document, a painting, and a chart, a game, and software.

A configuration example of the DASH segment that can be used in a case where the content stream delivery is performed in accordance with the DASH standard will be described with reference to FIG. 19.

The DASH segments are classified into the following two types:

(a) an initialization segment (initialization segment); and (b) a media segment (=AV segment).

(a) The initialization segment (Initialization Segment) is a segment storing initialization data such as setting information necessary for executing the content reproduction such as setting of the decoder in the receiving device 30.

(b) The media segment (=AV segment) is a segment storing the encoded content (AV content) serving as the reproduction target.

Figure 19:
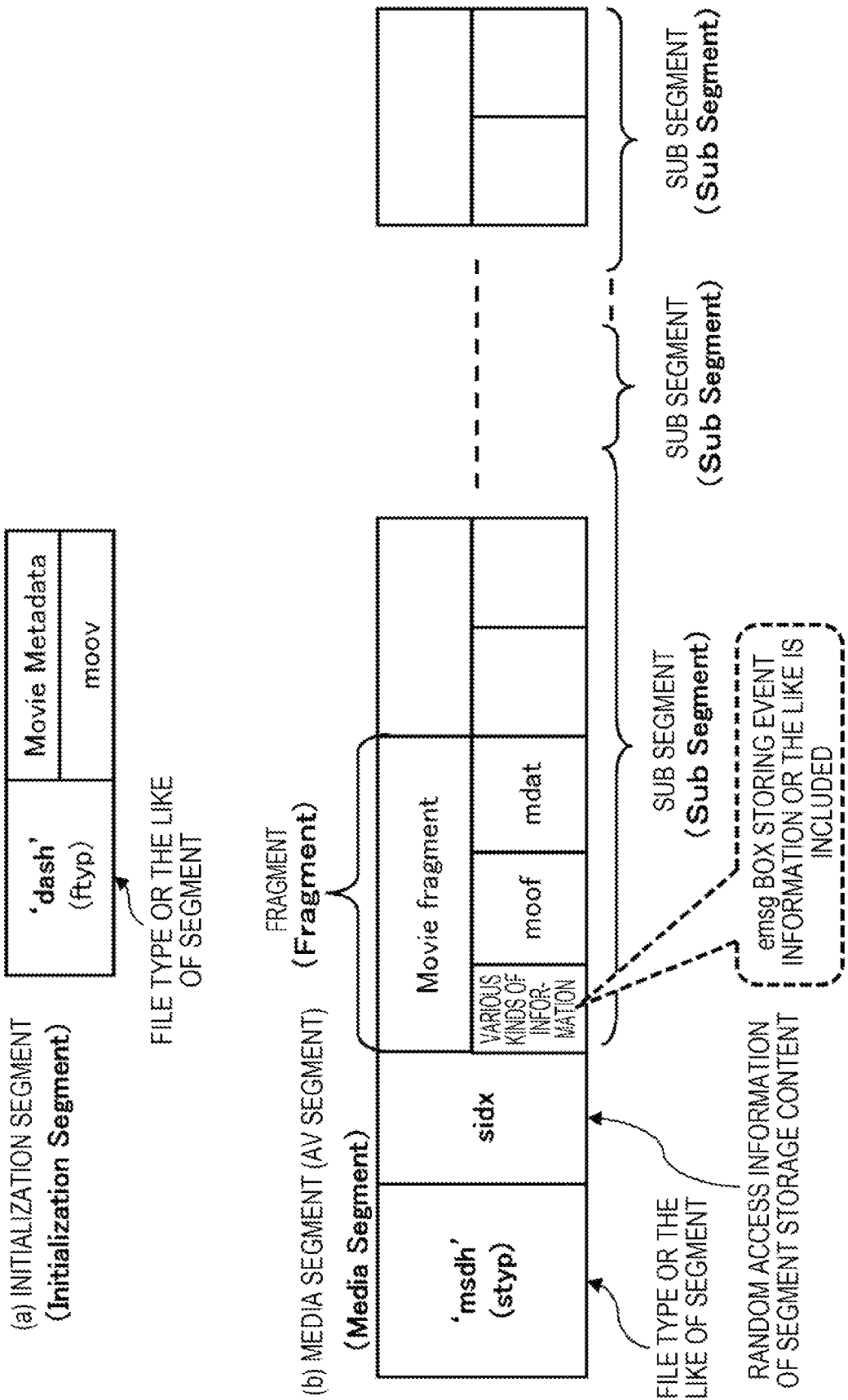
FIG. 19 is a diagram illustrating a configuration of a segment storing event information.

As illustrated in FIG. 19, (a) the initialization segment includes the following information:

(a1) header information (dash) including file type information or the like of a segment; and (a2) metadata (moov) including initialization information such as codec (encoding mode) information of media data (mdat) which is encoded content transmitted through the media segment.

On the other hand, (b) the media segment includes the following information as illustrated in FIG. 19:

(b1) header information (msdh) including file type information or the like of a segment;

(b2) boundary information of a plurality of sub segments (Sub-Segments) stored in the media segment or access information (sidx) indicating a random access point or the like of media data (mdat) which is encoded content stored in the media segment; and (b3) a plurality of sub segments (Sub-Segment).

Further, a plurality of sub segments (Sub-Segments) are constituted by one or more fragments (Fragments).

The fragment (Fragment) includes the following data:
media data (mdat) which is encoded content serving as a reproduction target;
metadata (moof) corresponding to media data (mdat); and
various kinds of information (control information, a management file, attribute information, and the like) corresponding to media data (mdat).

Further, the media data (mdat), the metadata (moof), and other various kinds of information (the control information, the management file, the attribute information, and the like) are individually stored in boxes defined in the MP4 format.

The AV data is stored in a mdat box.
The metadata is stored in a moof box.
Other various kinds of information are also stored in boxes defined in accordance with the respective pieces of information.

The event information is stored in an event information storage box [emsg box] defined by the MP4 format as a box for storing the event information as some of various kinds of information.

A data configuration example of the event information storage box (emsg) in the MP4 format data used in the segment-applied event notification scheme (=In-band Event Signaling) will be described with reference to FIG. 20.

Figure 20:
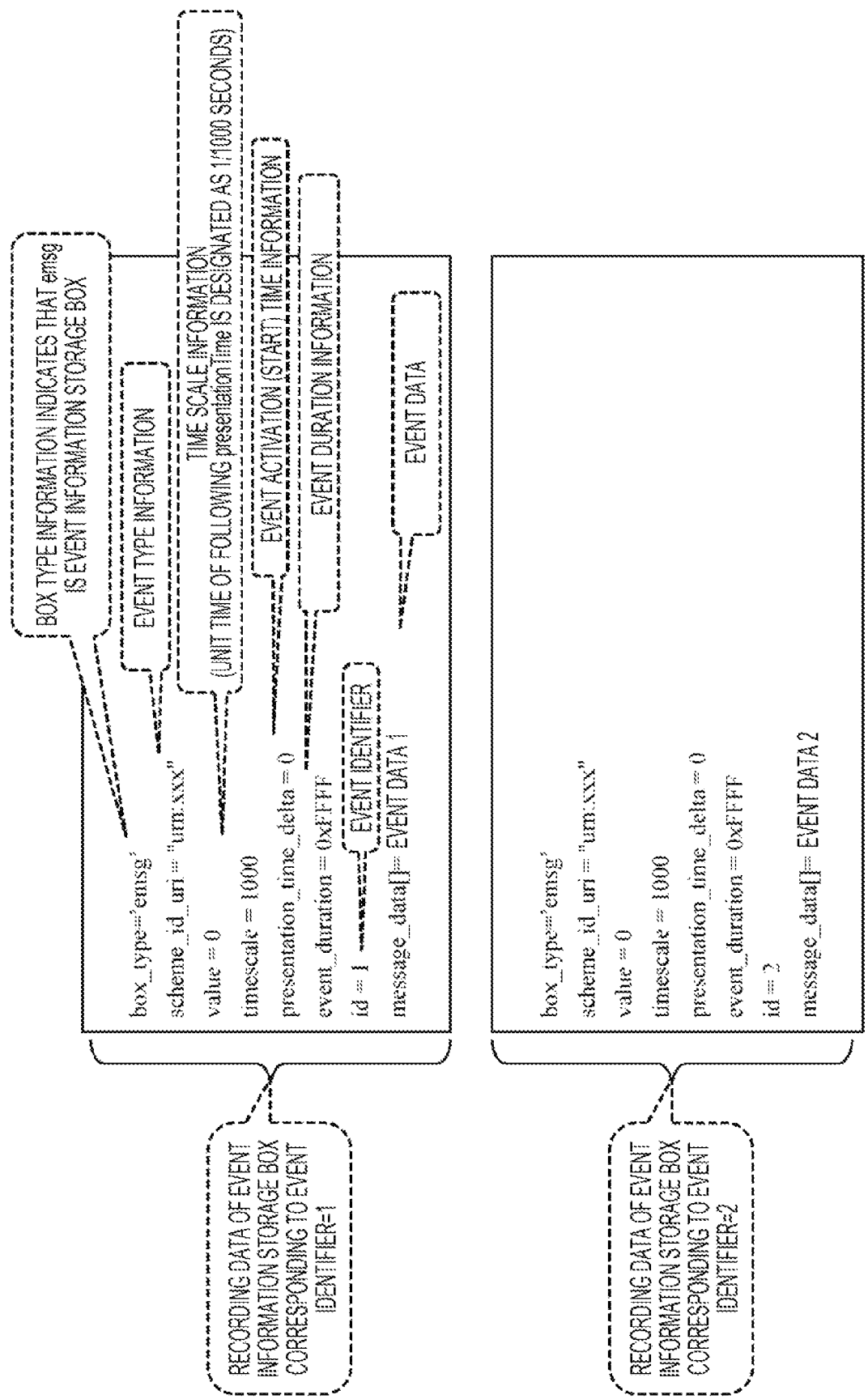
FIG. 20 is a diagram illustrating a data configuration example in a segment storing event information.

FIG. 20 illustrates data of two event information storage boxes (emsg) in which two pieces of event information of event identifiers 1 and 2 are separately stored.

The event information storage box (emsg) has, for example, the following description:
box_type='emsg'
scheme_id_uri="urn:xxx"
value=0
timescale=1000
presentation_time_delta=0
event_duration=0xFFFF
id=1
message_data[ ]=event data-1

Data content of the event information storage box (emsg) will be described.
box_type='emsg'
This data record recording area is a box type recording area. It describes that this box (the data storage box specified in MP4) is the event information storage box (emsg).
scheme_id_uri="urn:xxx"
value=0
This data record recording area is a recording area of event designation information indicating an event type or the like.

The event type or the like is defined by 'scheme_id_uri="urn:xxx" and an optional "value".
timescale=1000
This data record recording area is a recording area of time scale information.

"Timescale='1000'" indicates that a unit time of the presentation time (presentationTime) recorded below is $\frac{1}{1000}$ seconds.
presentation_time_delta=0
event_duration=0xFFFF
This data record recording areas is a recording area of event scheduling data such as the activation (execution start or the like) time of the event or the duration. It is designated that it is continued from the activation (activation/execution) time=0 of the event specified by the event designation information to the time=0xFFFF. Further, 0xFFFF indicates that the end time is not defined, and means that the event may be continued or may not be continued until the reproduction of the AV content corresponding to the segment set by the event information storage box ends.
id=1
This data recording area is an event identification information recording area.
message_data [ ]=event data-1
This data recording area is a recording area of the event data.

The event data is constituted by substantive data, metadata, data such as a command, or the like necessary for executing the event, the access information thereof, or the like.

As described above, in the segment-applied event notification scheme (=In-band Event Signaling), the event information can be recorded in the segment stream (in-stream) and transferred.

In the segment-applied event notification scheme (=In-band Event Signaling), the event type can be defined in the "scheme_id_uri" field and the optional "value" field.

Further, it is possible to add the event data, that is, the substantive data, the metadata, the data such as the command, or the like necessary for executing the event, the access information thereof, or the like to the "message_data" field.

Next, configurations and process examples of the event insertion executing device 310 that generates (or acquires) and outputs the segment in which the event information is recorded and the event executing device 320 that receives the event recording information segment and performs a process corresponding to the event information recorded in the segment will be described with reference to FIG. 21.

Figure 21:
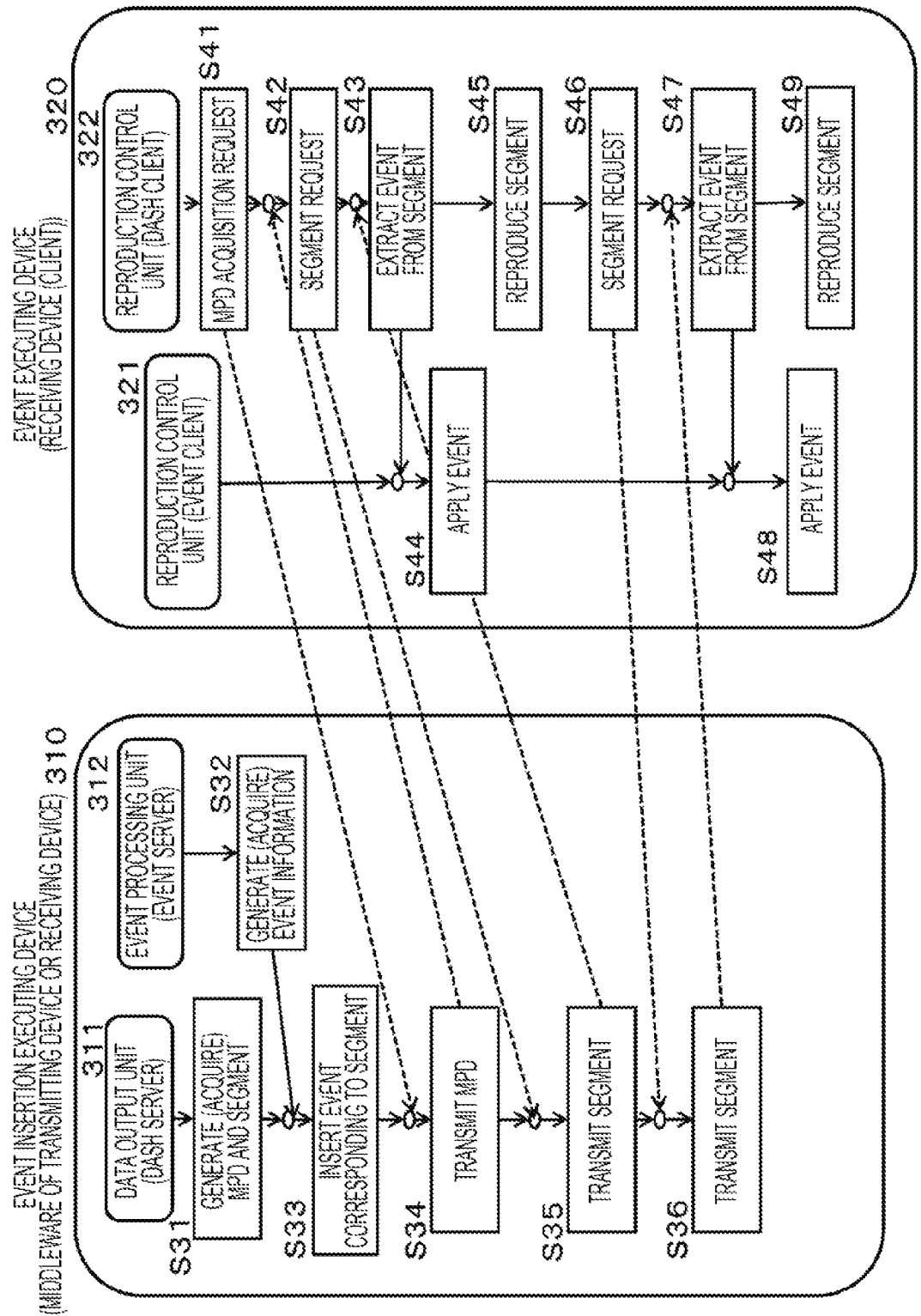
FIG. 21 is a diagram for describing generation, transmission, and usage sequences of event information.

In FIG. 21, the event insertion executing device 310 that generates (or acquires) and outputs the segment in which the event information is recorded is illustrated on the left side.

Further, the event executing device 320 that receives the segment in which the event information is recorded and executes a process (event activation) corresponding to the event information recorded in the segment is illustrated on the right side of FIG. 21.

Specifically, the event insertion executing device 310 is the middleware 110 of the receiving device (the middleware 110 illustrated in FIGS. 10 and 11) that receives the signaling data such as the MPD or the AV segment in the broadcasting server 21 that transmits the signaling data such as the MPD or the AV segment, the data delivery server 22, or the receiving device and outputs the signaling data or the AV segment to the reproduction control unit 131 of the receiving device.

Further, specifically, the event executing device 320 illustrated on the right side of FIG. 21 is the reproduction control unit of the receiving device that receives the signaling data such as the MPD or the AV segment and executes the content reproduction process (the reproduction control units 131 and 151 illustrated in FIGS. 10 and 11).

A process executed by the event insertion executing device 310 will be described.

The event insertion executing device 310 includes a data output unit (DASH server) 311 and an event processing unit (event server) 312.

Further, such server functions are functions provided by the broadcasting server 21 that transmits the signaling data such as the MPD or the AV segment, the data delivery server 22, and the middleware 110 of the receiving device (the middleware 110 illustrated in FIGS. 10 and 11).

Respective processing steps of the process executed by the event insertion executing device 310 will be described below.

(Step S31)

First, in step S31, the data output unit (DASH server) 311 of the event insertion executing device 310 generates or acquires the MPD serving as the signaling data and a segment including AV data constituting reproduction content.

In a case where the event insertion executing device 310 is the broadcasting server 21 or the data delivery server 22, a process of generating or acquiring the MPD and the segment is performed.

In a case where the event insertion executing device 310 is the middleware 110 of the receiving device (the middleware 110 illustrated in FIGS. 10 and 11), a process of acquiring the MPD and the segment from the received data is performed.

(Step S32)

Then, in step S32, the event processing unit (event server) 312 of the event insertion executing device 310 generates or acquires the event information.

For example, the event information is information for giving a notification or a request indicating execution of a certain process to the receiving device such as a change of a program guide, a change of a data form of broadcast content, a process to be executed when the broadcast content is reproduced in the receiving device.

In a case where the event insertion executing device 310 is the broadcasting server 21 or the data delivery server 22, a process for generating or acquiring the event information is performed.

In a case where the event insertion executing device 310 is the middleware 110 of the receiving device (the middleware 110 illustrated in FIGS. 10 and 11), a process of acquiring the event information from the received data is performed.

(Step S33)

Then, in step S33, the data output unit (DASH server) 311 of the event insertion executing device 310 inserts the event information into the segment.

With this process, the segment including the emsg box which is the event information recording box defined in the MP4 format previously described with reference to FIG. 20 is generated.

A type or content of an event, the activation time of an event, the duration information, and the like are recorded in the event information recording box (emsg) i illustrated in FIG. 20 as described above.

The receiving device can perform, for example, a process of activating (for example, executing) a designated event in a designated period of time in accordance with the event information recorded in the emsg box in the segment and causing it to be continued during a designated duration.

(Step S34)

Then, in step S34, the data output unit (DASH server) 311 of the event insertion executing device 310 transmits (outputs) the MPD serving as the signaling data.

In a case where the event insertion executing device 310 is the broadcasting server 21 or the data delivery server 22, the MPD is transmitted via the broadcast wave or the network.

In a case where the event insertion executing device 310 is the middleware 110 of the receiving device (the middleware 110 illustrated in FIGS. 10 and 11), the MPD is output to the proxy server or the reproduction control unit.

(Steps S35 to S36)

Then, in steps S35 to S36, the data output unit (DASH server) 311 of the event insertion executing device 310 transmits (outputs) the segment storing the AV content or the like.

The segment to be transmitted is a segment including the event information recording box (emsg) specified in the MP4 format.

The segment transmission is continuously executed from step S36.

In a case where the event insertion executing device 310 is the broadcasting server 21 or the data delivery server 22, the segment is transmitted via the broadcast wave or the network.

In a case where the event insertion executing device 310 is the middleware 110 of the receiving device (the middleware 110 illustrated in FIGS. 10 and 11), the segment is output to the proxy server or the reproduction control unit.

Then, a process executed by the event executing device 320 illustrated on the right side of FIG. 21 will be described.

Specifically, the event executing device 320 is the reproduction control unit of the receiving device that receives the signaling data such as the MPD or the AV segment and executes the content reproduction process (the reproduction control units 131 and 151 illustrated in FIGS. 10 and 11).

The process executed by the event executing device 320 illustrated in FIG. 21 is a process executed in the reproduction control units 131 and 151 of the receiving device.

Further, in FIG. 21, the reproduction control unit is illustrated to be separated in according to a type of process to be executed. In other words, two processing units, that is, a reproduction control unit (event client) 321 serving as the event responding process executing unit and a reproduction control unit (DASH client) 322 that executes a content reproduction process to which the MPD or the AV segment is applied are separately illustrated.

(Step S41)

First, in step S41, the reproduction control unit (DASH client) 322 of the event executing device 320 transmits an acquisition request of the MPD serving as the signaling data to the event insertion executing device 310.

(Step S42)

Then, in step S44, the reproduction control unit (DASH client) 322 of the event executing device 320 transmits an acquisition request for the segment to the event insertion executing device 310.

(Step S43)

Then, in step S42, the reproduction control unit (DASH client) 322 of the event executing device 320 acquires the event information from the segment acquired from the event insertion executing device 310.

Further, the acquired segment here has the event information recording box (emsg). In other words, it is assumed to be a segment (event information recording segment) including the event information recording box (emsg) illustrated in FIG. 20 in which the event information is recorded.

A type or content of an event, the activation time of an event, the duration information, and the like are recorded in the event information recording segment.

The receiving device can perform, for example, a process of activating (for example, executing) a designated event in a designated period of time in accordance with the event information recorded in this segment and causing it to be continued during a designated duration.

(Step S44)

Then, in step S44, the reproduction control unit (event client) 321 of the event executing device 320 performs an application process for the event scheduled in accordance with the event information acquired from the segment, that is, an event activation (event execution, start, or the like) process.

(Step S45)

Then, in step S45, the reproduction control unit (DASH client) 322 of the event executing device 320 acquires the AV content or the like from the segment acquired in step S42 and executes the reproduction process.

(Steps S46 to S49)

A process of steps S46 to S49 is a process similar to the process of steps S42 to S45.

This series of processes will be continuously executed as a process performed in units of segments.

As described above, the receiving device (client) can execute various events in accordance with the event information recorded in the event information recording box (emsg) in the segment in addition to the process of receiving and reproducing the AV segment.

8. Event Notification Configuration for Emergency Information Delivery Notification Process Next, a configuration for giving a notification indicating the emergency information itself or a notification indicating that the emergency information is delivered using the event notification mechanism described above will be described.

For example, the middleware 110 of the tuner-equipped receiving device 30 illustrated in FIGS. 10 and 11 can acquire and analyze the signaling data (LLS) including the emergency information-related data illustrated in FIGS. 12 and 13 and acquire the following emergency information delivery notifications without delay:

(a) the on-screen message type emergency information delivery notification (On Screen Message Notification); and (b) the signaling data application type emergency information delivery notification (AEAT Message Notification).

However, components that execute the reproduction process for the program content transmitted by the transmitting device 20 such as the broadcasting server 21 are the reproduction control units (DASH clients) 131 and 151 of the tuner-equipped receiving device 30 and the tuner-not-equipped receiving device 40 illustrated in FIGS. 10 and 11. Further, components that execute the presentation process for the application presentation content described with reference to FIG. 7 are the application control units 133 and 153 of the tuner-equipped receiving device 30 and the tuner-not-equipped receiving device 40 illustrated in FIGS. 10 and 11.

Therefore, the deletion process for the application presentation content and the display process for the emergency information are unable to be executed unless the reproduction control units (DASH clients) 131 and 151 or the application control units 133 and 153 detect that the emergency information delivery notifications (a) and (b) have been performed.

In the process of the present disclosure, the following notification information given in notification by signaling data (LLS), that is, the following emergency information delivery notifications are promptly transferred from the middleware to the reproduction control units (DASH clients) 131 and 151 and the application control units 133 and 153 so that the processes corresponding to these notifications can be executed without delay, and the event notification mechanism is used as a process for that purpose:

(a) the on-screen message type emergency information delivery notification (On Screen Message Notification); and (b) the signaling data application type emergency information delivery notification (AEAT Message Notification).

In the process of the present disclosure, the following two new events are defined as events in which the event notification is performed using the event notification mechanism:

(a) an on-screen message event (OnScreenMessage Event); and (b) a signaling data application type emergency information delivery event (AEATDelivered Event).

Further, the event notification process is executed from the middleware 110 of the tuner-equipped receiving device 30 to the reproduction control units (DASH clients) 131 and 151 of the tuner-equipped receiving device 30 and the tuner-not-equipped receiving device 40 and further executed to the application control units 133 and 153 and the emergency information control units 140 and 160 of the tuner-equipped receiving device 30 and the tuner-not-equipped receiving device 40 via the reproduction control units (DASH clients) 131 and 151.

(a) The on-screen message event (OnScreenMessage Event) is event information for giving a notification indicating that the "on-screen message type emergency information delivery notification (On Screen Message Notification)" is delivered through the signaling data (LLS).

(b) A signaling data application type emergency information delivery event (AEATDelivered Event) is event information for giving a notification indicating that "(b) the signaling data application type emergency information delivery notification (AEAT Message Notification)" is delivered through the signaling data (LLS).

The above two events are newly defined.

The following identifier is set as the event identifiers (schemeIdUri=urn:uniform resource name) of the two events:

The following identifier is set as the identifier of (a) the on-screen message event (OnScreenMessage Event):

schemeIdUri="urn:atsc:onScreenMessage"

The event information in which this identifier is set is event information for giving a notification indicating that the emergency information message is overlaid on the video stream (as video).

For example, a notification indicating the event information is given to the application control units 133 and 153, and the application presentation content on the emergency information message is excluded.

On the other hand, the following identifier is set as the identifier of (b) signaling data application type emergency information delivery event (AEATDelivered Event):

schemeIdUri="urn:atsc:AEATDelivered"

The event information in which this identifier is set is event information for giving a notification indicating that the emergency information message such as AEAT or CAP is delivered as the signaling data.

A process of giving a notification indicating the event information to the reproduction control units 131 and 151, the application control units 133 and 153, the emergency information control units 140 and 260, and the like to acquire the emergency information (AEAT) from the delivered signaling data or acquire the emergency information using the access information recorded in the signaling data, and display the acquired emergency information is executed.

Further, the signaling data application type emergency information delivery event (AEATDelivered Event) is configured either to store the emergency information (AEAT) message itself delivered through the signaling data (LLS) or to record the access information (url) of the emergency information (AEAT) message file as the recording data of the event information.

In either case, the emergency information (AEAT) message can be acquired on the basis of the event information.

Further, the map information and the like described above with reference to FIG. 9 is also included in the emergency information (AEAT) message file.

[8-1. Configuration for Giving a Notification of On-Screen Message Type Emergency Information Delivery Notification as Event Information]

First, a configuration for giving a notification of the on-screen message type emergency information delivery notification as the event information will be described.

Further, as described above, there are the following two types as the DASH event transfer scheme:

(a) an MPD-applied event notification scheme for inserting the event information into the MPD which is the signaling data and transferring the resulting MPD; and (b) a segment-applied (In-band) event notification scheme for inserting the event information into the segment and transferring the resulting segment.

Processing schemes in which the two types of event transfer scheme are applied to the on-screen message type emergency information delivery notification will be sequentially described.

Further, in both cases of (a) and (b), for example, the event information is transferred from the middleware 110 of the tuner-equipped receiving device 30 illustrated in FIGS. 10 and 11 to the reproduction control units (DASH clients) 131 and 151 of the tuner-equipped receiving device 30 and the tuner-not-equipped receiving device 40.

[8-1-1. Notification Configuration of On-Screen Message Type Emergency Information Delivery Notification to which MPD-Applied Event Notification Scheme is Applied]

First, a notification configuration of the on-screen message type emergency information delivery notification to which the MPD-applied event notification scheme is applied will be described.

A process of generating the "on-screen message event (OnScreenMessage Event)" for informing that the on-screen message type emergency information delivery notification is received using the MPD-applied event notification scheme is executed in the SLS signaling analyzing unit (MPD event inserting unit) 115 of the tuner-equipped receiving device 30 illustrated in FIGS. 10 and 11.

The on-screen message event (OnScreenMessage Event) is event information for requesting a process for giving a notification indicating that the emergency information message is overlaid on the video stream such as the program content (as video) so that nothing is displayed on the emergency information message.

However, the process of causing the emergency information message to be overlaid on the video stream is executed by the transmitting device 20 such as the broadcasting server 21 when an emergency situation occurs, and an execution timing thereof is unpredictable.

In other words, the activation time of the event is unable to be described.

As described above with reference to FIGS. 14 to 18, with the MPD-applied event notification scheme (=MPD Event), it is possible to provide information necessary for the event process to the client in units of periods using the MPD.

Specifically, in the MPD-applied event notification scheme (=MPD Event), the following information can be described in the MPD:

(a) an event schedule such as activation (Start/Execute/Activation) timings of various events;

(b) an event process to be performed by the client (the receiving device) at each timing; and (c) data or the like to be transferred to an application running on the client when an event is executed.

However, as described above, the processing of causing the emergency information message to be overlaid on the video stream is executed by the transmitting device 20 such as the broadcasting server 21 when the emergency situation occurs, the execution timing thereof is unpredictable, and an event schedule such as the activation (start/execution/activation) timing or the like of the period unit is unable to be specified.

Therefore, in order to cause the reproduction control units (DASH clients) 131 and 151 or the like to acquire "the emergency information event inserted MPD" in which the event information of the on-screen message event (OnScreenMessage Event) is inserted without delay, it is necessary to inform the reproduction control units (DASH clients) 131 and 151 or the like in advance that it is necessary to acquire the "emergency information event inserted MPD".

To this end, the following process steps (S01) to (S03) are executed.

(S01) The LLS signaling analyzing unit 113 of the middleware 110 detects the on-screen message type emergency information delivery notification (On Screen Message Notification) from the signaling data (LLS) and notifies the SLS signaling analyzing unit (MPD event inserting unit) 115 of the detected information, (S02) the SLS signaling analyzing unit (MPD event inserting unit) 115 generates the on-screen message event (OnScreenMessage Event) and stores the MPD in which the on-screen message event (OnScreenMessage Event) is recorded in the cache unit (proxy cache) 121.

Further, a notification indicating that the MPD being used by the reproduction control units (DASH clients) 131 and 151 is changed or updated is given to the reproduction control units (DASH clients) 131 and 151 using the existing DASH event notification mechanism.

(S03) The reproduction control units (DASH clients) 131 and 151 receive the MPD update event notification, applies the message data recorded in this event notification, and executes the MPD update process.

In other words, in step (S02), the reproduction control units (DASH clients) 131 and 151 are caused to acquire the MPD in which the on-screen message event (OnScreenMessage Event) which is generated by the SLS signaling analyzing unit (MPD event inserting unit) 115 and stored in the cache unit (proxy cache) 121 is recorded as the updated MPD.

With the MPD update process of steps (S01) to (S03), the reproduction control units (DASH clients) 131 and 151 can acquire the MPD in which the "on-screen message event (OnScreenMessage Event)" is recorded.

The reproduction control units (DASH clients) 131 and 151 can detect that the emergency information message is overlaid on the video stream such as the program content (as the video) with reference to the updated MPD.

Further, the existing method specified in the DASH specification can be applied as the event notification process of giving a notification indicating that the MPD described in step (S02) has been updated.

In the DASH specification, the following two types of events are defined as default events of DASH.

One is an MPD validity expiration notification event, and the other is an MPD patch notification event.

Both of the events (DASH events) are events used for the MPD update notification.

Both of types (identifiers) of the events are schemeIdUri="urn:mpeg:dash:event:2012".

Here, different attributes (value attributes) are set in the two events, and the two events can be distinguished by the attributes.

A type (identifier) and an attribute (value attribute) of the MPD validity expiration notification event are as follows:

schemeIdUri="urn:mpeg:dash:event:2012"
value="1"

On the other hand, a type (identifier) and an attribute (value attribute) of the MPD patch notification event are as follows:

schemeIdUri="urn:mpeg:dash:event:2012"
value="2"

The MPD validity expiration notification event is an event for giving a notification indicating that the MPD being used by the reproduction control unit (DASH client) is changed or updated.

Usually, an MPD update time is described in the MPD and given in notification by MPD@minimumUpdatePeriod which is an attribute of the MPD.

The reproduction control unit (DASH client) serving as the client determines that the acquired MPD is valid until the time described in minimumUpdatePeriod.

Here, in a case where the MPD provided to the reproduction control unit (DASH client) has to be updated for some reasons, the MPD validity expiration notification event is transferred to the reproduction control unit (DASH client) in accordance with the segment-applied (In-band) event notification scheme.

The segment-applied (In-band) event notification scheme is a scheme in which the event notification information is stored in the stream of the segment and given in notification.

In other words, an event notification indicating that it is necessary to update the MPD is inserted into the segment and transferred to the reproduction control unit (DASH client).

The reproduction control unit (DASH client) checks all the input segments and can detect that it is necessary to update the MPD through the segment checking process.

Further, time information in which update is necessary is recorded in the event data recorded in the segment as message data. Specifically, the time information in which update is necessary is stored in message_data[ ] of the emsg box of the in-band event.

If this event is detected from the segment, the reproduction control unit (DASH client) acquires the MPD again at a time recorded as the message data by applying access information similar to the access information (url) of the MPD file being currently used. With this process, it is possible to acquire the updated MPD.

Further, in a case where it is necessary to update the MPD urgently, the "time at which update is necessary" is set to "now".

Another MPD patch notification event has a form in which a command (patch script) for updating (modifying) the MPD itself is transmitted without giving a notification of the time at which it is necessary to update the MPD as in the MPD validity expiration notification event.

The command for updating MPD itself is stored in message_data [ ] of the emsg box of the in-band event as message data.

If this event is detected from the segment, the reproduction control unit (DASH client) applies the command to the acquired MPD and updates content itself.

The event notification process for performing the MPD update notification described in step (S02) can be executed using the existing DASH event notification mechanism.

As described above, with the process of steps (S01) to (S03), the reproduction control units (DASH clients) 131 and 151 can acquire the updated MPD in which the on-screen message event (OnScreenMessage Event) is recorded.

Figure 22:
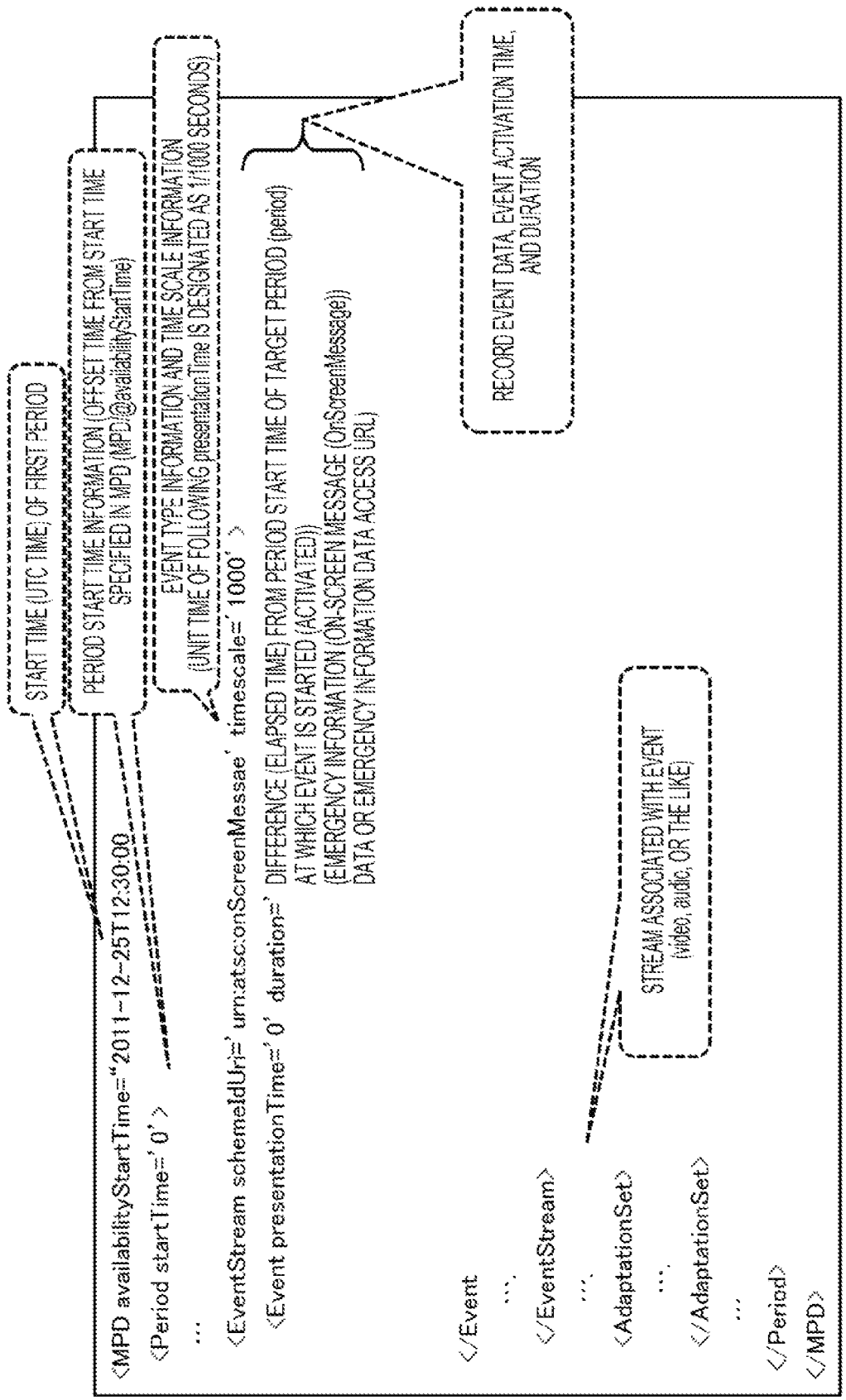
FIG. 22 is a diagram illustrating a data configuration example of an MPD in which on-screen message event (OnScreenMessage Event) information is recorded.

FIG. 22 illustrates a data example of the MPD in which the on-screen message event (OnScreenMessage Event) information is recorded.

For example, the MPD has the following description.

```
<MPD availabilityStartTime="2011-12-25T12:30:00
<Period startTime='0'>
...
<EventStream schemeIdUri='urn:atsc:onScreenMessage'
timescale='1000'>
<Event presentationTime='(difference (elapsed time)
from a period start time of a target period (Period) at which
an event is started (activated))
    (emergency information (on-screen message
 (OnScreenMessage)) data or emergency information data access
URL)
    </Event>
    .....
    </EventStream>
    ...
    <AdaptationSet>
    ...
    </Period>
    </MPD>
```

Data content of the above MPD will be described.

<MPD availabilityStartTime="2011-12-25T12:30:00

This data record recording area is a recording area of start time information of a first period corresponding to data recorded in this MPD. For example, a UTC time is used as the time information.

<Period startTime='0'>

This data record recording area is a period start time information recording area.

An offset time from a start time (MPD/@availabilityStartTime) specified in the MPD is recorded.

<EventStream schemeIdUri='urn:atsc:onScreenMessage' timescale='1000'>

This data record recording area is a recording area of event stream designation information indicating an event type or the like and time scale information.

It is possible to confirm that the event is the on-screen message event (OnScreenMessage Event) through "EventStream schemeIdUri='urn:atsc:onScreenMessage'".

Further, "timescale='1000'" indicates that a unit time of a presentation time recorded below is 1/1000 seconds.

<Event presentationTime='(difference (elapsed time) from a period start time of the target period (Period) at which an event is started (activated))

(emergency information (on-screen message (OnScreenMessage)) data or emergency information data access URL)

This data record recording area is a recording area of event data and event scheduling data such as an activation (execution start or the like) time and a duration of an event.

In the case of the on-screen message event, a start time at which the emergency information is displayed overlaid on an image of broadcast content and a duration of the overlaid display can be recorded.

As the event data, for example, the substantive data of the emergency information message, the access information thereof, or the like is recorded.

<AdaptationSet>
<Representation/>
<Representation/>

The above recording areas are data recording areas in which information of each data type is recorded, and in the case of the on-screen message event, identification information or the like of a broadcast stream on which the emergency information is displayed overlaid is recorded.

For example, the reproduction control units (DASH clients) 131 and 151 illustrated in FIGS. 10 and 11 acquire data from the segment with reference to the MPD, continuously execute the output control for the broadcast stream, and acquire the event notification information from the stream of the segment in accordance with the segment-applied (In-band) event notification scheme during this process period.

The reproduction control units (DASH clients) 131 and 151 acquire the updated MPD in which the on-screen message event (OnScreenMessage Event) is stored, that is, the MPD in which the on-screen message event (OnScreenMessage Event) having the configuration described with reference to FIG. 22 is recorded in accordance with the event information.

The reproduction control units (DASH clients) 131 and 151 can detect the timing at which the emergency information is delivered overlaid on the image of the broadcast content with reference to the on-screen message event (OnScreenMessage Event) recorded in the updated MPD.

The event extracting units 205 and 255 of the reproduction control units (DASH clients) 131 and 151 further transfer the on-screen message event (OnScreenMessage Event) recorded in the MPD to the application control units 133 and 153.

In a case where the application presentation content is displayed on the display unit, the application control units 133 and 153 perform a process of causing the display of the application presentation content to be stopped.

Specifically, for example, the display of the weather forecast information presentation content or the like described above with reference to FIG. 7 is stopped.

With this process, it is possible for the user (viewer) to reliably check the emergency information delivered overlaid on the image of the broadcast content.

[8-1-2. Notification Configuration of On-Screen Message Type Emergency Information Delivery Notification to which Segment-Applied (in-Band) Event Notification Scheme is Applied]

Next, a notification configuration of the on-screen message type emergency information delivery notification to which the segment-applied (In-band) event notification scheme is applied will be described.

A process of generating the "on-screen message event (OnScreenMessage Event)" for informing that the on-screen message type emergency information delivery notification is received using the segment-applied (In-band) event notification scheme is executed in the in-band event inserting unit 118 of the tuner-equipped receiving device 30 illustrated in FIGS. 10 and 11.

The on-screen message event (OnScreenMessage Event) is event information for requesting a process for giving a notification indicating that the emergency information message is overlaid on the video stream such as the program content (as video) so that nothing is displayed on the emergency information message.

The in-band event inserting unit 118 of the tuner-equipped receiving device 30 illustrated in FIG. 11 inserts the on-screen message event (OnScreenMessage Event) into the segment.

A general data configuration example of the event information storage box (emsg) in the MP4 format data used in the segment-applied event notification scheme (=In-band Event Signaling) has been described above with reference to FIG. 20.

FIG. 23 illustrates a data configuration example of the event information storage box (emsg) in which the on-screen message event (OnScreenMessage Event) is set in the segment.

The event information storage box (emsg) has, for example, the following description:
box_type='emsg'
scheme_id_uri="urn:atsc:onScreenMessage"
value=0
timescale=1000
presentation_time_delta=0
event_duration=0xFFFF
id=1
message_data[ ]=(emergency information (on-screen message (OnScreenMessage)) data or emergency information data access URL)

Data content of the event information storage box (emsg) will be described.
box_type='emsg'
This data record recording area is a box type recording area. It describes that this box (the data storage box specified in MP4) is the event information storage box (emsg).
scheme_id_uri="urn:atsc:onScreenMessage"
value=0
This data record recording area is a recording area of event designation information indicating an event type or the like.
It is possible to confirm that this event is the on-screen message event (OnScreenMessage Event) through "scheme_id_uri="urn:atsc:onScreenMessage"".
Further, it is possible to define an event type or the like through an optional "value".
timescale=1000
This data record recording area is a recording area of time scale information.
"Timescale='1000'" indicates that a unit time of the presentation time (presentationTime) recorded below is 1/1000 seconds.
presentation_time_delta=0
event_duration=0xFFFF
This data record recording areas is a recording area of event scheduling data such as the activation (execution start or the like) time of the event or the duration.
In the case of the on-screen message event, a start time at which the emergency information is displayed overlaid on an image of broadcast content and a duration of the overlaid display are recorded.
As the event data, for example, the substantive data of the emergency information message, the access information thereof, or the like can be recorded.
id=1
This data recording area is an event identification information recording area.
message_data[ ]=(emergency information (on-screen message (OnScreenMessage)) data or emergency information data access URL)
This data recording area is a recording area of event data.

The event data includes substantive data, metadata, data such as a command, or the like necessary for executing an event, access information thereof, or the like.

For example, the substantive data of the emergency information message, the access information, or the like is recorded.

As described above, in the segment-applied event notification scheme (=In-band Event Signaling), the event information can be recorded in the segment stream (in-stream) and transferred.

In the segment-applied event notification scheme (=In-band Event Signaling), the event type can be defined in the "scheme_id_uri" field and the optional "value" field.

Further, it is possible to add the event data, that is, the substantive data, the metadata, the data such as the command, or the like necessary for executing the event, the access information thereof, or the like to the "message_data" field.

For example, the reproduction control units (DASH clients) 131 and 151 illustrated in FIGS. 10 and 11 acquire data from the segment with reference to the MPD, continuously execute the output control for the broadcast stream, and acquire the on-screen message event (OnScreenMessage Event) as the event notification information from the stream of the segment in accordance with the segment-applied event notification scheme (=In-band Event Signaling) during this process period.

The reproduction control units (DASH clients) 131 and 151 can detect the timing at which the emergency information is delivered overlaid on the image of the broadcast content with reference to the on-screen message event (OnScreenMessage Event) recorded in the segment.

The event extracting units 205 and 255 of the reproduction control units (DASH clients) 131 and 151 further transfer the on-screen message event (OnScreenMessage Event) in the segment to the application control units 133 and 153.

In a case where the application presentation content is displayed on the display unit, the application control units 133 and 153 perform a process of causing the display of the application presentation content to be stopped.

Specifically, for example, the display of the weather forecast information presentation content or the like described above with reference to FIG. 7 is stopped.

With this process, it is possible for the user (viewer) to reliably check the emergency information delivered overlaid on the image of the broadcast content.

[8-1-3. Generation and Transfer of Event Based on On-Screen Message Type Emergency Information Delivery Notification and Execution Sequence for Event-Based Process]

As described above, the on-screen message event (OnScreenMessage Event) which is a newly defined event can give a notification indicating that the "on-screen message type emergency information delivery notification (On Screen Message Notification)" is delivered through the signaling data (LLS) from the middleware to the reproduction control unit (DASH client).

The following two types of event notification schemes can be used as the event notification:

(a) the MPD-applied event notification scheme (=MPD Event); and (b) the segment-applied event notification scheme (=In-band Event Signaling).

Generation and transfer of the on-screen message event (OnScreenMessage Event) using the two types of event notification schemes and an execution sequence for an event-based process will be sequentially described below.

A process sequence among the following three devices will be described with reference to FIG. 24:

(1) a transmitting device 410 that generates and outputs the AV segment, the emergency information, the MPD, the signaling data, and the like;

(2) a tuner-equipped receiving device middleware 420 that receives the AV segment, the emergency information, the MPD, the signaling data, and the like and generates an event inserted MPD or an event inserted segment in which the event information in which a notification situation or the like of the emergency information is recorded is recorded in the MPD or the segment; and (3) a tuner-equipped/not-equipped receiving device output data control unit 430 that receives the AV segment, the event inserted MPD or the event inserted segment, and the like from the tuner-equipped receiving device middleware 420 and executes an AV segment reproduction process or a process corresponding to the event information.

Further, the tuner-equipped receiving device middleware 420 corresponds to the middleware 110 of the tuner-equipped receiving device 30 illustrated in FIGS. 10 and 11.

Further, the tuner-equipped/not-equipped receiving device output data control unit 430 corresponds to the reproduction control units (DASH clients) 131 and 151, the output control units 132 and 152, the application control units 133 and 153, and the emergency information control units 140 and 160 of the tuner-equipped receiving device 30 and the tuner-not-equipped receiving device 40 illustrated in FIGS. 10 and 11.

Figure 24:
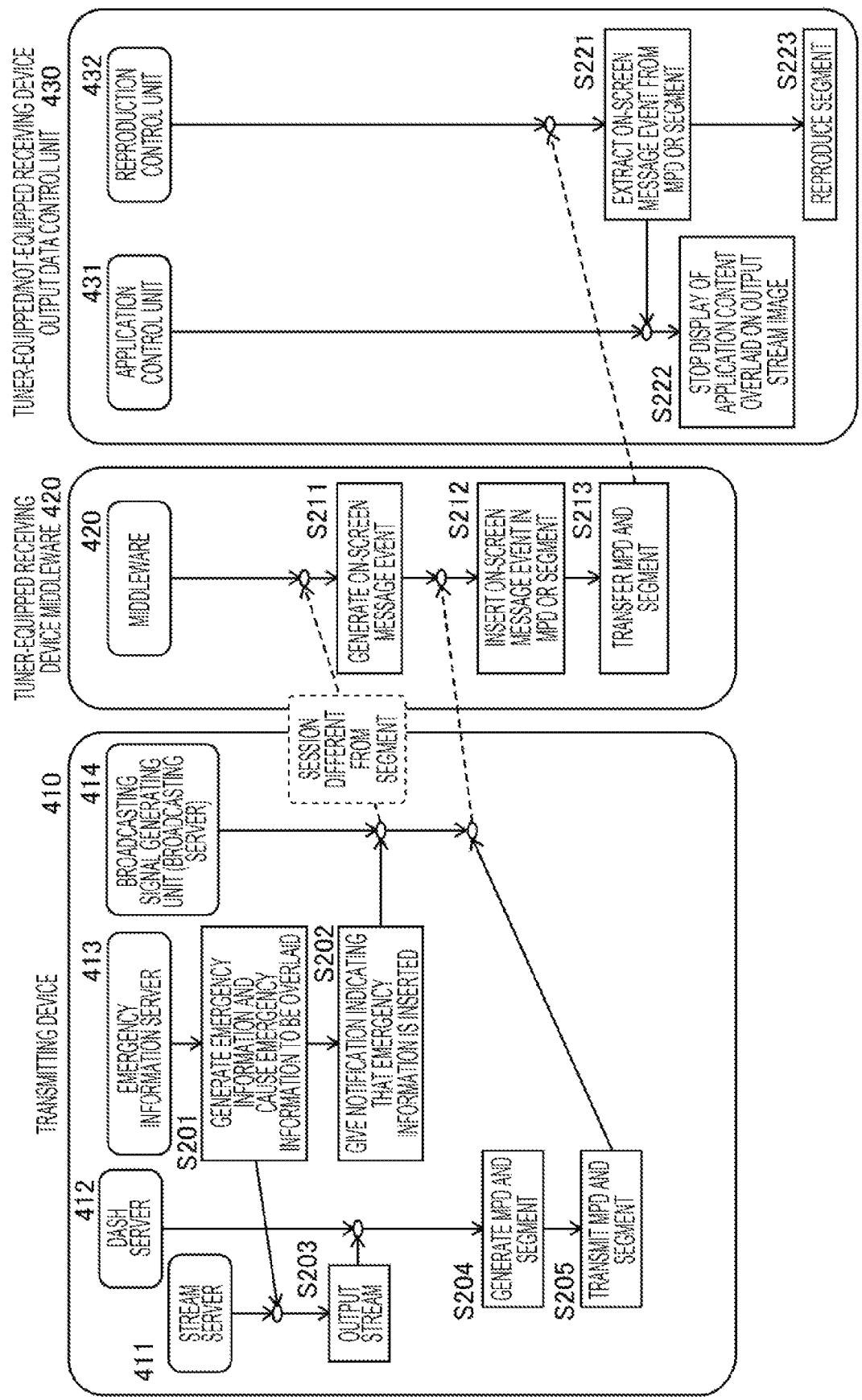
FIG. 24 is a diagram for describing generation, transmission, and usage sequences of emergency information and an on-screen message event.

Further, in the transmitting device 410 illustrated in FIG. 24, the following four components are divided:

a stream server 411 that generates a stream of reproduction content and the like;

a DASH server 412 that generates the MPD or the segment;

an emergency information server 413 that generates the emergency information; and a broadcasting signal generating unit (broadcasting server) 414 that executes transmission of the MPD, the segment, and the emergency information.

The above components are described as being divided into processing units in order to facilitate understanding of various processes executed by the transmitting device, but for example, components that have the functions provided by the broadcasting server 21 and the data delivery server 22 illustrated in FIG. 1 and are executed by a single transmitting device (transmitting server) may be provided.

First, a process executed by the transmitting device 410 will be described.

(Step S201)

First, the emergency information server 413 of the transmitting device 410 generates the emergency information to be displayed overlaid on the image constituting the broadcast content, and causes the event information to be overlaid on the image generated by the stream server 411.

For example, as described above with reference to FIG. 5 and the like, the emergency information to be delivered overlaid on the image of the broadcast content, that is, the on-screen message type emergency information is generated and overlaid on the image generated by the stream server 411.

(Step S202)

Then, the emergency information server 413 of the transmitting device 410 outputs a notification indicating that the on-screen message type emergency information is overlaid on the image of the broadcast content to the receiving device via the broadcasting signal generating unit (broadcasting server) 414.

This is a transmission process of the signaling data (LLS) indicating that the on-screen message (OnScreenMessage) type emergency information is delivered (the on-screen message notification).

The signaling data transmission is executed using a session different from a communication session such as a broadcast stream.

(Step S203)

Then, in step S203, the stream server 411 of the transmitting device 410 generates a stream in which the emergency information generated by the emergency information server 413 is overlaid on the image, and outputs the stream to the DASH server.

(Steps S204 to S205)

Then, the DASH server 412 of the transmitting device 410 generates the MPD or the segment serving as the signaling data in step S204, and transmits the MPD or the segment via the broadcasting signal generating unit (broadcasting server) 414 in step S205.

The segment includes an image or an audio serving as the broadcast content configuration data.

The MPD includes various control information, the guide information, or the like to be applied to the reproduction process for the broadcast content.

As described above with reference to FIG. 14 and other drawings, the MPD has a configuration capable of describing the attribute information or the control information of a predetermined data range unit for each stream of an image or an audio.

Further, in a case where the transmitting device 410 is the broadcasting station or the like, the broadcasting signal generating unit (broadcasting server) 414 carries out a process of placing the MPD or the segment in the broadcast wave and transmitting the resulting signal.

On the other hand, in a case where the transmitting device 410 is the data delivery server that executes data transmission via the network such as the Internet, the transmitting device 410 transmits the MPD or the segment via the network.

Next, a process of the tuner-equipped receiving device middleware 420 will be described.

The tuner-equipped receiving device middleware 420 has a configuration similar to that of the middleware 110 of the tuner-equipped receiving device 30 illustrated in FIG. 10 and FIG. 11.

The tuner-equipped receiving device middleware 420 receives the AV segment, the emergency information, the MPD, the signaling data, and the like transmitted by the transmitting device 410 and generates the event inserted MPD or the event inserted segment in which the event information recording the notification situation of the emergency information or the like is recorded in the MPD or the segment.

Further, the generated event inserted MPD or the generated event inserted segment is transferred to the tuner-equipped/not-equipped receiving device output data control unit 430.

A process of steps executed by tuner-equipped receiving device middleware 420 will be described.

(Step S211)

Upon receiving the notification indicating that the on-screen message type emergency information is overlaid on the image of the broadcast content from the transmitting device 410, in step S211, the tuner-equipped receiving device middleware 420 executes a process of generating the on-screen message event.

In other words, the tuner-equipped receiving device middleware 420 receives the signaling data (LLS) transmitted from the transmitting device 410 in the process of step S202 of the emergency information server of the transmitting device 410.

On signaling data (LLS), the information indicating that the on-screen message (OnScreenMessage) type emergency information is delivered (the on-screen message notification) is recorded in the signaling data (LLS).

The tuner-equipped receiving device middleware 420 generates the event information to be stored in the MPD or the segment in response to this notification.

In this example, the emergency information transmitted by the transmitting device 410 is on-screen type emergency information directly overlaid on a configuration image of the broadcast content, and the tuner-equipped receiving device middleware 420 generates the on-screen message event (OnScreenMessage Event).

As described above, the on-screen message event (OnScreenMessage Event) is event information for giving a notification indicating that the "on-screen message type emergency information delivery notification (On Screen Message Notification)" is delivered through the signaling data (LLS).

(Step S212)

Then, in step S212, the tuner-equipped receiving device middleware 420 records the event information generated in step S211, that is, the on-screen message event (OnScreenMessage Event) information in at least one of the MPD or the segment.

As described above, there are the following two types as a DASH event transfer scheme:

(a) the MPD-applied event notification scheme for inserting the event information into the MPD which is the signaling data and transferring the resulting MPD; and (b) the segment-applied (In-band) event notification scheme for inserting the event information into the segment and transferring the resulting segment.

In a case where the MPD-applied event notification scheme is applied, the on-screen message event (OnScreenMessage Event) is inserted into the MPD.

With this process, the MPD in which the on-screen message event (OnScreenMessage Event) information described above with reference to FIG. 22 is recorded is generated.

Further, this process is executed in the SLS signaling generating unit (MPD event inserting unit) 115 of the middleware 110 illustrated in FIG. 10.

On the other hand, in a case where the segment-applied (In-band) event notification scheme is applied, the on-screen message event (OnScreenMessage Event) is inserted into the segment.

With this process, the segment in which the on-screen message event (OnScreenMessage Event) information described earlier with reference to FIG. 23 is recorded is generated.

Further, this process is executed in the in-band event inserting unit 118 of the middleware 110 illustrated in FIG. 10.

For example, the following data is included in the MPD or the segment in which the on-screen message event (OnScreenMessage Event) is inserted:

(1) the emergency information (on-screen message (OnScreenMessage)) data or the emergency information data access URL; and (2) the start time at which the emergency information is displayed overlaid on the image of the broadcast content and the duration of the overlaid display.

(Step S213)

Then, in step S213, the tuner-equipped receiving device middleware 420 transfers the MPD or the segment to the tuner-equipped/not-equipped receiving device output data control unit 430.

Further, this process is specifically executed through the proxy server 121.

The reproduction control unit (DASH client) of the tuner-equipped/not-equipped receiving device output data control unit 430, that is, the reproduction control units (DASH clients) 131 and 151 illustrated in FIGS. 10 and 11 access the cache unit (proxy cache) 121 of the proxy server 120 and acquires the MPD or the segment.

The MPD or the segment into which the on-screen message event (OnScreenMessage Event) generated in step S212 is inserted by the reproduction control units (DASH clients) 131 and 151 is included in the MPD or the segment acquired by the reproduction control units (DASH clients) 131 and 151.

Further, in order to cause the tuner-equipped/not-equipped receiving device output data control unit 430, that is, the reproduction control units (DASH clients) 131 and 151 illustrated in FIGS. 10 and 11 to acquire the MPD into which the on-screen message event (OnScreenMessage Event) is inserted without delay, it is necessary to perform the MPD update notification in advance as described above.

In other words, as described above, the tuner-equipped receiving device middleware 420 first executes the existing MPD update event notification process to which the segment-applied (In-band) event notification scheme is applied.

In other words, a notification indicating that the MPD update has been performed is given to the reproduction control units (DASH clients) 131 and 151.

In response to this notification, the reproduction control units (DASH clients) 131 and 151 can acquire the MPD into which the on-screen message event (OnScreenMessage Event) is inserted without delay.

Next, a process executed by the tuner-equipped/not-equipped receiving device output data control unit 430 illustrated on the right side of FIG. 24 will be described.

FIG. 24 illustrates an application control unit 431 and a reproduction control unit 432 of the tuner-equipped/not-equipped receiving device output data control unit 430. These components correspond to the components of the application control units 133 and 153 and the reproduction control units 131 and 151 of the tuner-equipped receiving device 30 and the tuner-not-equipped receiving device 40 illustrated in FIGS. 10 and 11.

(Step S221)

First, the reproduction control unit (DASH client) 432 of the tuner-equipped/not-equipped receiving device output data control unit 430 extracts the on-screen message event (OnScreenMessage Event) from the MPD or the segment received through the tuner-equipped receiving device middleware 420 and transfers the on-screen message event (OnScreenMessage Event) to the application control unit 431.

In other words, the reproduction control unit (DASH client) 432 extracts the on-screen message event (OnScreenMessage Event) from the MPD in which the on-screen message event (OnScreenMessage Event) information described above with reference to FIG. 22 is recorded or the segment in which the on-screen message event (OnScreenMessage Event) information described above with reference to FIG. 23 is recorded.

For example, the following data is included in the MPD or the segment in which the on-screen message event (OnScreenMessage Event) is inserted:

(1) the emergency information (on-screen message (OnScreenMessage)) data or the emergency information data access URL; and (2) the start time at which the emergency information is displayed overlaid on the image of the broadcast content and the duration of the overlaid display.

(Step S222)

Then, in step S222, the application control unit 431 of the tuner-equipped/not-equipped receiving device output data control unit 430 executes the process corresponding to the event information received from the reproduction control unit (DASH client) 432.

Specifically, in a case where the application presentation content is displayed on the display unit, the application control unit 431 performs the process of causing the display of the application presentation content to be stopped.

Specifically, for example, the display of the weather forecast information presentation content or the like described above with reference to FIG. 7 is stopped.

With this process, it is possible for the user (viewer) to reliably check the emergency information delivered overlaid on the image of the broadcast content.

(Step S223)

Then, the reproduction control unit (DASH client) 432 of the tuner-equipped/not-equipped receiving device output data control unit 430 acquires the AV content or the like from the segment received through the tuner-equipped receiving device middleware 420, and executes the reproduction process.

As described above, in addition to the process of receiving and reproducing the AV segment, the reproduction control unit (DASH client) 432 of the tuner-equipped/not-equipped receiving device output data control unit 430 can acquire the event information inserted MPD or the event information segment generated by the tuner-equipped receiving device middleware 420 and detect that the emergency information is overlaid on the image of the broadcast content.

Further, as the event information is transferred to the application control unit 431, it is possible to cause the display of the application presentation content being executed by the application control unit to be stopped, prevent the emergency information overlaid on the image of the broadcast content from being hidden by the application presentation content, and cause the user to reliably check the emergency information.

[8-2. Configuration for Giving a Notification of Signaling Data Application Type Emergency Information Delivery Notification as Event Information]

Next, a configuration for giving a notification of the signaling data application type emergency information delivery notification as the event information will be described.

For example, the signaling data application type emergency information delivery notification (AEAT Message Notification) is an emergency information notification scheme in which the message or the evacuation route information serving as the emergency information is transmitted using the communication route different from the normal program delivery route, for example, the communication route of the signaling data (LLS) described above as described above with reference to FIG. 8.

The transmission process of the emergency information according to the AEAT or CAP format described above with reference to FIG. 13 is executed in accordance with the signaling data application type emergency information delivery scheme.

Note that as described above, there are the following two types as a DASH event transfer scheme:

(a) the MPD-applied event notification scheme for inserting the event information into the MPD which is the signaling data and transferring the resulting MPD; and (b) the segment-applied (In-band) event notification scheme for inserting the event information into the segment and transferring the resulting segment.

Processing schemes in which the two types of event transfer scheme are applied to the signaling data application type emergency information delivery notification will be sequentially described.

Further, in both cases of (a) and (b), for example, the event information is transferred from the middleware 110 of the tuner-equipped receiving device 30 illustrated in FIGS. 10 and 11 to the reproduction control units (DASH clients) 131 and 151 of the tuner-equipped receiving device 30 and the tuner-not-equipped receiving device 40.

[8-2-1. Notification Configuration of Signaling Data Application Type Emergency Information Delivery Notification to which MPD-Applied Event Notification Scheme is Applied]

First, a notification configuration of the signaling data application type emergency information delivery notification to which the MPD-applied event notification scheme is applied will be described.

A process of generating the "signaling data application type emergency information (AEAT) delivery event (AEAT-Delivered Event)" for informing that the signaling data application type emergency information delivery notification is received using the MPD-applied event notification scheme is executed in the SLS signaling analyzing unit (MPD event inserting unit) 115 of the tuner-equipped receiving device 30 illustrated in FIGS. 10 and 11.

The signaling data application type emergency information (AEAT) delivery event (AEATDelivered Event) is a scheme in which the message, the evacuation route information, or the like serving as the emergency information is transmitted to the receiving device using the communication route different from the normal program delivery route, for example, the communication route of the signaling data (LLS) described above.

However, similarly to the on-screen message type emergency information delivery notification process configuration described above, in this scheme, the transmission of the emergency information is performed by the transmitting device 20 such as the broadcasting server 21 when an emergency situation occurs, and the execution timing thereof is unpredictable.

Therefore, the activation time of the event is unable to be described.

Therefore, similarly to those described above in the MPD-applied event notification scheme of the on-screen message type, the following process steps (S01) to (S03) are executed.

(S01) The LLS signaling analyzing unit 113 of the middleware 110 detects the signaling data application type emergency information delivery notification (On Screen Message Notification) from the signaling data (LLS) and notifies the SLS signaling analyzing unit (MPD event inserting unit) 115 of the detected information.

(S02) The SLS signaling analyzing unit (MPD event inserting unit) 115 generates the signaling data application type emergency information (AEAT) delivery event (AEAT Delivered Event) and stores the MPD in which the signaling data application type emergency information (AEAT) delivery event (AEAT delivered event) is recorded in the cache unit (proxy cache) 121.

Further, a notification indicating the MPD being used by the reproduction control units (DASH clients) 131 and 151 is changed or updated is given to the reproduction control units (DASH clients) 131 and 151 using the existing DASH event notification mechanism.

(S03) The reproduction control units (DASH clients) 131 and 151 receives the MPD update event notification, applies the message data recorded in this event notification, and executes the MPD update process. In other words, in step (S02), the reproduction control units (DASH clients) 131 and 151 are caused to acquire the MPD in which the signaling data application type emergency information (AEAT) delivery event (AEATDelivered Event) which is generated by the SLS signaling analyzing unit (MPD event inserting unit) 115 and stored in the cache unit (proxy cache) 121 is recorded as the updated MPD.

With the MPD update process of steps (S01) to (S03), the reproduction control units (DASH clients) 131 and 151 can acquire the MPD in which the "signaling data application type emergency information (AEAT) delivery event (AEAT-Delivered Event)" is recorded.

The reproduction control units (DASH clients) 131 and 151 can detect that the emergency information message has been delivered or is delivered as the signaling data (for example, LLS) with reference to the updated MPD.

Further, the existing method specified in the DASH specification can be applied as the event notification process of giving a notification indicating that the MPD described in step (S02) has been updated as described above.

One is an MPD validity expiration notification event, and the other is an MPD patch (notification) event.

As described above, with the process of steps (S01) to (S03), the reproduction control units (DASH clients) 131 and 151 can acquire the updated MPD in which the signaling data application type emergency information (AEAT) delivery event (AEATDelivered Event) is recorded.

FIG. 25 illustrates a data example of the MPD in which the signaling data application type emergency information (AEAT) delivery event (AEATDelivered Event) information is recorded.

For example, the MPD has the following description.

```
<MPD availabilityStartTime="2011-12-25T12:30:00
<Period startTime='0'>
...
<EventStream schemeIdUri='urn:atsc:AEATDelivered'
timescale='1000'>
<Event presentationTime='(difference (elapsed time)
from a period start time of the a target period (Period) at
which an event is started (activated))
(signaling data application type emergency information
(AEAT) data or emergency information (AEAT) data access URL)
</Event>
....
</EventStream>
...
<AdaptationSet>
...
</Period>
</MPD>
```

Data content of the above MPD will be described.

<MPD availabilityStartTime="2011-12-25T12:30:00

This data record recording area is a recording area of start time information of a first period corresponding to data recorded in this MPD. For example, a UTC time is used as the time information.

<Period startTime='0'>

This data record recording area is a period start time information recording area.

An offset time from a start time (MPD/@availabilityStartTime) specified in the MPD is recorded.

<EventStream schemeIdUri='urn:atsc:AEATDelivered' timescale='1000'>

This data record recording area is a recording area of event stream designation information indicating an event type or the like and time scale information.

It is possible to confirm that the event is the signaling data application type emergency information (AEAT) delivery event (AEATDelivered Event) through "EventStream schemeIdUri='urn:atsc:AEATDelivered'"

Further, "timescale='1000'" indicates that a unit time of a presentation time recorded below is $1/1000$ seconds.

<Event presentationTime='(difference (elapsed time) from a period start time of the a target period (Period) at which an event is started (activated))

(signaling data application type emergency information (AEAT) data or emergency information (AEAT) data access URL)

This data record recording area is a recording area of event data and event scheduling data such as an activation (execution start or the like) time and a duration of an event.

In the case of the signaling data application type emergency information (AEAT) delivery event, a start time at which the emergency information (AEAT) is delivered and a duration thereof can be recorded.

As the event data, for example, the substantive data of the emergency information message, the access information thereof, or the like is recorded.

<AdaptationSet>
<Representation/>
<Representation/>

The above recording areas are data recording areas in which information of each data type is recorded, and in the case of the signaling data application type emergency information (AEAT) delivery application, identification information or the like of a broadcast stream on which the emergency information is displayed overlaid is recorded.

For example, the reproduction control units (DASH clients) 131 and 151 illustrated in FIGS. 10 and 11 acquire data from the segment with reference to the MPD, continuously execute the output control for the broadcast stream, and acquire the event notification information from the stream of the segment in accordance with the segment-applied (In-band) event notification scheme during this process period.

The reproduction control units (DASH clients) 131 and 151 acquire the updated MPD in which the signaling data application type emergency information (AEAT) delivery event (AEATDelivered Event) is stored, that is, the MPD in which the signaling data application type emergency information (AEAT) delivery event (AEATDelivered Event) having the configuration described with reference to FIG. 25 is recorded in accordance with the event information.

The reproduction control units (DASH clients) 131 and 151 directly acquire the emergency information (AEAT) configuration data from the signaling data application type emergency information (AEAT) delivery event (AEATDelivered Event) recorded in the updated MPD or acquire the emergency information (AEAT) from the cache unit 121 of the proxy server 120 in accordance with the access information of the emergency information (AEAT) recorded in the updated MPD.

Further, in a case where the signaling data (LLS) storing the emergency information (AEAT) transmitted from the transmitting device 20 is received, the middleware 110 executes a process of storing the received emergency information (AEAT) in the cache unit 121 of the proxy server 120.

The event extracting units 205 and 255 of the reproduction control units (DASH clients) 131 and 151 further transfer the signaling data application type emergency information (AEAT) delivery event (AEATDelivered Event) recorded in the MPD to the application control units 133 and 153 or the emergency information control units 140 and 160.

In a case where the emergency information (AEAT) data is not included in the event, the emergency information (AEAT) is acquired from the cache unit 121 of the proxy server 120 in accordance with the access information of the emergency information (AEAT) recorded in the updated MPD and transferred to the application control units 133 and 153 or the emergency information control units 140 and 160.

The application control units 133 and 153 or the emergency information control units 140 and 160 analyze the emergency information (AEAT) acquired through the reproduction control units (DASH clients) 131 and 151 and execute a process of displaying the emergency message, the map information of the evacuation route, or the like stored in the emergency information (AEAT).

Specifically, for example, the display process for the emergency information described above with reference to FIGS. 8 and 9 is executed.

With this process, it is possible for the user (viewer) to reliably check the emergency information delivered as the signaling data.

[8-2-2. Notification Configuration of Signaling Data Application Type Emergency Information Delivery Notification to which Segment-Applied (in-Band) Event Notification Scheme is Applied]

Then, a notification configuration of the signaling data application type emergency information delivery notification to which the segment-applied (In-band) event notification scheme is applied will be described.

A process of generating the "signaling data application type emergency information (AEAT) delivery event (AEATDelivered Event)" for informing that the signaling data application type emergency information delivery notification is received using the segment-applied (In-band) event notification scheme is executed in the in-band event inserting unit 118 of the tuner-equipped receiving device 30 illustrated in FIGS. 10 and 11.

The signaling data application type emergency information (AEAT) delivery event (AEATDelivered Event) is a scheme in which the message, the evacuation route information, or the like serving as the emergency information is transmitted to the receiving device using the communication route different from the normal program delivery route, for example, the communication route of the signaling data (LLS) described above.

The in-band event inserting unit 118 of the tuner-equipped receiving device 30 illustrated in FIG. 11 inserts the signaling data application type emergency information (AEAT) delivery event (AEATDelivered Event) into the segment.

A general data configuration example of the event information storage box (emsg) in the MP4 format data used in the segment-applied event notification scheme (=In-band Event Signaling) has been described above with reference to FIG. 20.

FIG. 26 illustrates a data configuration example of the event information storage box (emsg) in which the signaling data application type emergency information (AEAT) delivery event (AEATDelivered Event) is set in the segment.

The event information storage box (emsg) has, for example, the following description.

box_type='emsg'
scheme_id_uri="urn:atsc:AEATDelivered"
value=0
timescale=1000
presentation_time_delta=0
event_duration=0xFFFF
id=1
message_data[ ]=(emergency information (AEAT) data or emergency information (AEAT) data access URL)

Data content of the event information storage box (emsg) will be described.

box_type='emsg'

This data record recording area is a box type recording area. It describes that this box (the data storage box specified in MP4) is the event information storage box (emsg).

scheme_id_uri="urn:atsc:AEATDelivered"
value=0

This data record recording area is a recording area of event designation information indicating an event type or the like.

It is possible to confirm that this event is the signaling data application type emergency information (AEAT) delivery event (AEATDelivered Event) through "scheme_id_uri="urn:atsc:AEATDelivered"".

Further, it is possible to define an event type or the like through an optional "value".

timescale=1000

This data record recording area is a recording area of time scale information.

"Timescale='1000'" indicates that a unit time of the presentation time (presentationTime) recorded below is $1/1000$ seconds.

presentation_time_delta=0
event_duration=0xFFFF

This data record recording areas is a recording area of event scheduling data such as the activation (execution start or the like) time of the event or the duration.

In the case of the signaling data application type emergency information (AEAT) delivery event, a start time at which the emergency information (AEAT) is delivered and a duration thereof can be recorded.

As the event data, for example, the substantive data of the emergency information message, the access information thereof, or the like can be recorded.

id=1

This data recording area is an event identification information recording area.

message_data[ ]=(emergency information (AEAT) data or emergency information data access URL)

This data recording area is a recording area of the event data.

The event data includes substantive data, metadata, data such as a command, or the like necessary for executing an event, access information thereof, or the like.

For example, the substantive data of the emergency information message, the access information, or the like is recorded.

As described above, in the segment-applied event notification scheme (=In-band Event Signaling), the event information can be recorded in the segment stream (in-stream) and transferred.

In the segment-applied event notification scheme (=In-band Event Signaling), the event type can be defined in the "scheme_id_uri" field and the optional "value" field.

Further, it is possible to add the event data, that is, the substantive data, the metadata, the data such as the command, or the like necessary for executing the event, the access information thereof, or the like to the "message_data" field.

For example, the reproduction control units (DASH clients) 131 and 151 illustrated in FIGS. 10 and 11 acquire data from the segment with reference to the MPD, continuously execute the output control for the broadcast stream, and acquire the signaling data application type emergency information (AEAT) delivery event (AEATDelivered Event) as the event notification information from the stream of the segment in accordance with the segment-applied event notification scheme (=In-band Event Signaling) during this process period.

The reproduction control units (DASH clients) 131 and 151 directly acquire the emergency information (AEAT) configuration data from the signaling data application type emergency information (AEAT) delivery event (AEATDelivered Event) recorded in the segment or acquire the emergency information (AEAT) from the cache unit 121 of the proxy server 120 in accordance with the access information of the emergency information (AEAT) recorded in the updated MPD.

The event extracting units 205 and 255 of the reproduction control units (DASH clients) 131 and 151 further transfer the signaling data application type emergency information (AEAT) delivery event (AEATDelivered Event) in the segment to the application control units 133 and 153 or the emergency information control units 140 and 160.

In a case where the emergency information (AEAT) data is not included in the event, the emergency information (AEAT) is acquired from the cache unit 121 of the proxy server 120 in accordance with the access information of the emergency information (AEAT) recorded in the segment and transferred to the application control units 133 and 153 or the emergency information control units 140 and 160.

The application control units 133 and 153 or the emergency information control units 140 and 160 analyze the emergency information (AEAT) acquired through the reproduction control units (DASH clients) 131 and 151 and execute a process of displaying the emergency message, the map information of the evacuation route, or the like stored in the emergency information (AEAT).

Specifically, for example, the display process for the emergency information described above with reference to FIGS. 8 and 9 is executed.

With this process, it is possible for the user (viewer) to reliably check the emergency information delivered as the signaling data.

[8-2-3. Generation and Transfer of Event Based on Signaling Data Application Type Emergency Information Delivery Notification and Execution Sequence for Event-Based Process]

As described above, the signaling data application type emergency information (AEAT) delivery event (AEATDelivered Event) which is a newly defined event can give a notification indicating that the "signaling data application type emergency information delivery notification (AEAT-message notification:AEAT Message Notification)" is delivered through the signaling data (LLS) from the middleware to the reproduction control unit (DASH client).

The following two types of event notification schemes can be used as the event notification:

(a) the MPD-applied event notification scheme (=MPD Event); and (b) the segment-applied event notification scheme (=Inband Event Signaling).

Generation and transfer of the signaling data application type emergency information (AEAT) delivery event (AEAT-Delivered Event) using the two types of event notification schemes and an execution sequence for an event-based process will be sequentially described below.

A process sequence among the following three devices will be described with reference to FIG. 27:

(1) a transmitting device 410 that generates and outputs the AV segment, the emergency information, the MPD, the signaling data, and the like;

(2) a tuner-equipped receiving device middleware 420 that receives the AV segment, the emergency information, the MPD, the signaling data, and the like and generates an event inserted MPD or an event inserted segment in which the event information in which a notification situation or the like of the emergency information is recorded is recorded in the MPD or the segment; and (3) a tuner-equipped/not-equipped receiving device output data control unit 430 that receives the AV segment, the event inserted MPD or the event inserted segment, and the like from the tuner-equipped receiving device middleware 420 and executes an AV segment reproduction process or a process corresponding to the event information.

Further, the tuner-equipped receiving device middleware 420 corresponds to the middleware 110 of the tuner-equipped receiving device 30 illustrated in FIGS. 10 and 11.

Further, the tuner-equipped/not-equipped receiving device output data control unit 430 corresponds to the reproduction control units (DASH clients) 131 and 151, the output control units 132 and 152, the application control units 133 and 153, and the emergency information control units 140 and 160 of the tuner-equipped receiving device 30 and the tuner-not-equipped receiving device 40 illustrated in FIGS. 10 and 11.

Figure 27:
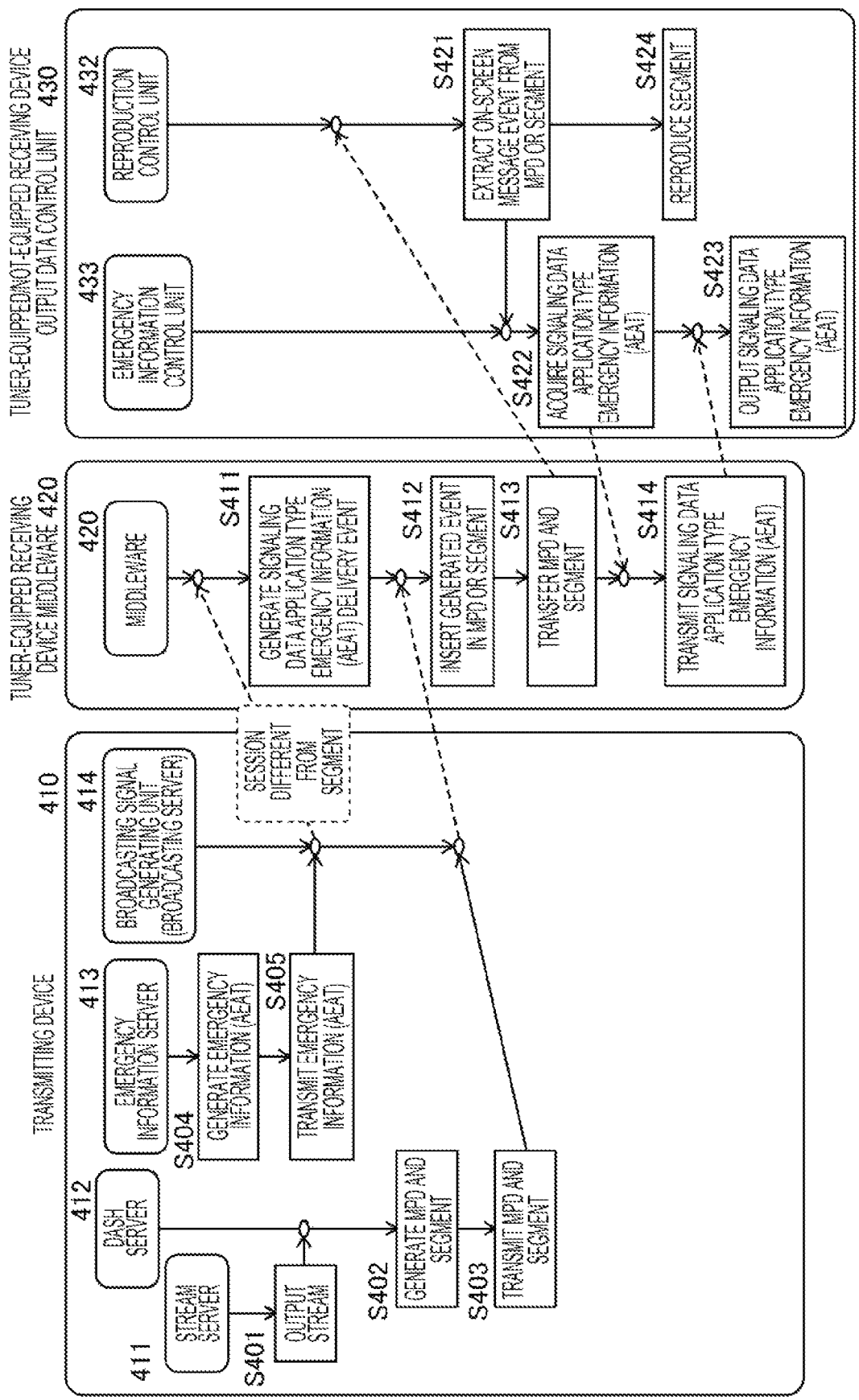
FIG. 27 is a diagram for describing generation, transmission, and usage sequences of emergency information and a signaling data application type emergency information delivery event.

Further, in the transmitting device 410 illustrated in FIG. 27, the following four components are divided:

a stream server 411 that generates a stream of reproduction content and the like;

a DASH server 412 that generates the MPD or the segment;

an emergency information server 413 that generates the emergency information, a broadcasting signal generating unit (broadcasting server) 414 that executes transmission of the MPD, the segment, and the emergency information.

The above components are described as being divided into processing units in order to facilitate understanding of various processes executed by the transmitting, but for example, components that have the functions provided by the broadcasting server 21 and the data delivery server 22 illustrated in FIG. 1 and are executed by a single transmitting device (transmitting server) may be provided.

First, a process executed by the transmitting device 410 will be described.

(Step S401)

Then, in step S401, the stream server 411 of the transmitting device 410 generates a stream including an image, an audio, or the like serving as broadcast content configuration data and outputs the stream to the DASH server.

(Steps S402 and S403)

Then, the DASH server 412 of the transmitting device 410 generates an MPD or a segment serving as signaling data in step S402, and transmits the MPD or the segment through the broadcasting signal generating unit (broadcasting server) 414 in step S403.

The segment includes an image or an audio serving as the broadcast content configuration data.

The MPD includes various control information, the guide information, or the like to be applied to the reproduction process for the broadcast content.

As described above with reference to FIG. 14 and others, the MPD has a configuration capable of describing the attribute information and the control information in a predetermined range unit for each stream of each image or each audio.

Further, in a case where the transmitting device 410 is the broadcasting station or the like, the broadcasting signal generating unit (broadcasting server) 414 carries out a process of placing the MPD or the segment in the broadcast wave and transmitting the resulting signal.

On the other hand, in a case where the transmitting device 410 is the data delivery server that executes data transmission via the network such as the Internet, the transmitting device 410 transmits the MPD or the segment via the network.

(Steps S404 and S405)

First, the emergency information server 413 of the transmitting device 410 generates the emergency information (AEAT) to be transmitted as the signaling data in step S404 and transmits the emergency information (AEAT) through the broadcasting signal generating unit (broadcasting server) 414 in step S405.

The emergency information generated by the emergency information server 413 is, for example, the emergency information (AEAT) having the data format described above with reference to FIG. 13.

The AEAT includes, for example, the emergency information message serving as the emergency information, display data such as the map information indicating the evacuation route, the access information of the display data, and the like.

Further, the signaling data transmission is executed using a session different from a communication session such as the broadcast stream.

Next, a process of the tuner-equipped receiving device middleware 420 will be described.

The tuner-equipped receiving device middleware 420 has a configuration similar to the middleware 110 of the tuner-equipped receiving device 30 illustrated in FIG. 10 and FIG. 11.

The tuner-equipped receiving device middleware 420 receives the AV segment, the emergency information, the MPD, the signaling data, and the like transmitted by the transmitting device 410 and generates an event inserted MPD or an event inserted segment in which the event information storing emergency information (AEAT) itself or the access information of the emergency information (AEAT) is recorded in the MPD or the segment.

Further, the generated event inserted MPD or the generated event inserted segment is transferred to the tuner-equipped/not-equipped receiving device output data control unit 430.

A process of steps executed by the tuner-equipped receiving device middleware 420 will be described.

(Step S411)

Upon receiving the signaling data application type emergency information (AEAT) from the transmitting device 410, the tuner-equipped receiving device middleware 420 executes the process of generating the signaling data application type emergency information (AEAT) delivery event in step S411.

In other words, the tuner-equipped receiving device middleware 420 receives the signaling data (LLS) storing the emergency information (AEAT) transmitted from the transmitting device 410 in the process of step S405 of the emergency information server of the transmitting device 410.

In response to the reception of the signaling data (LLS), the tuner-equipped receiving device middleware 420 generates the event information to be stored in the MPD or the segment.

In this example, the emergency information transmitted by the transmitting device 410 is the signaling data application type emergency information (AEAT), and the tuner-equipped receiving device middleware 420 generates the signaling data application type emergency information (AEAT) delivery event (AEATDelivered Event).

As described above, the signaling data application type emergency information (AEAT) delivery event (AEATDelivered Event) is the event information for giving a notification indicating that the "signaling data application type emergency information (AEAT)" is delivered through the signaling data (LLS) and data including the emergency information (AEAT) configuration data or the access information of the emergency information (AEAT).

(Step S412)

Then, in step S412, the tuner-equipped receiving device middleware 420 records the event information generated in step S411, that is, the signaling data application type emergency information (AEAT) delivery event (AEATDelivered Event) information in at least one of the MPD and the segment.

As described above, there are the following two types as the DASH event transfer scheme:

(a) an MPD-applied event notification scheme for inserting the event information into the MPD which is the signaling data and transferring the resulting MPD; and (b) a segment-applied (In-band) event notification scheme for inserting the event information into the segment and transferring the resulting segment.

In a case where the MPD-applied event notification scheme is applied, the signaling data application type emergency information (AEAT) delivery event (AEATDelivered Event) is inserted into the MPD.

With this process, the MPD in which the signaling data application type emergency information (AEAT) delivery event (AEATDelivered Event) information described above with reference to FIG. 25 is recorded is generated.

Further, this process is executed in the SLS signaling generating unit (MPD event inserting unit) 115 of the middleware 110 illustrated in FIG. 10.

On the other hand, in a case where the segment-applied (In-band) event notification scheme is applied, the signaling data application type emergency information (AEAT) delivery event (AEATDelivered Event) is inserted into the segment.

With this process, the segment in which the signaling data application type emergency information (AEAT) delivery event (AEATDelivered Event) information described above with reference to FIG. 26 is recorded is generated.

Further, this process is executed in the in-band event inserting unit 118 of the middleware 110 illustrated in FIG. 10.

For example, the following data is included in the MPD or the segment into which the signaling data application type emergency information (AEAT) delivery event (AEATDelivered Event) is inserted:

(1) the emergency information (AEAT) data or the emergency information (AEAT) data access URL; and (2) the delivery start time and the delivery duration of the emergency information.

Such data are recorded.

(Step S413)

Then, in step S413, the tuner-equipped receiving device middleware 420 transfers the MPD or the segment to the tuner-equipped/not-equipped receiving device output data control unit 430.

Further, this process is specifically executed through the proxy server 121.

The reproduction control unit (DASH client) of the tuner-equipped/not-equipped receiving device output data control unit 430, that is, the reproduction control units (DASH clients) 131 and 151 illustrated in FIGS. 10 and 11 access the cache unit (proxy cache) 121 of the proxy server 120 and acquire the MPD or the segment.

The MPD or the segment into which the signaling data application type emergency information (AEAT) delivery event (AEATDelivered Event) generated in step S412 is inserted by the reproduction control units (DASH clients) 131 and 151 is included in the MPD or the segment acquired by the reproduction control units (DASH clients) 131 and 151.

Further, in order to cause the tuner-equipped/not-equipped receiving device output data control unit 430, that is, the reproduction control units (DASH clients) 131 and 151 illustrated in FIGS. 10 and 11 to acquire the MPD in which the signaling data application type emergency information (AEAT) delivery event (AEATDelivered Event) is inserted, it is necessary to perform the MPD update notification in advance as described above.

In other words, as described above, the tuner-equipped receiving device middleware 420 first executes the existing MPD update event notification process to which the segment-applied (In-band) event notification scheme is applied.

In other words, a notification indicating that the MPD update has been performed is given to the reproduction control units (DASH clients) 131 and 151.

In response to this notification, the reproduction control units (DASH clients) 131 and 151 can acquire the MPD into which the signaling data application type emergency information (AEAT) delivery event (AEATDelivered Event) is inserted without delay.

(Step S414)

A process of step S414 is a process which is executed in a case where the access information of the emergency information (AEAT) is recorded in the MPD or the segment transferred from the tuner-equipped receiving device middleware 420 to the tuner-equipped/not-equipped receiving device output data control unit 430 in step S413, and the emergency information (AEAT) data is not included or in a case where new output (display) data is necessary.

In this case, the tuner-equipped receiving device middleware 420 transfers the emergency information (AEAT) including the output data to the tuner-equipped/not-equipped receiving device output data control unit 430 in response to the emergency information (AEAT) acquisition request from the tuner-equipped/not-equipped receiving device output data control unit 430.

Next, a process executed by the tuner-equipped/not-equipped receiving device output data control unit 430 illustrated on the right side of FIG. 27 will be described.

FIG. 27 illustrates an emergency information control unit 433 and the reproduction control unit 432 of the tuner-equipped/not-equipped receiving device output data control unit 430. These components correspond to the components of the emergency information control units 140 and 160 and the reproduction control units 131 and 151 of the tuner-equipped receiving device 30 and the tuner-not-equipped receiving device 40 illustrated in FIGS. 10 and 11.

Further, in the example illustrated in FIG. 27, the emergency information control unit 433 is set to execute data rendering for the emergency message, the map, or the like included in the emergency information (AEAT), but for example, the application control units 133 and 153 illustrated in FIGS. 10 and 11 may execute the data rendering for the emergency message, the map, or the like included in the emergency information (AEAT).

In other words, it is also possible to replace the emergency information control unit 433 illustrated in FIG. 27 with the application control unit.

(Step S421)

First, the reproduction control unit (DASH client) 432 of the tuner-equipped/not-equipped receiving device output data control unit 430 extracts the signaling data application type emergency information (AEAT) delivery event (AEAT-Delivered Event) from the MPD or the segment received through the tuner-equipped receiving device middleware 420 and transfers the signaling data application type emergency information (AEAT) delivery event (AEATDelivered Event) to the emergency information control unit 433.

In other words, the reproduction control unit (DASH client) 432 extracts the signaling data application type emergency information (AEAT) delivery event (AEATDelivered Event) from the MPD in which signaling data application type emergency information (AEAT) delivery event (AEATDelivered Event) information described above with reference to FIG. 22 is recorded or the segment in which the signaling data application type emergency information (AEAT) delivery event (AEATDelivered Event) information described above with reference to FIG. 23 is recorded.

For example, the following data is included in the MPD or the segment into which the signaling data application type emergency information (AEAT) delivery event (AEATDelivered Event) is inserted:

(1) the emergency information (AEAT) data or the emergency information (AEAT) data access URL; and (2) the delivery start time and the duration of the emergency information.

Such data are recorded.

(Steps S422 and S423)

Then, the emergency information control unit 433 of the tuner-equipped/not-equipped receiving device output data control unit 430 acquires the event information received from the reproduction control unit (DASH client) 432 in step S422 and executes a process of outputting the emergency information (AEAT) data to the display unit in step S423.

Further, in a case where the emergency information (AEAT) data to be output (displayed) is included in the event information received from the reproduction control unit (DASH client) 432, the emergency information (AEAT) is acquired from the received event information, and in step S423, the emergency message, the map information, or the like included in the emergency information (AEAT) is displayed.

On the other hand, in a case where the access information of the emergency information (AEAT) is recorded in the event information received from the reproduction control unit (DASH client) 432, and the emergency information (AEAT) data to be output (displayed) is not included, the process of acquiring the emergency information (AEAT) from the tuner-equipped receiving device middleware 420 using the access information, and then, in step S423, the emergency message, the map information, or the like included in the acquired emergency information (AEAT) is displayed.

Further, the emergency information (AEAT) acquired by the tuner-equipped receiving device middleware 420 is stored in the cache unit 121 of the proxy server 120 illustrated in FIG. 10, and the emergency information control unit 433 acquires the emergency information (AEAT) data stored in the cache unit 121 of the proxy server 120. A configuration in which the acquisition processing is executed by the reproduction control unit (DASH client) 432 and provided from the reproduction control unit (DASH client) 432 to the emergency information control unit 433 may be provided.

(Step S424)

Then, the reproduction control unit (DASH client) 432 of the tuner-equipped/not-equipped receiving device output data control unit 430 acquires the AV content or the like from the segment received through the tuner-equipped receiving device middleware 420, and executes the reproduction process.

As described above, in addition to the process of receiving and reproducing the AV segment, the reproduction control unit (DASH client) 432 of the tuner-equipped/not-equipped receiving device output data control unit 430 can acquire the event information inserted MPD or the event information segment generated by the tuner-equipped receiving device middleware 420, detect that the emergency information (AEAT) is transmitted as the signaling data, acquire the emergency information (AEAT) from the signaling data, and display the emergency information (AEAT).

Further, the signaling data application type emergency information has been described as an example of the AEAT, but the process of the present disclosure can be applied to the emergency information which has a format other than the AEAT and is transmitted by applying the signaling data regardless of the format of the emergency information.

9. Configuration Example Including Event Information Transfer Dedicated Server and Client Next, a configuration example using a server and a client dedicated for emergency information-related event information which execute transmission and reception of the emergency information-related event information as modified configurations of the tuner-equipped receiving device 30 and the tuner-not-equipped receiving device 40 described with reference to FIGS. 10 and 11 will be described.

Figure 28:
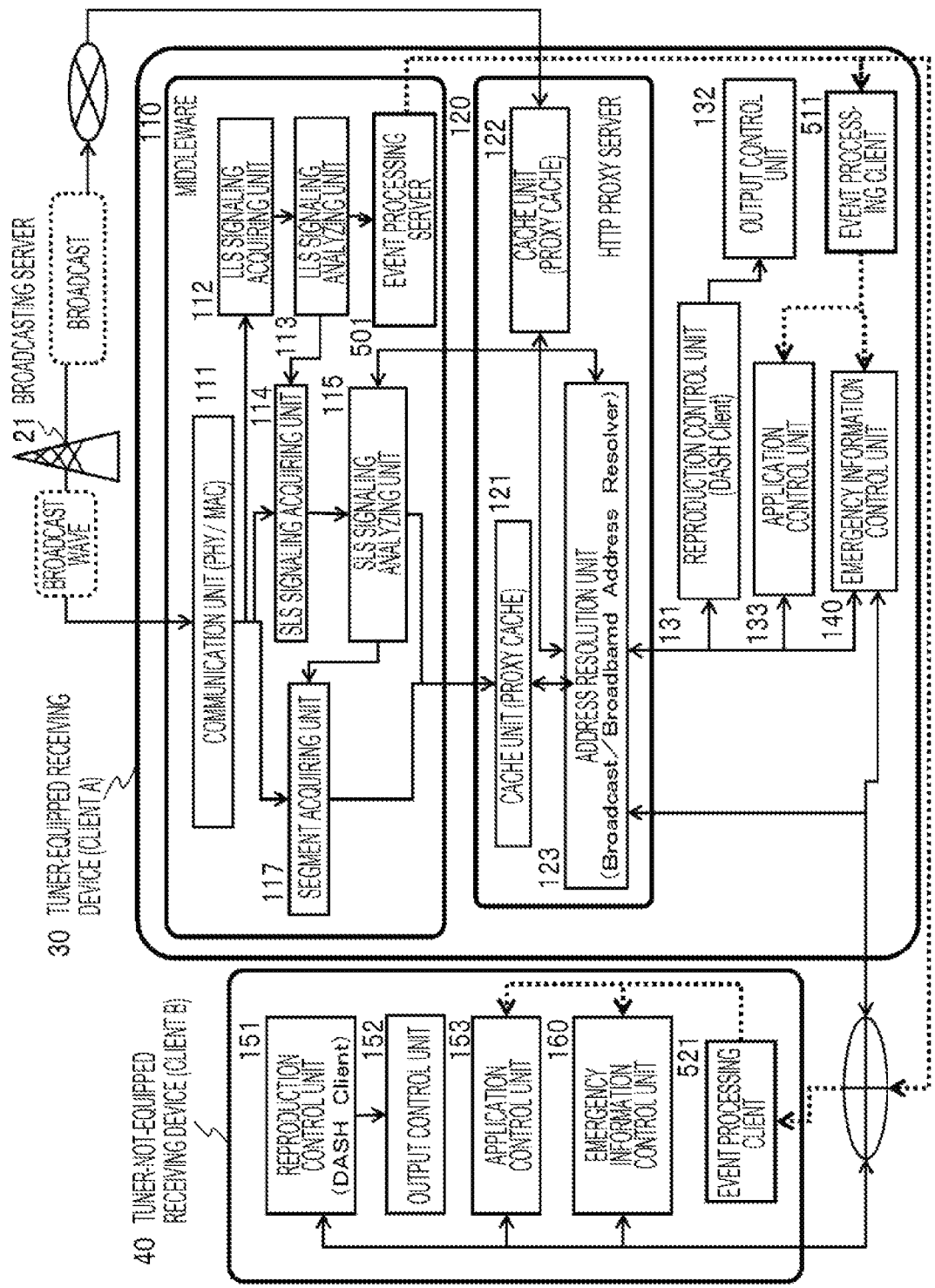
FIG. 28 is a diagram illustrating a configuration example of a receiving device including an event processing server and an event processing client.

As illustrated in FIG. 28, an event processing server 501 that executes a process of transferring an emergency information-related event is installed in the middleware 110 of the tuner-equipped receiving device 30, and event processing clients 511 and 521 are installed in parallel with the reproduction control units (DASH clients) 131 and 151 of the tuner-equipped receiving device 30 and the tuner-not-equipped receiving device 40.

Differences between the configuration illustrated in FIG. 28 and the configuration illustrated in FIGS. 10 and 11 described above are as follows.

(a) The middleware 110 of the tuner-equipped receiving device 30:

(a1) addition of the event processing server 501 which executes the process of transferring the emergency information-related event;

(a2) deletion of the in-band event inserting unit 118 illustrated in FIG. 10; and (a3) deletion of the MPD event insertion function of the SLS signaling analyzing unit 115 illustrated in FIG. 10.

(b) The reproduction control units (DASH clients) 131 and 151 of the tuner-equipped receiving device 30 and the tuner-not-equipped receiving device 40:

(b1) addition of the event processing clients 511 and 521 in parallel with the reproduction control units (DASH clients) 131 and 151; and (b2) deletion of event extracting units 205 and 255 in the reproduction control units (DASH clients) 131 and 151 illustrated in FIG. 11.

The remaining components of the configuration illustrated in FIG. 28 are the same as those of FIGS. 10 and 11 described above.

In the configuration illustrated in FIG. 28, if the signaling data (LLS) including the notification related to the emergency information is received, the LLS signaling analyzing unit 113 transfers the signaling data to the event processing server 501.

Specifically, for example, it is the signaling data (LLS) including the notification data described above with reference to FIGS. 12 and 13.

As described above, the data illustrated in FIG. 12 is (a) the signaling data (LLS) having the on-screen message type emergency information delivery notification data (On Screen Message Notification) as a component.

Further, the data illustrated in FIG. 13 is (b) the signaling data (LLS) having the signaling data application type emergency information delivery notification data (AEAT Message Notification) as a component.

If the signaling data (LLS) including the notification related to the emergency information of either (a) or (b) is received, the LLS signaling analyzing unit 113 of the middleware 110 illustrated in FIG. 28 transfers the signaling data to the event processing server 501.

The event processing server 501 generates the event information based on the signaling data (LLS) including the notification related to the emergency information of either (a) or (b) received from the LLS signaling analyzing unit 113 and outputs the generated event information to the event processing clients 511 and 521.

Further, the event information generated by the event processing server 501 is the event information including the data of either (a) or (b):

(a) the signaling data (LLS) having the on-screen message type emergency information delivery notification data (On Screen Message Notification) as a component; and (b) the signaling data (LLS) having the signaling data application type emergency information delivery notification data (AEAT Message Notification) as a component.

Further, an event information relay session which is a secure session dedicated for emergency information transfer is established between the event processing server 501 and the event processing clients 511 and 521 in advance, and an always-connected state is maintained.

The event processing server 501 transfers the event information based on the signaling data (LLS) including the notification related to the emergency information to the event processing clients 511 and 521 through the event information relay session.

The event processing clients 511 and 521 analyze the event information received from the event processing server 501 and execute a necessary process in accordance with an analysis result.

Specifically, in a case where the received event information is the event information including (a) the on-screen message type emergency information delivery notification (On Screen Message Notification), a notification indicating the event information is given to the application control units 133 and 153, and in a case where application content is presented by an application being executed in the application control units 133 and 153, the presentation process for the presentation content is stopped.

On the other hand, in a case where the received event information is the event information including (b) the signaling data application type emergency information delivery notification (AEAT Message Notification), a notification indicating the event information is given to the emergency information control units 140 and 160 or the application control units 133 and 153, and a process of causing the acquisition of the emergency information (AEAT) and the process of displaying the message or the like included in the emergency information (AEAT) to be executed is performed in the emergency information control units 140 and 160 or the application control units 133 and 153.

[9-1. Generation and Transfer of Event Based on On-Screen Message Type Emergency Information Delivery Notification and Execution Sequence for Event-Based Process]

Next, a specific process sequence using the configuration including the event processing server 501 and the event processing clients 511 and 521 illustrated in FIG. 28 will be described.

First, generation and transfer of the event based on the on-screen message type emergency information delivery notification and the execution sequence for the event-based process will be described with reference to a sequence diagram illustrated in FIG. 29.

Figure 29:
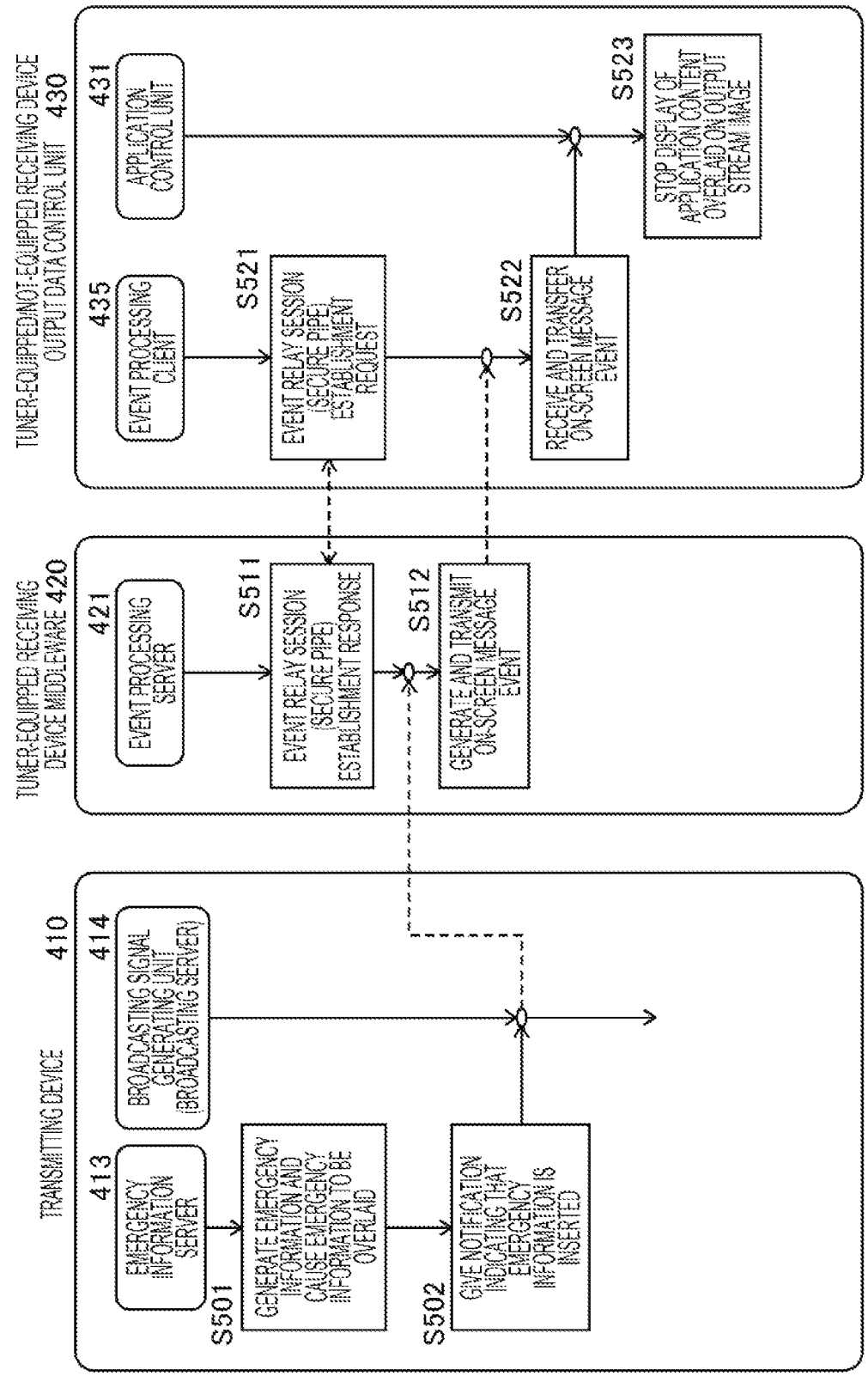
FIG. 29 is a diagram for describing generation, transmission, and usage sequences of emergency information and an on-screen message events using an event processing server and an event processing client.

FIG. 29 illustrates the following three devices:

(1) the transmitting device 410;

(2) the tuner-equipped receiving device middleware 420; and (3) the tuner-equipped/not-equipped receiving device output data control unit 430.

Further, in the example described above with reference to FIGS. 24 and 27, various configurations for executing generation and output of the AV segment, the MPD, and the like have been described, but in the sequence diagram illustrated in FIG. 29, a configuration of the process of generating and transmitting the AV segment and the MPD is omitted, and only a process for the emergency information is illustrated.

In parallel with the process for the emergency information described with reference to FIG. 28, a process of generating, transmitting, and using (reproducing) the AV segment and the MPD is executed.

First, a process executed by the transmitting device 410 will be described.

(Step S501)

First, the emergency information server 413 of the transmitting device 410 generates the emergency information to be displayed overlaid on the image constituting the broadcast content, and causes the event information to be overlaid on the image generated by the stream server 411.

For example, as described above with reference to FIG. 5 and the like, the emergency information to be delivered overlaid on the image of the broadcast content, that is, the on-screen message type emergency information is generated and overlaid on the image generated by the stream server 411.

(Step S502)

Then, the emergency information server 413 of the transmitting device 410 outputs a notification indicating that the on-screen message type emergency information is overlaid on the image of the broadcast content to the receiving device via the broadcasting signal generating unit (broadcasting server) 414.

This is a transmission process of the signaling data (LLS) indicating that the on-screen message (OnScreenMessage) type emergency information is delivered (the on-screen message notification).

The signaling data transmission is executed using a session different from a communication session such as a broadcast stream.

Next, a process of the tuner-equipped receiving device middleware 420 will be described.

The tuner-equipped receiving device middleware 420 includes an event processing server 421.

The event processing server 421 corresponds to the event processing server 501 in the middleware 110 of the tuner-equipped receiving device 30 illustrated in FIG. 28.

(Step S511)

In step S511, the event processing server 421 of the tuner-equipped receiving device middleware 420 establishes an event information relay session which is a secure session dedicated for the emergency information transfer with an event processing client 435 (=event processing clients 511 and 521 illustrated in FIG. 28) of the tuner-equipped/not-equipped receiving device output data control unit 430.

An always-connected state is maintained in this session.

(Step S512)

Then, the event processing server 421 receives the signaling data (LLS) having the "on-screen message type emergency information delivery notification data (On Screen Message Notification)" as a component transmitted by the transmitting device 410.

The signaling data (LLS) is input through the LLS signaling analyzing unit 113 of the middleware 110 illustrated in FIG. 28.

The event processing server 421 generates the event information based on the signaling data (LLS) including the notification related to the emergency information received from the LLS signaling analyzing unit 113, and transfers the generated event information to the event processing client 435 (=the event processing clients 511 and 521 illustrated in FIG. 28).

Then, the process executed by the tuner-equipped/not-equipped receiving device output data control unit 430 illustrated on the right side of FIG. 29 will be described.

FIG. 29 illustrates an application control unit 431 and an event processing client 435 of the tuner-equipped/not-equipped receiving device output data control unit 430. These configurations correspond to the components of the application control units 133 and 153 and the event processing clients 511 and 521 of the tuner-equipped receiving device 30 and the tuner-not-equipped receiving device 40 illustrated in FIG. 28.

(Step S521)

First, the event processing client 435 of the tuner-equipped/not-equipped receiving device output data control unit 430 establishes the event information relay session which is the secure session dedicated for the emergency information transfer with the event processing server 421 of the tuner-equipped receiving device middleware 420.

An always-connected state is maintained in this session.

(Step S522)

First, the event processing client 435 of the tuner-equipped/not-equipped receiving device output data control unit 430 receives the event information generated on the basis of the signaling data (LLS) having the "on-screen message type emergency information delivery notification data (On Screen Message Notification)" as a component from the event processing server 421 of the tuner-equipped receiving device middleware 420.

Recording information of the "on-screen message type emergency information delivery notification data (On Screen Message Notification)" described above with reference to FIG. 12 is included in the event information.

The event processing client 435 of the tuner-equipped/not-equipped receiving device output data control unit 430 transfers the event information input from the event processing server 421 of the tuner-equipped receiving device middleware 420 to the application control unit 431 (=the application control units 133 and 153 illustrated in FIG. 28).

(Step S523)

Then, in step S523, the application control unit 431 of the tuner-equipped/not-equipped receiving device output data control unit 430 executes a process corresponding to the event information received from the event processing client 435.

Specifically, in a case where the application presentation content is displayed on the display unit, the application control unit 431 performs a process of causing the display of the application presentation content to be stopped.

Specifically, for example, the display of the weather forecast information presentation content or the like described above with reference to FIG. 7 is stopped.

With this process, it is possible for the user (viewer) to reliably check the emergency information delivered overlaid on the image of the broadcast content.

[9-2 Generation and Transfer of Event Based on Signaling Data Application Type Emergency Information Delivery Notification and Execution Sequence for Event-Based Process]

Next, generation and transfer of the event based on the signaling data application type emergency information delivery notification (AEAT Message Notification) and the execution sequence for the event-based process will be described with reference to a sequence diagram illustrated in FIG. 30

Figure 30:
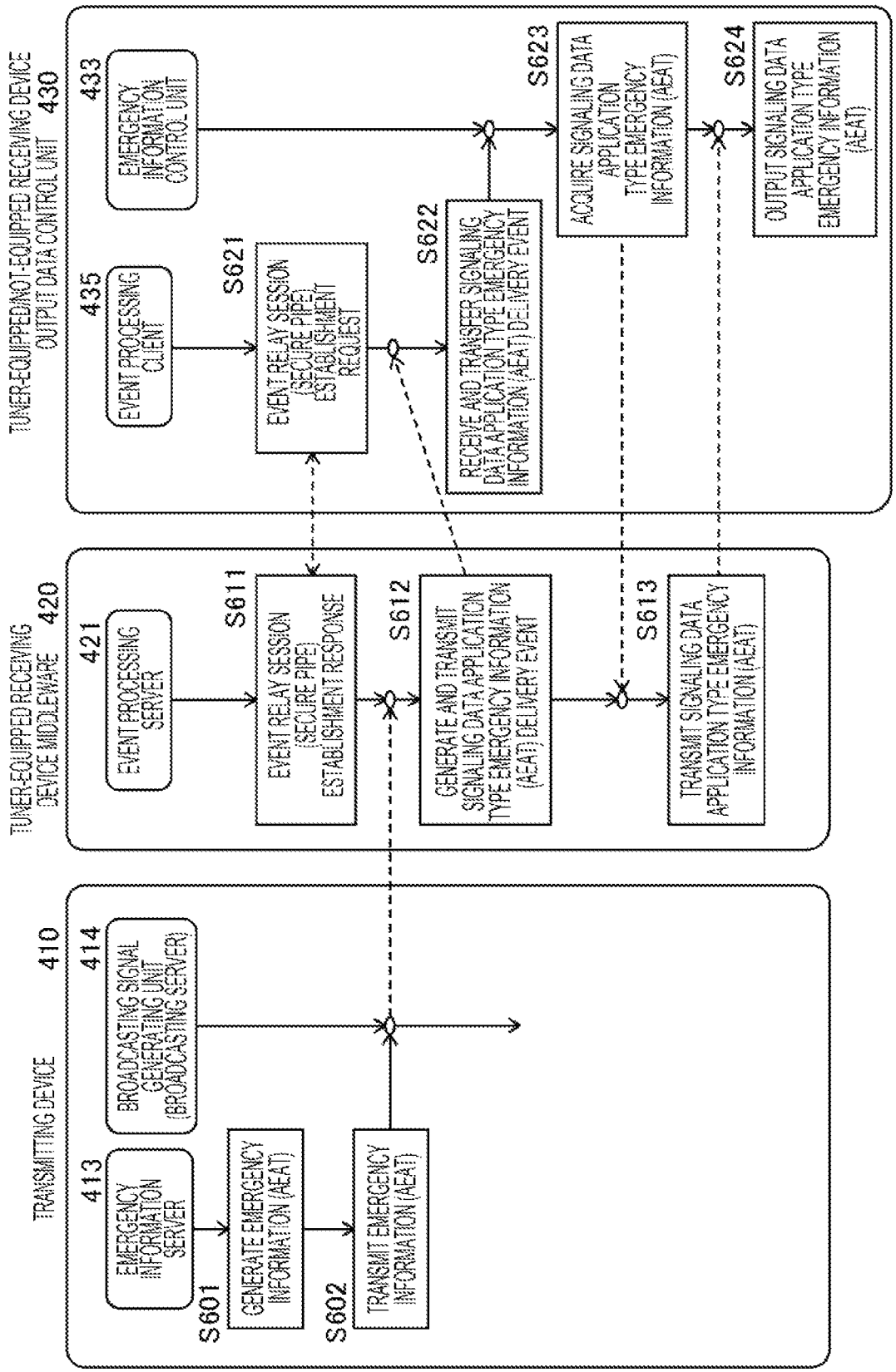
FIG. 30 is a diagram for describing generation, transmission, and usage sequences of emergency information and a signaling data application type emergency information delivery event using an event processing server and an event processing client.

FIG. 30 illustrates the following three devices:

(1) the transmitting device 410;

(2) the tuner-equipped receiving device middleware 420; and (3) the tuner-equipped/not-equipped receiving device output data control unit 430.

Further, in FIG. 30, similarly to FIG. 29, a configuration of the process of generating and transmitting the AV segment and the MPD is omitted, and only a process for the emergency information is illustrated.

In parallel with the process for the emergency information described with reference to FIG. 30, a process of generating, transmitting, and using (reproducing) the AV segment and the MPD is executed.

First, a process executed by the transmitting device 410 will be described.

(Steps S601 and S602)

First, the emergency information server 413 of the transmitting device 410 generates the emergency information (AEAT) to be transmitted as the signaling data in step S601, and transmits the emergency information (AEAT) through the broadcasting signal generating unit (broadcasting server) 414 in step S602.

The emergency information generated by the emergency information server 413 is, for example, the emergency information (AEAT) having the data format described above with reference to FIG. 13.

The AEAT includes, for example, the emergency information message serving as the emergency information, display data such as the map information indicating the evacuation route, the access information of the display data, and the like.

Further, the signaling data transmission is executed using a session different from a communication session such as the broadcast stream.

Then, a process of the tuner-equipped receiving device middleware 420 will be described.

The tuner-equipped receiving device middleware 420 includes the event processing server 421.

The event processing server 421 corresponds to the event processing server 501 in the middleware 110 of the tuner-equipped receiving device 30 illustrated in FIG. 28.

(Step S611)

In step S611, the event processing server 421 of the tuner-equipped receiving device middleware 420 establishes an event information relay session which is a secure session dedicated for the emergency information transfer with an event processing client 435 (=event processing clients 511 and 521 illustrated in FIG. 28) of the tuner-equipped/not-equipped receiving device output data control unit 430.

An always-connected state is maintained in this session.

(Step S612)

Then, the event processing server 421 receives the signaling data (LLS) having the "signaling data application type emergency information delivery notification (AEAT Message Notification)" as a component transmitted by the transmitting device 410.

The signaling data (LLS) is input through the LLS signaling analyzing unit 113 of the middleware 110 illustrated in FIG. 28.

The event processing server 421 generates the event information based on the signaling data (LLS) including the notification related to the emergency information received from the LLS signaling analyzing unit 113, and transfers the generated event information to the event processing client 435 (=the event processing clients 511 and 521 illustrated in FIG. 28).

(Step S613)

A process of step S613 is a process which is executed in a case where output data such as a message or a map output as the emergency information is not included in the event information transferred from the event processing server 421 of the tuner-equipped receiving device middleware 420 to the event processing client 435 of the tuner-equipped/not-equipped receiving device output data control unit 430 in step S612.

In this case, the event processing server 421 of the tuner-equipped receiving device middleware 420 transfers the emergency information (AEAT) including the output data to the event processing client 435 in response to the emergency information (AEAT) acquisition request from the event processing client 435.

Then, a process executed by the tuner-equipped/not-equipped receiving device output data control unit 430 illustrated on the right side of FIG. 30 will be described.

FIG. 30 illustrates the emergency information control unit 433 and the event processing client 435 of the tuner-equipped/not-equipped receiving device output data control unit 430. These components correspond to the components of the emergency information control units 140 and 160 and the event processing clients 511 and 521 of the tuner-equipped receiving device 30 and the tuner-not-equipped receiving device 40 illustrated in FIG. 28.

Further, in the example illustrated in FIG. 30, the emergency information control unit 433 is set to execute data rendering for the emergency message, the map, or the like included in the emergency information (AEAT), but for example, the application control units 133 and 153 illustrated in FIG. 28 may execute the execute data rendering for the emergency message, the map, or the like included in the emergency information (AEAT).

In other words, it is also possible to replace the emergency information control unit 433 illustrated in FIG. 30 with the application control unit.

(Step S621)

First, the event processing client 435 of the tuner-equipped/not-equipped receiving device output data control unit 430 establishes the event information relay session which is the secure session dedicated for the emergency information transfer with the event processing server 421 of the tuner-equipped receiving device middleware 420.

An always-connected state is maintained in this session.

(Step S622)

First, the event processing client 435 of the tuner-equipped/not-equipped receiving device output data control unit 430 receives the event information generated on the basis of the signaling data (LLS) having the "signaling data application type emergency information delivery notification (AEAT Message Notification)" as a component from the event processing server 421 of the tuner-equipped receiving device middleware 420.

Recording information of the "signaling data application type emergency information delivery notification (AEAT Message Notification)" described above with reference to FIG. 13 is included in the event information.

The event processing client 435 of the tuner-equipped/not-equipped receiving device output data control unit 430 transfers the event information input from the event processing server 421 of the tuner-equipped receiving device middleware 420 to the emergency information control unit 433 (=the emergency information control units 140 and 160 illustrated in FIG. 28).

For example, the following data is included in the event information:

(1) the emergency information (AEAT) data or the emergency information (AEAT) data access URL; and (2) the delivery start time and the duration of the emergency information (AEAT).

Such data are recorded.

(Steps S623 and S624)

Then, the emergency information control unit 433 of the tuner-equipped/not-equipped receiving device output data control unit 430 acquires the event information received from the event processing client 435 in step S623 and executes a process of outputting the emergency information (AEAT) data to the display unit in step S624.

Further, in a case where the emergency information (AEAT) data to be output (displayed) is included in the event information received from the event processing client 435, the emergency information (AEAT) is acquired from the received event information, and in step S423, the emergency message, the map information, or the like included in the emergency information (AEAT) is displayed.

On the other hand, in a case where the access information of the emergency information (AEAT) is recorded in the event information received from the event processing client 435, and the emergency information (AEAT) data to be output (displayed) is not included, the process of acquiring the emergency information (AEAT) from the event processing server 421 of the tuner-equipped receiving device middleware 420, and then, in step S624, the emergency message, the map information, or the like included in the acquired emergency information (AEAT) is displayed.

As described above, the event processing client 435 of the tuner-equipped/not-equipped receiving device output data control unit 430 can acquire the event information generated by the event processing server 421 of the tuner-equipped receiving device middleware 420 and acquire and display the emergency information (AEAT).

Further, the signaling data application type emergency information has been described as an example of the AEAT, but the process of the present disclosure can be applied to the emergency information which has a format other than the AEAT and is transmitted by applying the signaling data regardless of the format of the emergency information.

10. Configuration Example of Transmitting Device and Receiving Device

Next, a device configuration example of the transmitting device (server) 20 and the receiving devices (clients) 30 and 40 which are communication devices will be described with reference to FIG. 31 and FIG. 32.

Figure 31:
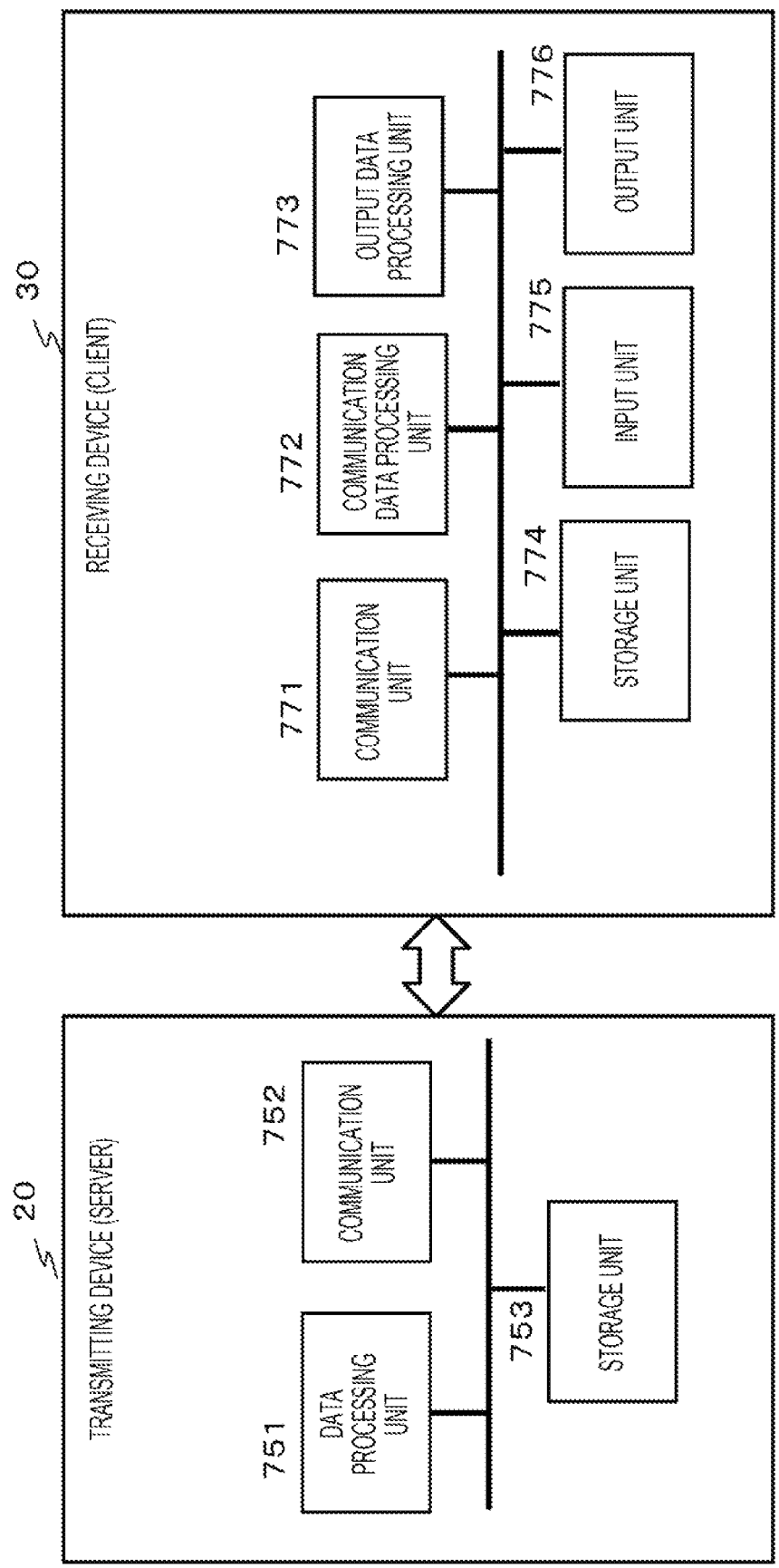
FIG. 31 is a diagram illustrating a configuration example of a transmitting device and a receiving device which are communication devices.

FIG. 31 illustrates a configuration example of the transmitting device (server) 20 and the receiving device (client) 30.

The transmitting device (server) 20 includes a data processing unit 751, a communication unit 752, and a storage unit 753.

Each of the receiving devices (clients) 30 and 40 includes a communication unit 771, a communication data processing unit 772, an output data processing unit 773, a storage unit 774, an input unit 775, and an output unit 776.

The data processing unit 751 of the transmitting device (server) 20 executes various kinds of data processing for executing the data delivery service. For example, the data processing unit 751 performs generation and transmission control of configuration data of the data delivery service. Further, the data processing unit 751 performs a process of generating and transmitting the application, the emergency information, the signaling data, and various other data in addition to the AV stream data such as the broadcast content to be provided to the receiving device (client) 30.

The communication unit 752 performs a communication process such as delivery of the application, the emergency information, the signaling data, and various other data in addition to the AV stream data such as the broadcast content.

The storage unit 753 stores the application, the emergency information, the signaling data, various other data, and the like in addition to the AV stream data such as the broadcast content serving as the delivery target.

Further, the storage unit 753 is used as a work area for the data processing executed by the data processing unit 751 and also used as a storage area for various kinds of parameters.

On the other hand, each of the receiving devices (clients) 30 and 40 includes the communication unit 771, the communication data processing unit 772, the output data processing unit 773, the storage unit 774, the input unit 775, and the output unit 776.

The communication unit 771 is set to be different between a communication unit of the tuner-equipped receiving device 30 and a communication unit of the tuner-not-equipped receiving device 40.

The communication unit of the tuner-equipped receiving device 30 receives data delivered from the transmitting device (server) 20, for example, the application, the emergency information, the signaling data, various other data, and the like in addition to the AV stream data such as the broadcast content.

Further, it is configured as a communication unit capable of performing transmission and reception of data via network such as a LAN, Wi-Fi, or the like.

On the other hand, the communication unit of the tuner-not-equipped receiving device 40 is configured as a communication unit which does not include a tuner portion capable of receiving the broadcast wave and can execute transmission and reception of data via network such as a LAN, Wi-Fi, or the like.

The communication data processing unit 772 corresponds to the middleware 110 of the communication data processing unit 772 illustrated in FIG. 10 and others drawings.

The communication data processing unit 772 executes processes such as acquisition and analysis of the signaling data, generation of the event information, generation of the event inserted MPD and the event inserted segment, and the like.

There are cases in which the event processing server 501 described with reference to FIG. 28 is included.

The output data processing unit 773 includes the reproduction control unit (DASH client), the output control unit, the application control unit, the emergency information control unit, the event processing client, and the like, and executes, for example, the processes or the like according to the above-described embodiment.

Specifically, the output data processing unit 773 executes output control for the emergency information, the display control process for the application presentation content, and the like in addition to the output control for the broadcast content.

Various commands such as commands given by the user, for example, channel selection, application activation, installation, and the like are input via the input unit 775.

The reproduction data is output to the output unit 776 such as the display unit or the speaker.

The storage unit 774 stores the AV segment, the MPD, recent status information, the signaling data, and the like.

Further, the storage unit 774 is used as a work area for the data processing executed by the data processing unit 771 and also used as a storage area for various kinds of parameters.

FIG. 32 illustrates a hardware configuration example of a communication device applicable as each of the transmitting device 20 and the receiving device 30.

A central processing unit (CPU) 801 functions as a data processing unit that executes various kinds of processes in accordance with a program stored in a Read Only Memory (ROM) 802 or a storage unit 808. For example, the CPU 801 executes the processes according to the sequences described in the above-described embodiment. A random access memory (RAM) 803 stores a program executed by the CPU 801, data, and the like. The CPU 801, the ROM 802, and the RAM 803 are connected to one another via a bus 804.

The CPU 801 is connected to an input/output interface 805 via the bus 804, and an input unit 806 including various kinds of switches, a keyboard, a mouse, a microphone, or the like and an output unit 807 including a display, a speaker, or the like are connected to the input/output interface 805. The CPU 801 executes various kinds of processes corresponding to commands input from the input unit 806, and outputs processing results to, for example, the output unit 807.

The storage unit 808 connected to the input/output interface 805 is constituted by, for example, a hard disk or the like, and stores a program executed by the CPU 801 and various kinds of data. The communication unit 809 functions as a transceiving unit of data communication via a network such as the Internet or a local area network and a transceiving unit of a broadcast wave and communicates with an external device.

A drive 810 connected to the input/output interface 805 drives a removable medium 811 such as a magnetic disk, an optical disk, a magneto-optical disk, or a semiconductor memory such as a memory card, and executes recording or reading of data.

Further, encoding or decoding of data can be executed as a process of the CPU 801 serving as a data processing unit but a codec serving as dedicated hardware for executing an encoding process or a decoding process may be installed.

11. Conclusion of Configuration of Present Disclosure

The embodiment of the present disclosure has been described above in detail while referring to the specific embodiment. However, it is obvious that those skilled in the art can make modifications or substitutions of the embodiments without departing from the gist of the present disclosure. In other words, the present invention has been disclosed in the form of exemplification and should not be interpreted restrictively. In order to determine the gist of the present disclosure, claims set forth below should be taken into consideration.

Further, the technology disclosed in this specification may have the following configuration.

(1) A receiving device, including:

middleware that executes an analysis process for received data from a transmitting device; and an output data control unit that executes an output control process for the received data from the transmitting device, in which the middleware receives an emergency information delivery notification transmitted by the transmitting device, and generates emergency information event notification data including configuration data of the received emergency information delivery notification, and the output data control unit acquires the event notification data and executes a process of acquiring or displaying emergency information on the basis of the acquired event notification data.

(2) The receiving device according to (1), in which the emergency information delivery notification transmitted by the transmitting device is an on-screen message type emergency information delivery notification for giving a notification of delivery of the emergency information overlaid on a transmission image of the transmitting device, the middleware generates an emergency information event notification data indicating that the on-screen message type emergency information delivery notification is performed, and an application control unit constituting the output data control unit causes output of application presentation content to a display unit to be stopped on the basis of the acquired emergency information event notification data and executes control such that the emergency information overlaid on the transmission image of the transmitting device is visible.

(3) The receiving device according to (1) or (2), in which the emergency information delivery notification transmitted by the transmitting device is a signaling data application type emergency information delivery notification for giving a notification of delivery of the emergency information by signaling data transmitted from the transmitting device, the middleware generates emergency information event notification data indicating that the signaling data application type emergency information delivery notification is performed, and the output data control unit performs either a process of outputting the emergency information included in the acquired emergency information event notification data to a display unit or a process of outputting the emergency information acquired using emergency information access information included in the acquired emergency information event notification data to the display unit.

(4) The receiving device according to (3), in which the signaling data application type emergency information delivery notification is a notification including an Advanced Emergency Alerting Table (AEAT) specified as a standard of the emergency information.

(5) The receiving device according to any of (1) to (4), in which the middleware generates an emergency information event inserted Media Presentation Description (MPD) in which configuration data of the emergency information delivery notification is inserted in an MPD as the emergency information event notification data, and the output data control unit executes the process of acquiring or displaying the emergency information on the basis of acquisition information from the emergency information event inserted MPD.

(6) The receiving device according to (5), in which the middleware outputs an MPD update notification to the output data control unit as pre-processing for causing the output data control unit to acquire the emergency information event inserted MPD without delay.

(7) The receiving device according to any of (1) to (6), in which the middleware generates an emergency information event inserted segment in which configuration data of the emergency information delivery notification is inserted into a segment as the emergency information event notification data, and the output data control unit executes the process of acquiring or displaying the emergency information on the basis of acquisition information from the emergency information event inserted segment.

(8) The receiving device according to any of (1) to (7), in which the middleware stores the generated emergency information event notification data in a cache unit, and the output data control unit accesses the cache unit and acquires the event notification data.

(9) The receiving device according to any of (1) to (4), in which the middleware includes an event processing server that generates and transmits the emergency information event notification data, the output data control unit includes an event processing client that receives the emergency information event notification data from the event processing server, and the event processing client establishes an event transfer dedicated session with the event processing server and receives the emergency information event notification data from the event processing server via the established dedicated session.

(10) A receiving device, including:

middleware that executes an analysis process for received data from a transmitting device, in which the middleware receives an emergency information delivery notification transmitted by the transmitting device, and generates emergency information event notification data including configuration data of the received emergency information delivery notification, and provides the generated emergency information event notification data to a client that executes that an output control process for the received data from the transmitting device.

(11) The receiving device according to (10), in which the emergency information delivery notification transmitted by the transmitting device is an on-screen message type emergency information delivery notification for giving a notification of delivery of the emergency information overlaid on a transmission image of the transmitting device, and the middleware generates an emergency information event notification data indicating that the on-screen message type emergency information delivery notification is performed.

(12) The receiving device according to (10) or (11), in which the emergency information delivery notification transmitted by the transmitting device is a signaling data application type emergency information delivery notification for giving a notification of delivery of the emergency information by signaling data transmitted from the transmitting device, and the middleware generates emergency information event notification data indicating that the signaling data application type emergency information delivery notification is performed.

(13) The receiving device according to any of (10) to (12), in which the middleware generates an emergency information event inserted Media Presentation Description (MPD) in which configuration data of the emergency information delivery notification is inserted in an MPD as the emergency information event notification data.

(14) The receiving device according to any of (10) to (13), in which the middleware generates an emergency information event inserted segment in which configuration data of the emergency information delivery notification is inserted into a segment as the emergency information event notification data.

(15) A receiving device, including:

an output data control unit that executes an output control process for the received data from the transmitting device, in which the output data control unit acquires emergency information event notification data including configuration data of an emergency information delivery notification transmitted by the transmitting device, and executes a process of acquiring or displaying emergency information on the basis of the acquired event notification data.

(16) The receiving device according to (15), in which the emergency information delivery notification transmitted by the transmitting device is an on-screen message type emergency information delivery notification for giving a notification of delivery of the emergency information overlaid on a transmission image of the transmitting device, the output data control unit acquires an emergency information event notification data indicating that an on-screen message type emergency information delivery notification is performed, and an application control unit constituting the output data control unit causes output of application presentation content to a display unit to be stopped on the basis of the acquired emergency information event notification data and executes control such that the emergency information overlaid on the transmission image of the transmitting device is visible.

(17) The receiving device according to (15) or (16), in which the emergency information delivery notification transmitted by the transmitting device is a signaling data application type emergency information delivery notification for giving a notification of delivery of the emergency information by signaling data transmitted from the transmitting device, the output data control unit acquires emergency information event notification data indicating that the signaling data application type emergency information delivery notification is performed, and performs either a process of outputting the emergency information included in the acquired emergency information event notification data to a display unit or a process of outputting the emergency information acquired using emergency information access information included in the acquired emergency information event notification data to the display unit.

(18) A data processing method executed in a receiving device, the receiving device including:

middleware that executes an analysis process for received data from a transmitting device; and an output data control unit that executes an output control process for the received data from the transmitting device, the data processing method including:

receiving, by the middleware, an emergency information delivery notification transmitted by a transmitting device and generating emergency information event notification data including configuration data of the received emergency information delivery notification; and acquiring, by the output data control unit, the event notification data and executing a process of acquiring or displaying emergency information on the basis of the acquired event notification data.

(19) A data processing method executed in a receiving device, the receiving device including middleware that executes an analysis process for received data from a transmitting device, the data processing method including:

receiving, by the middleware, an emergency information delivery notification transmitted by the transmitting device and generating emergency information event notification data including configuration data of the received emergency information delivery notification; and providing, by the middleware, the generated emergency information event notification data to a client that executes that an output control process for the received data from the transmitting device.

(20) A data processing method executed in a receiving device, the receiving device including an output data control unit that executes an output control process for the received data from the transmitting device, the data processing method including:

acquiring, by the output data control unit, emergency information event notification data including configuration data of an emergency information delivery notification transmitted by the transmitting device; and executing, by the output data control unit, a process of acquiring or displaying emergency information on the basis of the acquired event notification data.

Further, a series of processes described in the specification can be executed by hardware, software, or a combination thereof. In a case where a process by software is executed, a program in which a process sequence is recorded may be installed in a memory in a computer incorporated into dedicated hardware and executed, or the program may be installed and executed in a general-purpose computer capable of executing various kinds of processes. For example, the program can be recorded in a recording medium in advance. The program can be installed a computer from a recording medium, but the program can be received via a network such as a local area network (LAN), the Internet, or the like and installed in a recording medium such as an internal hard disk.

Further, various kinds of processes described in the specification may be executed chronologically as described above but may be executed in parallel or individually in accordance with a processing capability of a device executing a process or a necessity. Further, in this specification, a system is a logical aggregate configuration of a plurality of devices and not limited to a configuration in which devices of respective components are in a single housing.

INDUSTRIAL APPLICABILITY

As described above, according to the configuration of one embodiment of the present disclosure, a configuration capable of performing a process of presenting the emergency information to the viewer promptly and reliably is implemented.

Specifically, for example, the middleware of the receiving device that performs the broadcasting content output process receives the emergency information delivery notification transmitted by the transmitting device and generates the emergency information event notification data including the configuration data of the received emergency information delivery notification. The output data control unit acquires the event notification data and executes the process of acquiring or displaying the emergency information on the basis of the acquired event notification data. For example, in a case where the emergency information overlaid on the image is delivered, the application presentation content is deleted in accordance with the event notification, and in the case of the signaling emergency information delivery, the process of acquiring and outputting the emergency information promptly is executed.

With the present configuration, a configuration capable of performing a process of presenting the emergency information to the viewer promptly and reliably is implemented.

REFERENCE SIGNS LIST

10 Communication system
20 Transmitting device
21 Broadcasting server
22 Data delivery server
30 Tuner-equipped receiving device
31 Relay server
32 TV
33 PC
34 Mobile terminal
40 Tuner-not-equipped receiving device
41 PC
42 Mobile terminal
50 Signaling data
60 AV segment
70 Other data
110 Middleware
111 Communication unit (PHY/MAC)
112 LLS signaling acquiring unit
113 LLS signaling analyzing unit
114 SLS signaling acquiring unit
115 SLS signaling analyzing unit (MPD event inserting unit)
117 Segment acquiring unit
118 In-band event inserting unit
120 HTTP proxy server
121, 122 Cache unit
123 Address resolution unit
131, 151 Reproduction control unit
132, 152 Output control unit
133, 153 Application control unit
140, 160 Emergency information control unit
201, 251 MPD acquiring unit
202, 252 MPD analyzing unit
203, 253 Segment acquiring unit
204, 254 Segment analyzing unit
205, 255 Event extracting unit
211, 261 Decoding unit
212, 262 Output unit
310 Event insertion executing device
311 Data output unit (DASH server)
312 Event processing unit (event server)
320 Event executing device
321 Reproduction control unit (event client)
322 Reproduction control unit (DASH client)
410 Transmitting device
411 Stream server
412 DASH server
413 Emergency information server
414 Broadcasting signal processing unit (broadcasting server)
420 Tuner receiving device middleware
421 Event processing server
430 Tuner-equipped/not-equipped receiving device output data control unit
431 Application control unit
432 Reproduction control unit
433 Emergency information control unit
435 Event processing client
501 Event processing server
511, 521 Event processing client
751 Data processing unit
752 Communication unit
753 Storage unit
771 Communication unit
772 Communication data processing unit
773 Output data processing unit
774 Storage unit
775 Input unit
776 Output unit
801 CPU 802 ROM
803 RAM
804 Bus
805 Input/output interface
806 Input unit
807 Output unit
808 Storage unit
809 Communication unit
810 Drive
811 Removable medium

The invention claimed is:

1. A receiving device, comprising:
processing circuitry configured to run
middleware that executes an analysis process for received data from a transmitting device; and
an output data control unit that executes an output control process for the received data from the transmitting device, wherein
the middleware is configured to receive an emergency information delivery notification transmitted by the transmitting device, and generate a Dynamic Adaptive Streaming over HTTP (DASH) event that includes emergency information event notification data based on the received emergency information delivery notification, the emergency information event notification data including configuration data of the received emergency information delivery notification, and
the output data control unit is configured to acquire the emergency information event notification data and execute a process of acquiring or displaying emergency information based on the acquired emergency information event notification data.

2. The receiving device according to claim 1, wherein
the emergency information delivery notification transmitted by the transmitting device is an on-screen message type emergency information delivery notification for giving a notification of delivery of the emergency information overlaid on a transmission image of the transmitting device,
the middleware is configured to generate the emergency information event notification data indicating that the on-screen message type emergency information delivery notification is performed, and
the output data control unit includes an application control unit that is configured to cause output of application presentation content to a display unit to be stopped based on the acquired emergency information event notification data and execute control such that the emergency information overlaid on the transmission image of the transmitting device is visible.

3. The receiving device according to claim 1, wherein
the emergency information delivery notification transmitted by the transmitting device is a signaling data application type emergency information delivery notification for giving a notification of delivery of the emergency information by signaling data transmitted from the transmitting device,
the middleware is configured to generate the emergency information event notification data indicating that the signaling data application type emergency information delivery notification is performed, and
the output data control unit is configured to perform either a process of outputting the emergency information included in the acquired emergency information event notification data to a display unit or a process of outputting the emergency information acquired based on emergency information access information included in the acquired emergency information event notification data to the display unit.

4. The receiving device according to claim 3, wherein the signaling data application type emergency information delivery notification is a notification including an Advanced Emergency Alerting Table (AEAT) specified as a standard of the emergency information.

5. The receiving device according to claim 1, wherein
the middleware is configured to generate an emergency information event inserted Media Presentation Description (MPD) in which the configuration data of the emergency information delivery notification is inserted in an MPD as the emergency information event notification data, and
the output data control unit is configured to execute the process of acquiring or displaying the emergency information based on acquisition information from the emergency information event inserted MPD.

6. The receiving device according to claim 5, wherein the middleware is configured to output an MPD update notification to the output data control unit as pre-processing for causing the output data control unit to acquire the emergency information event inserted MPD.

7. The receiving device according to claim 1, wherein
the middleware is configured to generate an emergency information event inserted segment in which the configuration data of the emergency information delivery notification is inserted into a segment as the emergency information event notification data, and
the output data control unit is configured to execute the process of acquiring or displaying the emergency information based on the acquisition information from the emergency information event inserted segment.

8. The receiving device according to claim 1, wherein
the middleware is configured to store the generated emergency information event notification data in a cache unit, and
the output data control unit is configured to access the cache unit and acquire the emergency information event notification data.

9. The receiving device according to claim 1, wherein
the middleware includes an event processing server that is configured to generate and transmit the emergency information event notification data,
the output data control unit includes an event processing client that is configured to receive the emergency information event notification data from the event processing server, and
the event processing client is configured to establish an event transfer dedicated session with the event processing server and receive the emergency information event notification data from the event processing server via the established dedicated session.

10. A receiving device, comprising:
processing circuitry configured to run middleware that executes an analysis process for received data from a transmitting device, wherein the middleware is configured to
receive an emergency information delivery notification transmitted by the transmitting device, and generate a Dynamic Adaptive Streaming over HTTP (DASH) event that includes emergency information event notification data based on the received emergency information delivery notification, the emergency information event notification data including configuration data of the received emergency information delivery notification, and provide the generated emergency information event notification data to a client that executes an output control process for the received data from the transmitting device.

11. The receiving device according to claim 10, wherein the emergency information delivery notification transmitted by the transmitting device is an on-screen message type emergency information delivery notification for giving a notification of delivery of emergency information overlaid on a transmission image of the transmitting device, and
the middleware is configured to generate the emergency information event notification data indicating that the on-screen message type emergency information delivery notification is performed.

12. The receiving device according to claim 10, wherein the emergency information delivery notification transmitted by the transmitting device is a signaling data application type emergency information delivery notification for giving a notification of delivery of emergency information by signaling data transmitted from the transmitting device, and
the middleware is configured to generate the emergency information event notification data indicating that the signaling data application type emergency information delivery notification is performed.

13. The receiving device according to claim 10, wherein the middleware is configured to generate an emergency information event inserted Media Presentation Description (MPD) in which the configuration data of the emergency information delivery notification is inserted in an MPD as the emergency information event notification data.

14. The receiving device according to claim 10, wherein the middleware is configured to generate an emergency information event inserted segment in which the configuration data of the emergency information delivery notification is inserted into a segment as the emergency information event notification data.

15. A receiving device, comprising:
processing circuitry configured to run an output data control unit that executes an output control process for received data from a transmitting device, wherein the processing circuitry is configured to
acquire a Dynamic Adaptive Streaming over HTTP (DASH) event that includes emergency information event notification data, the emergency information event notification data including configuration data of an emergency information delivery notification transmitted by the transmitting device, and
execute a process of acquiring or displaying emergency information based on the acquired emergency information event notification data.

16. The receiving device according to claim 15, wherein the emergency information delivery notification transmitted by the transmitting device is an on-screen message type emergency information delivery notification for giving a notification of delivery of the emergency information overlaid on a transmission image of the transmitting device,
the output data control unit is configured to acquire the emergency information event notification data indicating that an on-screen message type emergency information delivery notification is performed, and
the output data control unit includes an application control unit that is configured to cause output of application presentation content to a display unit to be stopped based on the acquired emergency information event notification data and execute control such that the emergency information overlaid on the transmission image of the transmitting device is visible.

17. The receiving device according to claim 15, wherein the emergency information delivery notification transmitted by the transmitting device is a signaling data application type emergency information delivery notification for giving a notification of delivery of the emergency information by signaling data transmitted from the transmitting device,
the output data control unit is configured to
acquire the emergency information event notification data indicating that the signaling data application type emergency information delivery notification is performed, and
perform either a process of outputting the emergency information included in the acquired emergency information event notification data to a display unit or a process of outputting the emergency information acquired using emergency information access information included in the acquired emergency information event notification data to the display unit.

18. A data processing method executed in a receiving device, the receiving device including processing circuitry configured to run middleware that executes an analysis process for received data from a transmitting device; and an output data control unit that executes an output control process for the received data from the transmitting device, the data processing method comprising:
receiving, by the middleware, an emergency information delivery notification transmitted by a transmitting device;
generating, by the middleware, a Dynamic Adaptive Streaming over HTTP (DASH) event that includes emergency information event notification data based on the received emergency information delivery notification, the emergency information event notification data including configuration data of the received emergency information delivery notification; and
acquiring, by the output data control unit, the emergency information event notification data and executing a process of acquiring or displaying emergency information based on the acquired emergency information event notification data.

19. A data processing method executed in a receiving device, the receiving device including processing circuitry configured to run middleware that executes an analysis process for received data from a transmitting device, the data processing method comprising:
receiving, by the middleware, an emergency information delivery notification transmitted by the transmitting device;
generating a Dynamic Adaptive Streaming over HTTP (DASH) event that includes emergency information event notification data based on the received emergency information delivery notification, the emergency information event notification data including configuration data of the received emergency information delivery notification; and
providing, by the middleware, the generated emergency information event notification data to a client that executes an output control process for the received data from the transmitting device.

20. A data processing method executed in a receiving device, the receiving device including processing circuitry configured to run an output data control unit that executes an output control process for received data from a transmitting device, the data processing method comprising:

acquiring, by the output data control unit, a Dynamic Adaptive Streaming over HTTP (DASH) event that includes emergency information event notification data, the emergency information event notification data including configuration data of an emergency information delivery notification transmitted by the transmitting device; and executing, by the output data control unit, a process of acquiring or displaying emergency information based on the acquired emergency information event notification data.

* * * * *